United States Patent
Dirkers et al.

(10) Patent No.: US 11,365,534 B2
(45) Date of Patent: Jun. 21, 2022

(54) HYDRAULIC SYSTEM INCLUDING MANIFOLD, FLUSH VALVE, AND SHUT OFF

(71) Applicant: F Squared Tech, Inc., Duluth, MN (US)

(72) Inventors: Jeffrey Dirkers, Duluth, MN (US); Michael Grassi, Duluth, MN (US)

( * ) Notice: Subject to any disclaimer, the term of this patent is extended or adjusted under 35 U.S.C. 154(b) by 69 days.

(21) Appl. No.: 16/870,059

(22) Filed: May 8, 2020

(65) Prior Publication Data
US 2020/0354936 A1    Nov. 12, 2020

Related U.S. Application Data

(60) Provisional application No. 62/845,971, filed on May 10, 2019.

(51) Int. Cl.
*E03D 3/10*         (2006.01)
*F16K 31/122*       (2006.01)

(52) U.S. Cl.
CPC ............ *E03D 3/10* (2013.01); *F16K 31/1225* (2013.01); *E03D 2201/30* (2013.01);
(Continued)

(58) Field of Classification Search
CPC .............. E03D 1/14–142; E03D 1/302; E03D 2001/147–148; E03D 3/04; E03D 3/10;
(Continued)

(56) References Cited

U.S. PATENT DOCUMENTS 2,715,228 A      8/1955  McLanahan
2,760,204 A  *   8/1956  Joanis ...................... E03D 5/024
                                                    4/367

(Continued)

FOREIGN PATENT DOCUMENTS

EA      021579 B1    7/2015
EP      1197607   *  4/2002     ............. E03D 1/142
(Continued)

OTHER PUBLICATIONS

Halfbakery, "Toilet Aspirator", http://www.halfbakery.com/idea/Toilet_20Aspirator, Oct. 4, 2016.
KNF Neuberger Inc., "Water Aspirators: Cheap Pumps with Environmental Impact and High Operating Costs", Jul. 2015.
Plumberologist, "Venturi Water Pump", http://plumberologist.com.
Vaccon Vacuum Products, "Venturi Vacuum Pumps", http://www.vaccon.com/Venturi-vacuum-pumps.aspx, Oct. 4, 2016.
International Search Report and Written Opinion from corresponding PCT application No. PCT/US2020/032190 dated Jul. 30, 2020.

*Primary Examiner* — David P Angwin
*Assistant Examiner* — Nicholas A Ros
(74) *Attorney, Agent, or Firm* — Young Basile Hanlon & MacFarlane, P.C.

(57) ABSTRACT

Hydraulic devices used to control timing, direction, and velocity of fluid flow are disclosed. The hydraulic device includes a flush valve. The flush valve includes one or more venturi that assist in moving the fluid through flush valve. A manifold includes a housing defining a piston cavity and a piston. The piston is moveable within the piston cavity by a piston actuator between a first position and a second position. A manifold inlet defined by the housing is configured to receive a first fluid from a supply line and is in fluid communication with the piston cavity. A manifold outlet is defined by the housing and is in fluid communication with the piston cavity in. In the first position, the piston prevents fluid communication between the manifold inlet and the manifold outlet through the piston cavity. In the second position, the manifold inlet is in fluid communication with the manifold outlet such that the first fluid can flow from the supply line to the manifold outlet through the piston cavity.

20 Claims, 27 Drawing Sheets

(52) U.S. Cl.
CPC ............... *Y10T 137/86694* (2015.04); *Y10T 137/86879* (2015.04); *Y10T 137/86984* (2015.04)

(58) Field of Classification Search
CPC ... E03D 5/024; Y10T 137/86694–8671; Y10T 137/86879–86895
See application file for complete search history.

(56) References Cited

U.S. PATENT DOCUMENTS

| | | | |
|---|---|---|---|
| 3,918,105 A * | 11/1975 | Young | ............ E03D 5/024 137/395 |
| 3,964,108 A | 6/1976 | Lissau | |
| 3,968,526 A | 7/1976 | Harrah | |
| 4,230,145 A * | 10/1980 | Badders | ............ E03D 5/024 137/445 |
| 4,233,698 A | 11/1980 | Martin | |
| 4,561,131 A | 12/1985 | David | |
| 4,756,031 A | 7/1988 | Barrett | |
| 4,853,982 A | 8/1989 | Martinval | |
| 5,046,201 A | 9/1991 | Steinhardt et al. | |
| 5,142,712 A | 9/1992 | Hennessy | |
| 5,896,593 A | 4/1999 | Mizrahi | |
| 5,926,861 A | 7/1999 | Frost | |
| 6,370,703 B1 | 4/2002 | Kim et al. | |
| 7,069,604 B2 * | 7/2006 | Tomita | ............ E03D 3/04 4/405 |
| 7,380,293 B2 | 6/2008 | Gilbertson et al. | |
| 8,162,102 B2 | 4/2012 | Seibt et al. | |
| 8,528,124 B2 | 9/2013 | Seibt | |
| 8,708,317 B2 | 4/2014 | Lee | |
| 2005/0125884 A1 | 6/2005 | Claridge | |
| 2009/0000019 A1 | 1/2009 | Tolles et al. | |
| 2009/0265842 A1 | 10/2009 | Higgins et al. | |
| 2009/0307831 A1 | 12/2009 | Shahar | |
| 2014/0151309 A1 | 6/2014 | Schreiner et al. | |
| 2015/0354189 A1 | 12/2015 | Kim | |

FOREIGN PATENT DOCUMENTS

| | | | |
|---|---|---|---|
| EP | 1674623 A2 | 6/2006 | |
| EP | 2942441 A1 | 11/2015 | |
| GB | 480689 * | 2/1938 | ............ E03D 3/04 |
| WO | 2006042053 A2 | 4/2006 | |

\* cited by examiner

HYDRAULIC SYSTEM INCLUDING MANIFOLD, FLUSH VALVE, AND SHUT OFF

CROSS-REFERENCE TO RELATED APPLICATION

This application claims priority to U.S. Provisional Patent Application No. 62/845,971, filed May 10, 2019, which is incorporated herein in its entirety by reference.

TECHNICAL FIELD

This disclosure relates to flush valves, shut offs, and manifolds used to control fluid flow.

BACKGROUND

Hydraulic manifolds are used to control fluid flow between inlets, outlets, pumps, actuators, or any other component of a hydraulic system. Hydraulic systems such as toilets, flushometers, urinals, or other waste treatment systems often use one or more flush valves to move fluid from a reservoir to a desired location. Traditional toilets require an excessive amount of water to completely flush the contents of a toilet bowl. This excessive amount of water is wasteful and creates needless expense for toilet owners. Attempts have been made to adjust mechanics of the traditional toilet to reduce the amount of water required to complete a flush cycle, but these attempts have not altered the fundamentals of toilet operation which require a relatively large amount of water to generate force needed to completely flush contents of a toilet bowl. For example, decreasing the time in which a toilet flapper valve is open, or adjusting the level of water in the toilet bowl can have some impact on water usage; however, these adjustments cannot change the force required to be exerted by water flushing from a toilet tank into the toilet bowl to complete a flush cycle.

SUMMARY

One aspect of this disclosure is a manifold including a housing defining a manifold inlet, a manifold outlet, a first piston cavity, and a second piston cavity. The manifold inlet is configured to receive a first fluid from a supply line. The manifold inlet and the manifold outlet are in fluid communication with the first piston cavity and the second piston cavity. The manifold includes a first piston moveable within the first piston cavity between a first piston open position and a first piston closed position. The manifold includes a second piston moveable within the second piston cavity between a second piston open position and a second piston closed position. The manifold includes an actuator configured to selectively move the first piston between the first piston open position and the first piston closed position and to move the second piston between the second piston open position and the second piston closed position. In the first piston open position, the first piston cavity is in fluid communication with the manifold inlet and the manifold outlet such that the first fluid can flow from the manifold inlet to the manifold outlet through the first piston cavity. In the first piston closed position, the first piston prevents fluid communication between the first piston cavity and at least one of the manifold inlet and the manifold outlet such that the first fluid cannot flow from the manifold inlet to the manifold outlet through the first piston cavity. In the second piston open position, the second piston cavity is in fluid communication with the manifold inlet and the manifold outlet such that the first fluid can flow from the manifold inlet to the manifold outlet through the second piston cavity. In the second piston closed position, the second piston prevents fluid communication between the second piston cavity and at least one of the manifold inlet and the manifold outlet such that the first fluid cannot flow from the manifold inlet to the manifold outlet through the second piston cavity.

Another aspect of this disclosure is a manifold comprising a housing defining a piston cavity and a piston having a first end and a second end, where the piston is moveable within the piston cavity between a first piston position and a second piston position. The manifold includes a manifold inlet defined by the housing configured to receive a first fluid from a supply line, where the manifold inlet is in fluid communication with the piston cavity. The manifold includes a manifold outlet defined by the housing, where the manifold outlet is in fluid communication with the piston cavity. The manifold includes a supply conduit defined by the housing that controls the first fluid, where the supply conduit is configured to receive the first fluid from the manifold inlet and to output the first fluid to the manifold outlet, and where the supply conduit includes the piston cavity. The manifold includes a valve in fluid communication with the supply conduit, the valve being moveable between a valve position and a second valve position. In the valve position, the valve directs the first fluid from the supply conduit to the first end of the piston in the piston cavity to move the piston to the first piston position. In the second valve position, the valve directs the first fluid from the supply conduit to the second end of the piston in the piston cavity to move the piston to the second piston position. In the first piston position, the piston prevents fluid communication between the manifold inlet and the manifold outlet through the supply conduit. In the second piston position, the manifold inlet is in fluid communication with the manifold outlet such that the first fluid can flow from the supply line to the manifold outlet through the supply conduit.

Another aspect of this disclosure is a manifold, comprising a housing defining a first piston cavity and a second piston cavity. The manifold includes an inlet channel defined by the housing configured to receive a first fluid from a supply line, where the inlet channel is in fluid communication with the first piston cavity and the second piston cavity. The manifold includes an outlet channel defined by the housing, where the outlet channel is in fluid communication with the first piston cavity and the second piston cavity. The manifold includes a first piston moveable within the first piston cavity between a first piston open position and a first piston closed position. The manifold includes a second piston moveable within the second piston cavity between a second piston open position and a second piston closed position. The manifold includes a first button configured to move the first piston to the first piston open position and a second button configured to move the second piston to the second piston open position. In the first piston open position, the first piston cavity is in fluid communication with the inlet channel and the outlet channel such that the first fluid can flow from the inlet channel to the outlet channel through the first piston cavity. In the first piston closed position, the first fluid cannot flow from the inlet channel to the outlet channel through the first piston cavity. In the second piston open position, the second piston cavity is in fluid communication with the inlet channel and the outlet channel such that the first fluid can flow from the inlet channel to the outlet channel through the second piston cavity. In the second piston closed position, the first fluid cannot flow from the inlet channel to the outlet channel through the second piston cavity. The manifold includes a first damping conduit including a first adjustable flow regulator configured to control a first speed of movement of the first piston from the first piston open position to the first piston closed position. The manifold includes second damping conduit including a second adjustable flow regulator configured to control a second speed of movement of the second piston from the second piston open position to the second piston closed position. The first damping conduit and the second damping conduit control movement of a second fluid that differs from and is not in fluid communication with the first fluid. The first damping conduit is in fluid communication with a first end of the first piston and the second damping conduit is in fluid communication with a first end of the second piston. The first adjustable flow regulator includes a first needle valve and the second adjustable flow regulator includes a second needle valve. The first button and the second button are configured to be actuated in response to a user toilet flush input and wherein the outlet channel is in fluid communication with a toilet flush valve. The manifold includes a first spring coupled to the first piston and configured to move the first piston from the first piston open position to the first piston closed position in response to a user moving the first button. The manifold includes a second spring coupled to the second piston and configured to move the second piston from the second piston open position to the second piston closed position in response to a user moving the second button.

Another aspect of the teachings includes a flush valve. The flush valve includes a venturi tube comprising an inner wall and an outer wall extending between and forming an inlet and an outlet, wherein the venturi tube is configured to the inlet located within a toilet tank and the outlet located within or proximate to a toilet bowl. The flush valve includes wherein fluid is configured to pass through the venturi tube and the venturi tube is free of any pressurized fluid to assist the fluid in passing through the venturi tube.

Another aspect of the teachings includes a toilet flush system. The toilet flush system includes a manifold. The toilet flush system includes a piston actuator. The toilet flush system includes a piston configured to be moved by the piston actuator between a first piston position and a second piston position. The toilet flush system includes a manifold inlet configured to receive water from the supply line. The toilet flush system includes a manifold outlet, wherein in the first piston position, the piston prevents fluid communication between the manifold inlet and the manifold outlet, and wherein in the second piston position, the manifold inlet is in fluid communication with the manifold outlet such that water can flow from the supply line to the manifold outlet. The toilet flush system includes a flush valve. The flush valve includes an upper body including a flush valve actuator, an upper body inlet configured to receive water from the manifold outlet, and an upper body outlet. The flush valve includes a rod attached at a first end to the flush valve actuator and at a second end to a control stop, wherein the flush valve actuator is configured to move the rod from a first rod position to a second rod position when the upper body inlet receives the water. The flush valve includes a first venturi tube located downstream from the upper body, wherein the first venturi tube is configured to receive water from the upper body outlet. The flush valve includes a second venturi tube downstream from the first venturi tube, wherein the second venturi tube is configured to receive water from the first venturi tube and to output water to the toilet bowl and in the first rod position, the control stop seals the second venturi tube from the toilet bowl, and in the second rod position, the second venturi tube is in fluid communication with the toilet bowl.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
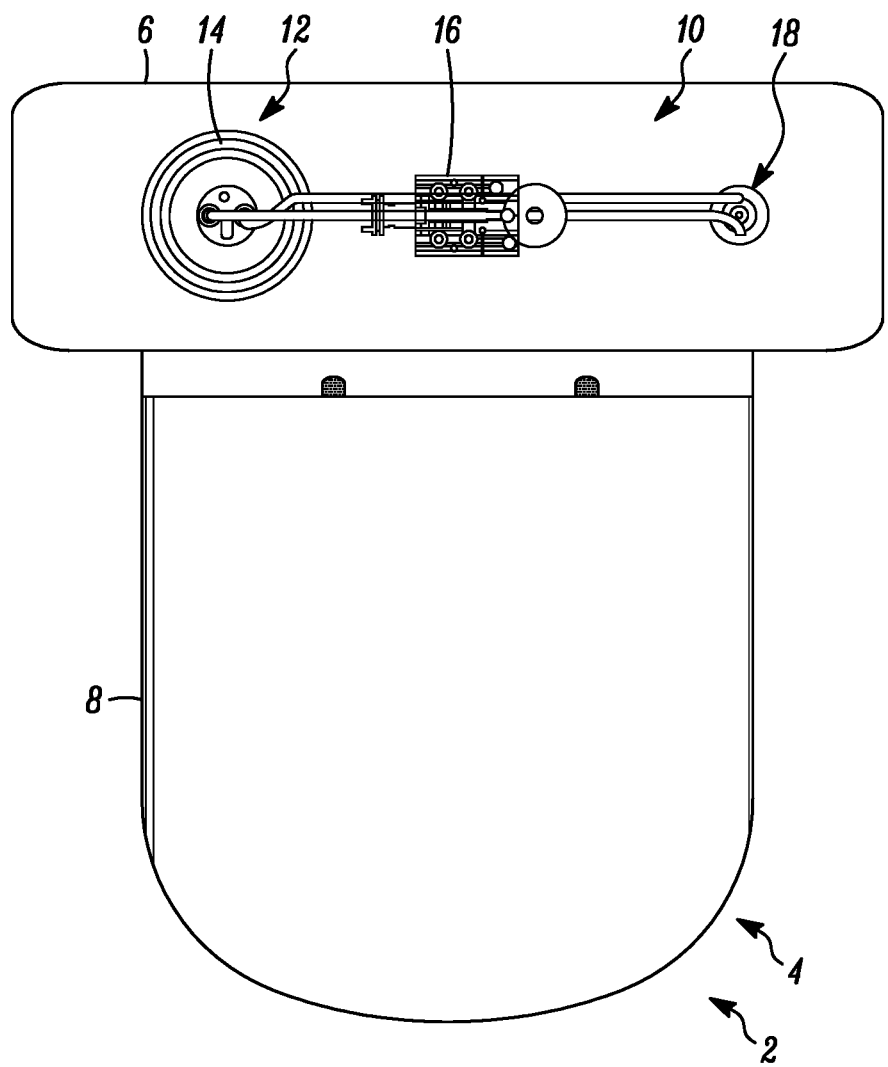
FIG. 1A is a top view of a toilet including a hydraulic system.

Hydraulic systems and devices used to control timing, direction, and velocity of fluid flow are described herein. These hydraulic systems may be used in any hydraulic moving device that is used to move fluid. The hydraulic moving device may be any device that provides an amount of water therethrough so as to achieve an objective so that fluid or an object is moved. The hydraulic system may move a predetermined amount of fluid. The hydraulic systems may move a precise amount of fluid through the hydraulic system or fluid at a precise pressure through the hydraulic system. The hydraulic system may rapidly move fluid so that solids are moved through a portion of the system or removed from the system. The hydraulic systems and devices are described using the context of a hydraulic moving device that is a toilet system; however, the hydraulic systems and devices may be used in other applications such as hydraulically powered motors, pumps, actuators, or a combination thereof.

Traditional toilets are flushed using a lever to open a flapper valve. When opened, the flapper valve allows water in a toilet tank to flow through a siphon and into a toilet bowl. The water flowing into the toilet bowl flushes the contents of the bowl though a toilet trap and into a sewer line. When the toilet tank empties, the flapper valve closes, sealing the toilet tank from the toilet bowl. A supply line supplies water to the toilet tank through a supply valve. A float connected to the supply valve changes position within the toilet tank based on the water level in the toilet tank. When the toilet tank is empty, the float opens the supply valve to allow water from the supply line to refill the toilet tank. When the water in the toilet tank reaches a predetermined level, the float closes the supply valve.

Because traditional toilets empty the toilet tank to complete a single flush cycle, traditional toilets require an excessive amount of water to flush (e.g. 1.28-1.6 gallons). Despite this large volume, typical toilet siphons fail to produce a fluid velocity sufficient to properly clean the toilet bowl during the single flush cycle. By implementing a manifold configured to control the volume of water flowing into to a toilet bowl, the amount of water necessary to complete a flush cycle can be reduced. By implementing a flush valve configured to maximize the velocity of water flowing from the manifold, the velocity of water entering the toilet bowl can be increased to sufficiently clean the toilet bowl during a single flush cycle.

The hydraulic system moves a predetermined amount of fluid in each cycle (e.g., flush). The amount of fluid in each cycle may vary depending upon whether a liquid cycle or a solid cycle is selected (e.g., a solid flush v. a liquid flush if the hydraulic system is a toilet). A solid cycle may use more fluid than a liquid cycle. A solid cycle may use 1.5 times or more, about 1.75 times or more, about 2.0 times or more fluid than a liquid cycle. The solid cycle may use 3.0 times or less, 2.5 times or less, or about 2.25 times or less fluid than a liquid cycle. A liquid cycle may be activated when a first activation valve is selected and solid cycle may be activated when a second activation valve is selected. A liquid cycle may dispense 0.75 L of fluid or more, 1 L of fluid or more, or 1.25 L of fluid or more (e.g., about 1.33 L). A liquid cycle may dispense 2 L of fluid or less, 1.75 L of fluid or less, or 1.5 L of fluid or less. A solid cycle may dispense 2 L of fluid or more, 2.25 L of fluid or more, 2.5 L of fluid or more, or 2.75 L of fluid or more (e.g., about 2.8 L). A solid cycle may dispense 4 L of fluid or less, 3.5 L of fluid or less, or 3.0 L of fluid or less.

A manifold, also referred to as a hydraulic manifold, can include a housing. The housing can define a manifold inlet configured to receive a first fluid (e.g. water) from a supply line and a manifold outlet configured to output the first fluid from the manifold. The housing may also define one or more piston cavities. For example, the housing may define a single piston cavity, two piston cavities, or more than two piston cavities. The manifold may include a piston moveable in each piston cavity. Each of the pistons may move between an open piston position and a closed piston position within a respective piston cavity.

The manifold may further includes an actuator configured to selectively move each of the pistons between the open and closed piston positions. For example, the actuator may be configured to move a first piston between a first open piston position and a first piston closed position and to move a second piston between a second piston open position and a second piston closed position. The actuator may be configured to move a third piston and a fourth piston between an open position and a closed position. The actuator may move a first and a third piston simultaneously, in sequence, or both. The actuator may move a second and a fourth piston simultaneously, in sequence, or both. The actuator may move one piston, two pistons, three pistons, or more simultaneously or in series. The actuator may actuate pistons based on a selection by the user. The actuator may include one or more valves, one or more buttons configured to be pressed by a user, one or more electric motors, or any other suitable means for actuation. The actuator may be free of electric motors, springs, or both. The manifold may include multiple actuators, where each actuator is configured to independently move a separate piston.

In an open piston position, a respective piston cavity may be in fluid communication with one of the manifold inlets and the manifold outlet such that the first fluid can flow from the manifold inlet to one of the manifold outlets through the respective piston cavity. Each piston is in fluid communication with a manifold inlet and a manifold outlet. For example, a first piston and a second piston may be in communication with an inlet and a first outlet and the third piston and fourth piston may be in communication with the inlet and a second outlet. In a closed piston position, the respective piston prevents fluid communication between the respective piston cavity and at least one of the manifold inlet and the manifold outlet such that that the first fluid cannot flow from the manifold inlet to the manifold outlet through the respective piston cavity. The piston cavities may only contain a first fluid or a second fluid. For example, the piston cavities may have water or oil on both sides of the piston. The piston cavities may contain two fluids. For example, water may be located on one side of a piston and oil may be located on a second side of a piston. One of the fluids in the piston cavities may be in communication with a dampening conduit.

One or both ends of each piston may be in fluid communication with a separate damping conduit configured to control a second fluid (e.g., oil). For example, a first piston may be in fluid communication with a first damping conduit, a second piston may be in fluid communication with a second damping conduit, a third piston may be in communication with a third dampening conduit, a fourth piston may be in communication with a fourth dampening conduit, or a combination thereof. Each damping conduit may be configured to control movement of the second fluid that differs from and is not in fluid communication with the first fluid. Each damping conduit may include an adjustable flow regulator configured to control a speed of movement of a respective piston from the open position to the closed position. The speed of movement of each piston may be adjusted to control a volume of the first fluid flowing from the manifold inlet to the manifold outlet through the respective piston cavity.

The manifold outlet may be in fluid communication with a flush valve disposed within a toilet tank. The flush valve may be configured to receive the first fluid from the manifold outlet and from the toilet tank and may be configured to output the first fluid to a toilet bowl. The flush valve may include an upper body. The upper body may include a flush valve actuator, an upper body inlet configured to receive the first fluid from the manifold outlet, and an upper body outlet. The flush valve may include a rod attached at a first end to the flush valve actuator and at a second end to a control stop, also referred to as a flapper valve. The flush valve actuator may be configured to move the rod from a first rod position to a second rod position when the upper body inlet receives the first fluid from the manifold outlet so that the control stop is opened and fluid passes through the flush valve.

The flush valve may include a first venturi tube, a second venturi tube, or both located downstream from the upper body outlet. The first venturi tube may be configured to receive the first fluid from the upper body outlet and from the toilet tank. The flush valve may also include a second venturi tube downstream from the first venturi tube. The second venturi tube may be configured to receive the first fluid from the first venturi tube and from the toilet tank and may be configured to output the first fluid to the toilet bowl. The first venturi tube and the second venturi tube may have separate inlets and may include outlets that converge at the control stop.

In the first rod position, the control stop may prevent fluid communication between the flush valve, the second venturi tube, or both and the toilet bowl. When the upper body inlet receives the first fluid from the manifold outlet, the flush valve actuator may move the rod to the second rod position. In the second rod position, the control stop may be opened so that the second venturi tube is in fluid communication with the toilet bowl. In the open position, the control stop may allow the first fluid to flow from the manifold outlet, through the flush valve, and into the toilet bowl.

FIG. 1A illustrates a hydraulic moving device 2 that is a toilet 4. The toilet 4 includes a tank 6 and a bowl 8 with the hydraulic system 10 being located within the tank 6 so that the hydraulic system 10 provides a fluid to the bowl 8, the tank 6, or both upon the toilet 4 being flushed. A portion of the hydraulic system 10 may extend outside of the tank 6 so that the hydraulic system 10 may be activated, receive fluid from an external fluid source, or may pass a fluid from the tank 6 to the bowl 8. The hydraulic system 10 includes a valve 12 (shown as a flush valve 14), a manifold 16, and a shut off 18. During operation, fluid flows into the shut off 18. The fluid is directed from the shut off 18 into the manifold 16, the flush valve 14, or both. When an event occurs (e.g., flushing), the manifold 16 actuates fluid from the tank 6 through the flush valve 14 and into the bowl 8. The manifold 16 then actuates and refills the tank 6 in preparation for a subsequent event.

Figure 1B:
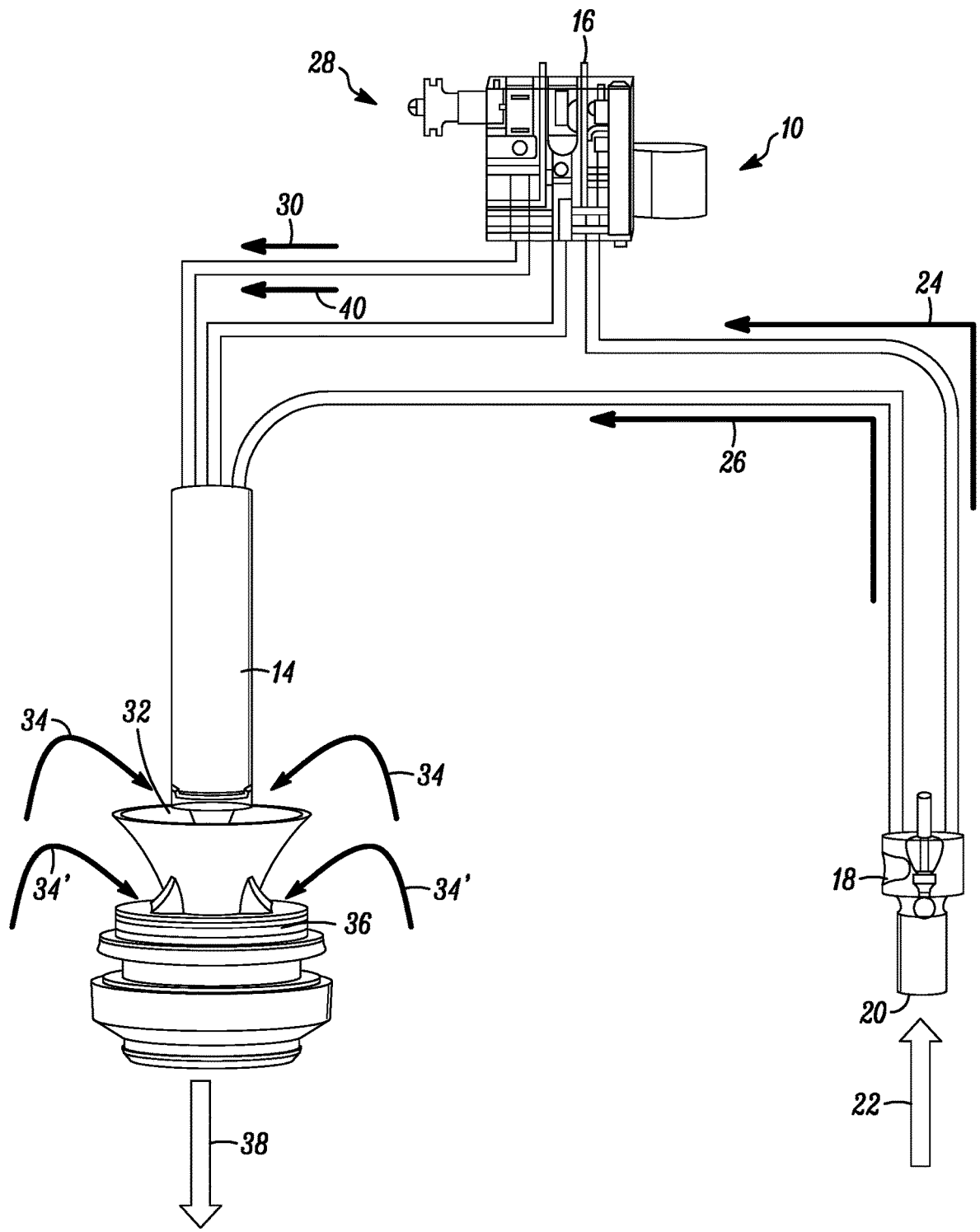
FIG. 1B is a plan view of the hydraulic system of FIG. 1A.

FIG. 1B is a plan view of the hydraulic system 10 of FIG. 1A. The hydraulic system 10 includes a flush valve 14 that is located between a tank (not shown) (i.e., a portion of the flush valve extends through the tank) and the manifold 16. The manifold 16 is located between the shut off 18 and the flush valve 14 so that the manifold 16 controls an amount of fluid passed into the flush valve 14. The shut off 18 has an inlet 20 that fluid 22 flows through into the hydraulic system 10. From the shut off 18 some fluid flows in the direction 24 to the manifold 16 and some fluid flows in the direction 26 directly to the flush valve 14 so that the flush valve 14 has a constant supply of water. Upon a flush being activated by one of the buttons of the actuator 28, fluid moves into the manifold 16 and then is moved out of the manifold 16 in the direction 30 to the flush valve 14. As fluid passes from the manifold 16 through the flush valve 14, fluid 34 is pulled into the venturi 32 in the direction 34 and into the second venturi tube 36 in the direction 34' from a tank or fluid source (not shown) to add additional flow. The fluid from the manifold 16 flows through the flush valve 14 to move fluid through the venturi tube 32 and second venturi tube 34. The fluid is forced in the direction 38 so that a toilet is flushed or a tank is refilled. After a flush is complete, fluid flows out of the manifold 16 in the direction 40 to refill the tank (not shown). The fluid flow in the direction 38 illustrates both a flush and a tank refill.

Figure 2A:
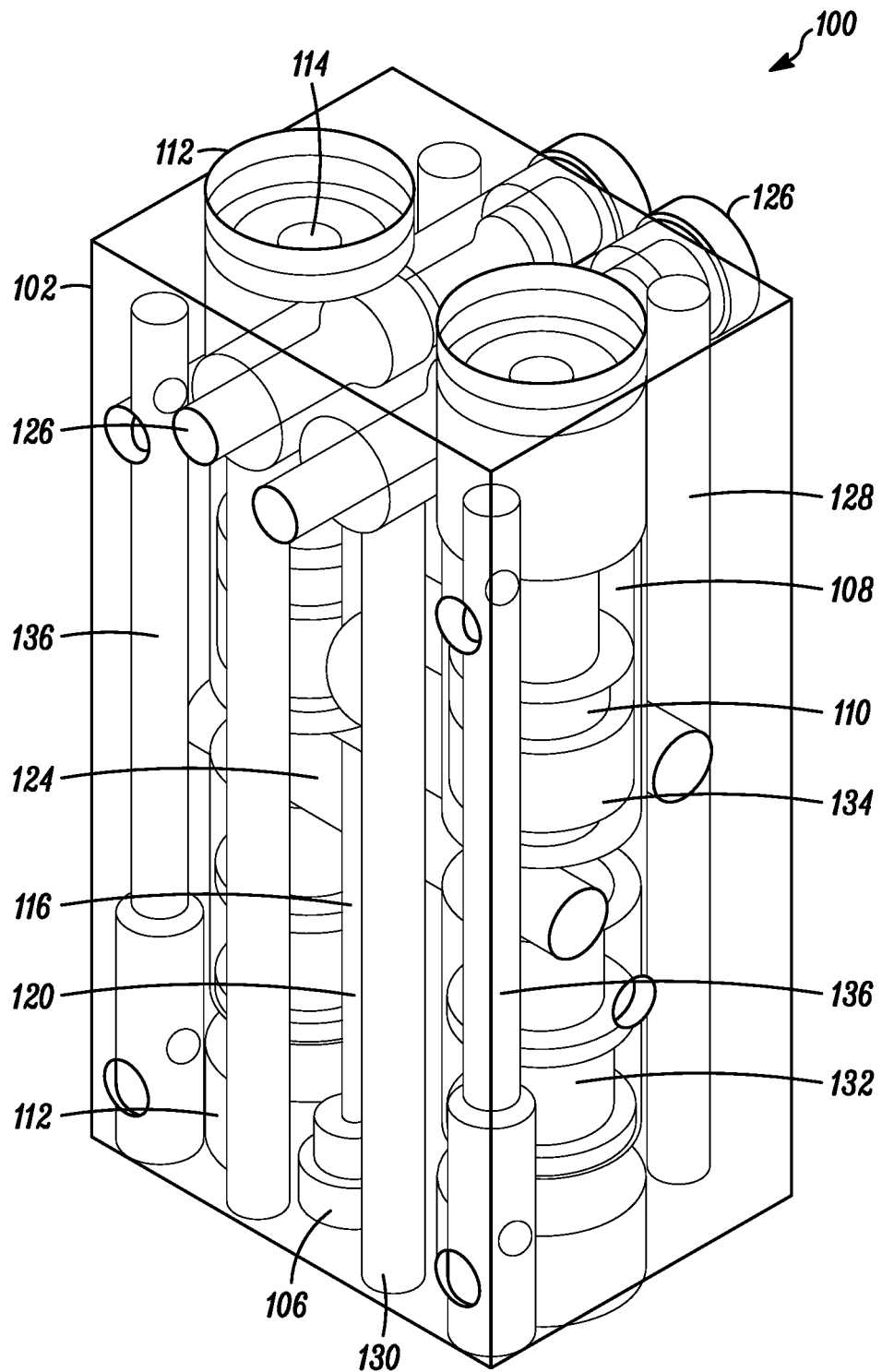
FIG. 2A is a perspective view of a partially transparent front, top, and left side of a manifold.
Figure 2B:
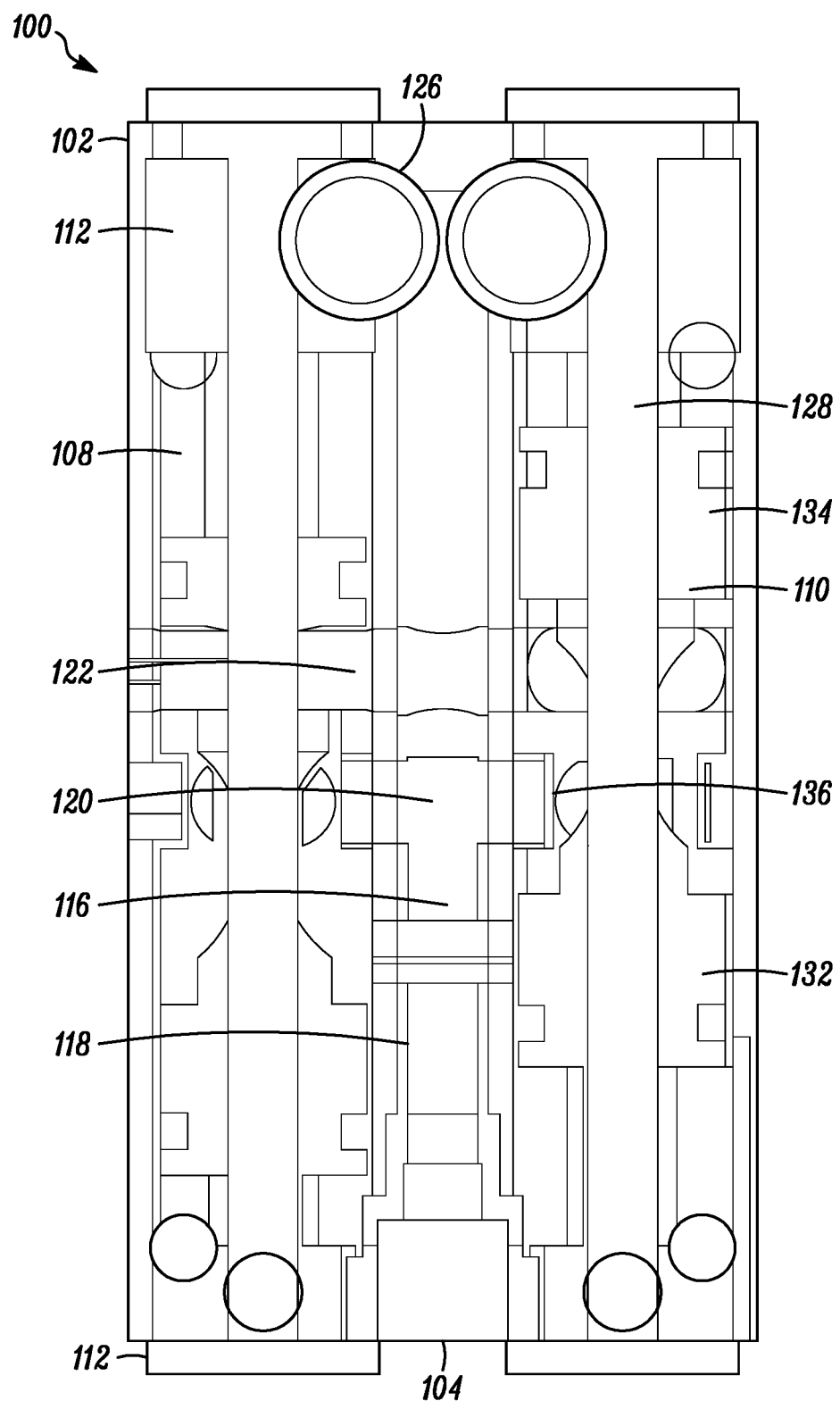
FIG. 2B is a partially transparent rear plan view of the manifold of FIG. 2A.

FIG. 2A is a perspective view of a partially transparent front, top, and left side of a manifold 100, for example, similar to the manifold 16 of FIGS. 1A-1B. FIG. 2B is a partially transparent rear plan view of the manifold 100. The manifold 100 includes a housing 102 configured to at least partially enclose components of the manifold 100 of FIG. 2A. The housing 102 defines a manifold inlet 104 (FIG. 2B), configured to receive a first fluid (e.g. water, oil, or any other fluid) from a supply line (not shown) and a manifold outlet 106 (FIG. 2A) configured to output the first fluid from the manifold 100. The supply line may include a toilet supply line or any other liquid source. The manifold inlet 104 and the manifold outlet 106 are defined in a bottom surface of the housing 102. In other embodiments, the manifold inlet 104 and the manifold outlet 106 be located in a top, front, rear, or any other surface of the manifold 100. The manifold 100 is shaped as a rectangular prism but in other embodiments may have any other prismatic or amorphous shape and may include any number of exterior surfaces. In embodiments in which the manifold 100 is in fluid communication with a toilet flush valve, the housing 102 may be coupled to an interior surface of a toilet tank (not shown) using rivets, screws, adhesive, or any other means of attachment. The housing 102 and the manifold 100 may be retrofit to existing toilets of any type to replace original flushing mechanisms. In other embodiments, the housing 102 and the manifold 100 may be originally manufactured with toilets of any type.

The manifold inlet 104 and the manifold outlet 106 each include a series of three round concentric recesses, where a diameter of a recess closest to an exterior surface of the housing 102 is greater than a diameter of a recess farthest from the exterior surface of the housing 102. In this configuration, the concentric recesses of the manifold inlet 104 and the manifold outlet 106 function as a female connector to couple a male fluid line (e.g. a hose) to the manifold inlet 104 or the manifold outlet 106. In other embodiments, the manifold inlet 104 and the manifold outlet 106 may include any number of concentric recesses having any shape (e.g. oblong or rectangular), width, or depth. In other embodiments, the manifold inlet 104 and the manifold outlet 106 may include barbs or any other suitable structure functioning as a female connector. In yet other embodiments, a fluid line may be coupled to the manifold inlet 104 or the manifold outlet 106 using fasteners, adhesive, threads, or any other suitable means.

The housing 102 defines two piston cavities 108. A piston 110 is moveable within each piston cavity 108 between an open position and a closed position. The piston cavities 108 include the same features unless otherwise described, and the pistons 110 include the same features unless otherwise described. For clarity, only the features and functionality of one piston cavity 108 and one piston 110 are described here. The piston cavity 108 and the piston 110 have a vertical orientation relative to the housing 102 but in other embodiments may have a horizontal, diagonal, or any other orientation relative to the housing 102. The piston cavity 108 and the piston 110 are illustrated as round cylinders but may have a square, a rectangular, or any other shape. The piston 110 may have any length, diameter, and height. The diameter of the piston 110 may vary along the length of the piston 110.

Two end caps 112 are disposed in the piston cavity 108. The end caps 112 are configured to seal the piston cavity 108 from an exterior of the housing 102. The end caps 112 may each include one or more O-rings disposed between the end caps 112 and an interior surface of the piston cavity 108. Each of the end caps 112 includes an interior channel 114 in fluid communication with an end of the piston 110.

A supply conduit 116 is configured to control the first fluid and is defined by the housing 102. The supply conduit 116 is configured to receive the first fluid from the manifold inlet 104 and to output the first fluid to the manifold outlet 106. The supply conduit 116 includes an inlet channel 118 (FIG. 2B), the piston cavity 108, and an outlet channel 120. The inlet channel 118 is in fluid communication with the manifold inlet 104. The outlet channel 120 is in fluid communication with the manifold outlet 106. The inlet channel 118 includes an inlet T-channel 122 (FIG. 2B) in fluid communication with both piston cavities 108. The outlet channel 120 includes an outlet T-channel 124 (FIG. 2A) in fluid communication with both piston cavities 108.

The manifold 100 includes two valves 126, where each valve 126 is configured to move one of the pistons 110 between the open and closed positions. The manifold 100 also includes two piston channels 128 and two release channels 130. The valves 126, piston channels 128, and release channels 130 include similar features respectively except as otherwise described. For clarity, the features and functionality of one valve 126, one piston channel 128, and one release channel 130 are described here. In embodiments of the manifold 100 having more than two pistons 110 and piston cavities 108, the manifold may include a valve 126, a piston channel 128, and a release channel 130 corresponding to each piston 110.

The valve 126 is in fluid communication with the supply conduit 116. One end of the piston channel 128 is in fluid communication with the valve 126 and an opposing end of the piston channel 128 is in fluid communication with the interior channel 114 of an end cap 112 disposed in a bottom end of the piston cavity 108. The interior channel 114 of the end cap 112 disposed in the bottom end of the piston cavity 108 is in fluid communication with a first end 132 of the piston 110. The valve 126 is moveable between an open position and a closed position. While the valve 126 is in the closed position, the valve 126 directs the first fluid from the inlet channel 118, through an interior channel 114 of an end cap 112 disposed at a top end of the piston cavity 108, and to a second end 134 of the piston 110 to move the piston 110 to the closed position. While the valve 126 is in the open position, the valve 126 directs the first fluid from the inlet channel 118, through the piston channel 128, through the interior channel 114 of the end cap 112 disposed in the bottom end of the piston cavity 108, and to the first end 132 of the piston 110 to move the piston 110 to the open position.

When the piston 110 moves from the open position to the closed position, the first fluid in the piston cavity 108 near the first end 132 of the piston 110 flows back through the interior channel 114 of the end cap 112 disposed in the bottom end of the piston cavity 108 and into the piston channel 128. This first fluid then flows through the release channel 130. The release channel 130 is in fluid communication with the valve 126 at one end and is in fluid communication with an exterior of the manifold 100 at the other end. The first fluid flowing through the release channel 130 is vented to an exterior of the manifold 100. The end of the release channel 130 in fluid communication with the exterior of the manifold 100 is defined in a bottom surface of the housing 102, but in other embodiments the end of the release channel 130 can be defined in any other surface of the housing 102.

While the piston 110 is in the open position, the manifold inlet 104 and the inlet channel 118 are in fluid communication with the outlet channel 120 and the manifold outlet 106 via the piston cavity 108. When the piston 110 is in the closed position, the piston 110 prevents fluid communication between the manifold inlet 104 and the manifold outlet 106 via the piston cavity 108.

The manifold 100 includes two damping conduits 136 configured to control movement of a second fluid (e.g. oil or another suitable hydraulic fluid) that differs from and is not in fluid communication with the first fluid. The damping conduits 136 include similar features except as otherwise described. For clarity, the features and functionality of one damping conduit 136 are described here. In embodiments of the manifold 100 having more than two pistons 110, the manifold 100 may include a damping conduit 136 corresponding to each piston 110. A damping conduit 136 is in fluid communication with the first end 132 and the second end 134 of the piston 110. The damping conduit 136 includes an adjustable flow regulator 138 (FIG. 4) configured to control a speed of movement of the piston 110 from the open position to the closed position.

Figure 2C:
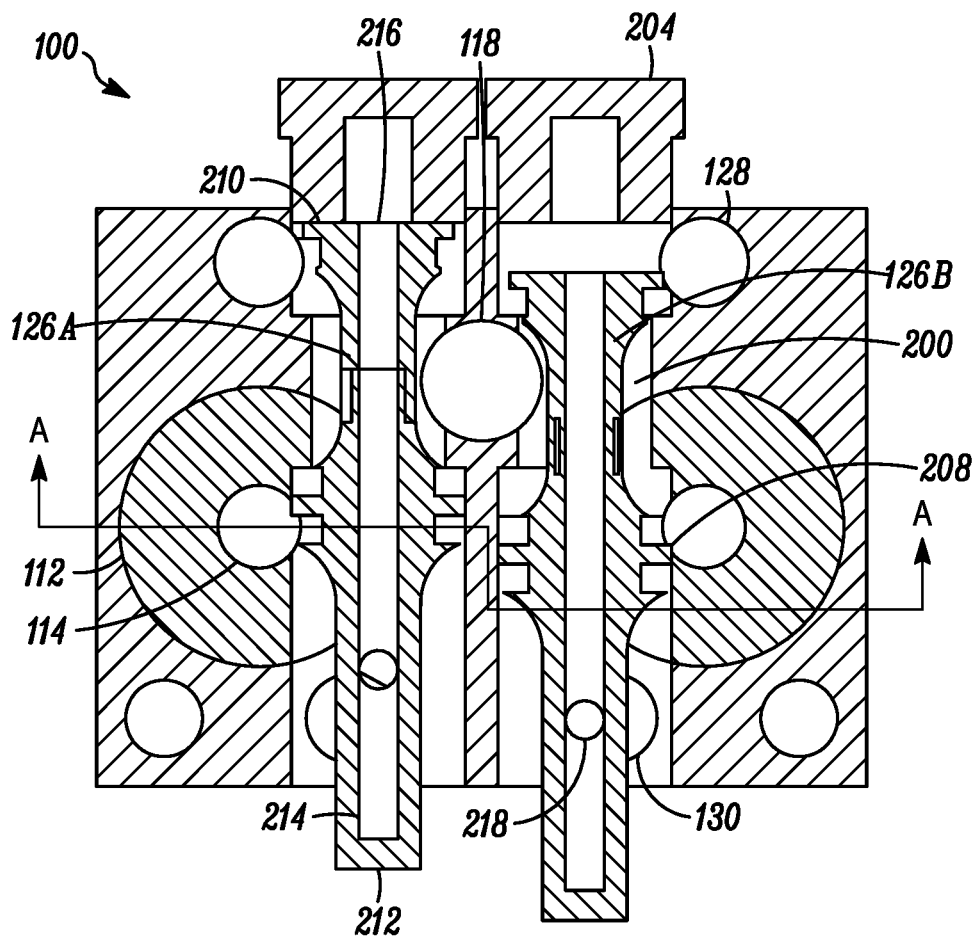
FIG. 2C is a top cross-sectional view of the manifold of FIGS. 2A-2B.

FIG. 2C is a top cross-sectional view of the manifold 100 of FIGS. 2A-2B showing the valves 126A and 126B. The valves 126A and 126B will be described as valve 126 unless differences are otherwise described. The valve 126 is disposed in a valve cavity 200. One valve 126A is shown in the open position and another other valve 126B is shown in the closed position. The valve 126 includes a valve stop 204. The valve stop 204 can include a spring (not shown) or other mechanism coupled to the valve stop 204 that is configured to hold the valve 126 in the closed position. The valve 126 includes a first flange 208 extending around a middle portion of the valve 126 and a second flange 210 extending around an end portion of the valve 126. The first flange 208 and the second flange 210 are configured to seal the first fluid inside the valve cavity 200 between the first flange 208 and the second flange 210. The valve cavity 200 is in fluid communication with the interior channel 114 of the end cap 112 disposed in the top end of the piston cavity 108, with the piston channel 128, and with the release channel 130.

In operation, the first fluid flows from the supply line into the manifold inlet 104. The first fluid then flows up the inlet channel 118 into the valve cavity 200. While the valve 126 is in the closed position, the first flange 208 and the second flange 210 of the valve 126 direct the first fluid to flow from the inlet channel 118, through the valve cavity 200, and into the interior channel 114 of the end cap 112 disposed in the top end of the piston cavity 108 to move the piston 110 into the closed position. In the closed position of the valve 126, the second flange 210 of the valve 126 prevents the first fluid from flowing into the piston channel 128. When the valve 126 is in the open position, the first flange 208 and the second flange 210 of the valve 126 direct the first fluid to flow from the inlet channel 118, through the valve cavity 200, and into the piston channel 128 to move the piston 110 to the open position. In the open position of the valve 126, the first flange 208 of the valve 126 prevents the first fluid from flowing into the interior channel 114 of the end cap 112.

When the valve 126 moves from the open position to the closed position, the first fluid may flow from the portion of the piston cavity 108 near the first end 132 of the piston 110, through the piston channel 128, and back into the valve cavity 200. The first fluid flowing back into the valve cavity 200 flows through the valve 126 by flowing through a valve interior channel 214 defined by the valve 126. The valve interior channel 214 includes an input opening 216 defined by an end of the valve 126 an output opening 218 defined by a bottom surface of the valve 126. The first fluid flows into the input opening 216, through the valve interior channel 214, and out of the output opening 218. The output opening 218 is in fluid communication with the release channel 130. The first fluid flowing out of the output opening 218 flows through the release channel 130 and to the exterior of the manifold 100.

The valve 126 may be selectively moved from the closed position to the open position in response to a selective force applied to an end portion 212 of the valve 126 by a user. The end portion 212 extends out of the housing 102. In embodiments where the manifold outlet 106 is in fluid communication with a toilet flush valve, the user may selectively actuate one of the valves 126 to initiate a particular type or volume of toilet flush. As later described with respect to FIG. 4, the movement speed of each of the pistons 110 can be independently adjusted to allow different volumes of first fluid to flow from the manifold inlet 104 to the manifold outlet 106. For example, actuation of one valve by the user may initiate a "low-flow" flush suitable to remove liquid waste from a toilet bowl and actuation of another valve by the user may initiate a "high-flow" flush suitable to remove solid waste from a toilet bowl.

Figure 3:
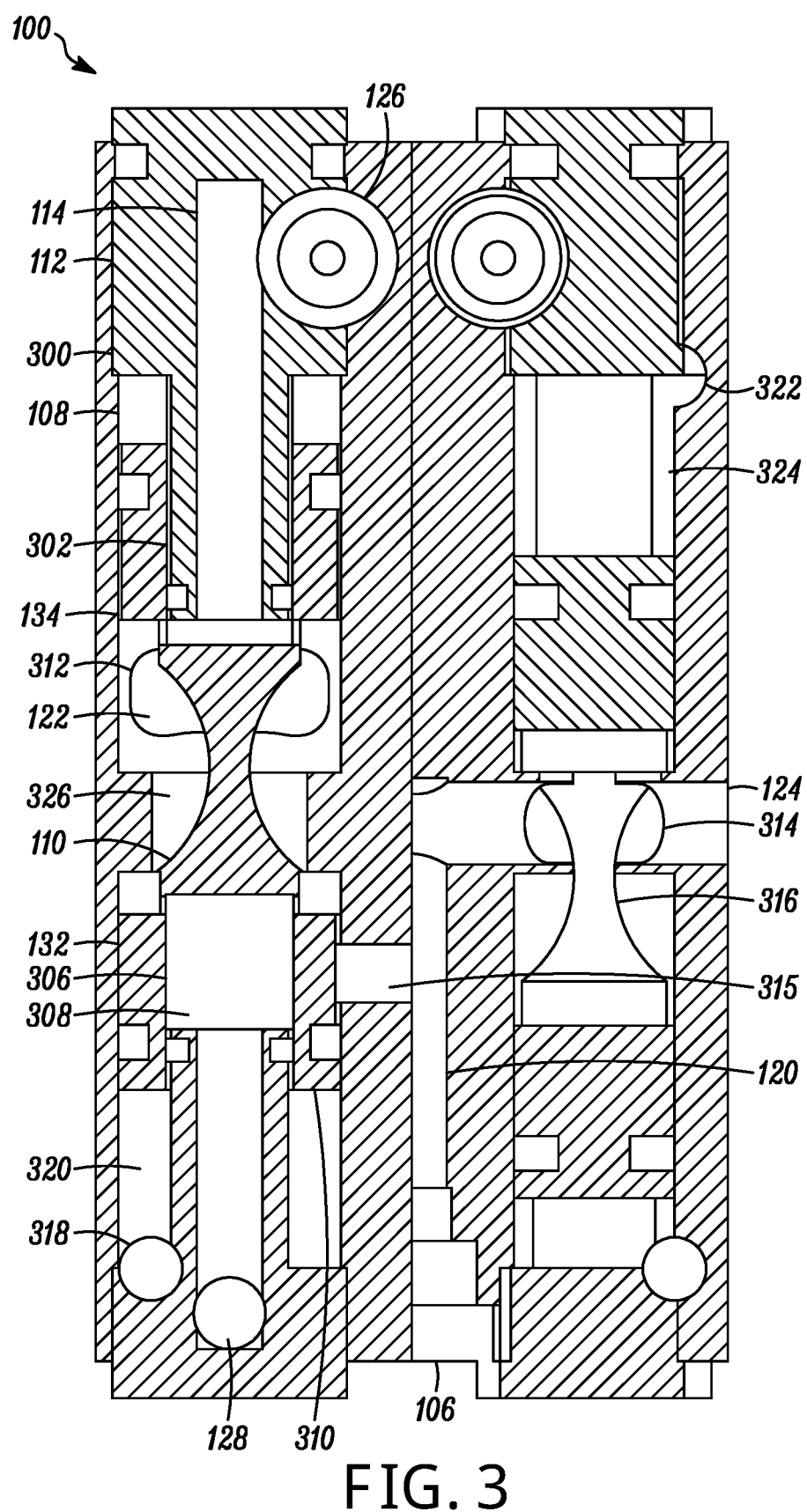
FIG. 3 is a partially transparent front cross-sectional view of the manifold of FIGS. 2A-2C taken along line A-A in FIG. 2C.

FIG. 3 is a partially transparent front cross-sectional view of the manifold 100 of FIGS. 2A-2B taken along line A-A in FIG. 2C. Each of the end caps 112 includes a sealing portion 300 and a piston engagement portion 302. The sealing portion 300 has a diameter greater than a diameter of the piston engagement portion 302. An exterior surface of the sealing portion 300 is configured to engage an interior surface of the piston cavity 108 to seal the piston cavity 108 from the exterior of the manifold 100. The sealing portion 300 may include an annular recess configured to receive an O-ring or other gasket to further seal the piston cavity 108 from the exterior of the manifold 100.

The piston engagement portion 302 extends from the sealing portion 300 and is configured to slidably engage an interior surface 306 of the first end 132 or the second end 134 of the piston 110. Each interior surface 306 defines a recess 308 in the first end 132 or the second end 134 of the piston 110 configured to receive the piston engagement portion 302. The piston engagement portion 302 includes an exterior profile shaped to correspond to an interior profile of the recess 308. An exterior surface of the piston engagement portion 302 is configured to slidably engage the interior surface 306 so as to seal the interior surface 306 from an exterior surface 310 of the piston 110 and to seal the recess 308 from the piston cavity 108. An end of the piston engagement portion 302 may include an annular recess configured to receive an O-ring or other gasket to further seal the interior surface 306 from the exterior surface 310. The piston cavity 108 and the piston 110 are sized and shaped so that as the piston engagement portion 302 slidably engages the interior surface 306, the piston engagement portion 302 does not completely exit the recess 308. In this configuration, the interior surface 306 remains sealed from the exterior surface 310 of the piston 110 while the piston 110 moves between the open and closed positions.

When the valve 126 is in the closed position, the first fluid flows through the valve cavity 200 and into the interior channel 114 of the end cap 112 disposed in the top end of the second piston cavity 108 as described with respect to FIG. 2C. The first fluid inside the interior channel 114 contacts the interior surface 306 of the first end 132 of the piston 110 and moves the piston 110 into the closed position. In this position, the second end 134 of the piston 110 blocks an inlet aperture 312, which provides fluid communication between the inlet T-channel 122 and the piston cavity 108. While the inlet aperture 312 is blocked, the first fluid cannot flow from the inlet T-channel 122, through the piston cavity 108, and to the outlet T-channel 124.

When the valve 126 is moved to the open position, the first fluid flows through the valve cavity 200, through the piston channel 128, and into the interior channel 114 of the end cap 112 disposed in the bottom end of the piston cavity 108 as described with respect to FIG. 2C. The first fluid inside the interior channel 114 contacts the interior surface 306 of the first end 132 of the piston 110 and moves the piston 110 from the closed position to the open position. In the open position, the second end 134 of the piston 110 does not block the inlet aperture 312. In this position, the first fluid flows from the inlet T-channel 122, through the inlet aperture 312, and into the piston cavity 108. The first fluid flows out of the piston cavity 108 via an outlet aperture 314. The first fluid flows from the piston cavity 108, through the outlet aperture 314, through the outlet T-channel 124 and the outlet channel 120, and to the manifold outlet 106.

A drainage channel 315 is in fluid communication with both piston cavities 108 and with the exterior of the manifold 100. When the piston 110 is in the open position, the first end 132 of the piston 110 prevents the first fluid from flowing from the piston cavity 108 into the drainage channel 315. When the piston 110 is in the closed position, first fluid remaining in the piston cavity 108 between the first end 132 and the second end 134 of the piston 110 flows through the drainage channel 315 to the exterior of the manifold 100. Both ends of the drainage channel 315 in fluid communication with the exterior of the manifold 100 are defined by opposing sides of the housing 102, but in other embodiments the ends of the drainage channel 315 may be defined by any other side of the housing 102.

The piston 110 includes a middle portion 316 extending between the first end 132 and the second end 134. The middle portion 316 has a concave exterior surface configured to direct flow of the first fluid from the inlet aperture 312, through the piston cavity 108, and into the outlet aperture 314. For example, the middle portion 316 may include an hourglass-like shape in which the ends of the middle portion 316 have a diameter greater than a diameter of a center section of the middle portion 316. Each end of the middle portion 316 may be adjacent to one of the inlet apertures 312 or the outlet aperture 314.

A first end 318 of the damping conduit 136 is in fluid communication with a first portion 320 of the piston cavity 108 defined by the sealing portion 300 of the end cap 112 disposed in the bottom end of the piston cavity 108, the first end 132 of the piston 110, and an interior surface of the piston cavity 108. A second end 322 of the damping conduit 136 is in fluid communication with a second portion 324 of the piston cavity 108 defined by the sealing portion 300 of the end cap 112 disposed in the top end of the piston cavity 108, the second end 134 of the piston 110, and the interior surface of the piston cavity 108. The first end 132 and the second end 134 of the piston 110 may include an annular recess configured to receive an O-ring or any other gasket suitable to seal the first portion 320 and the second portion 324 of the piston cavity 108 from a third portion 326 of the piston cavity. The third portion 326 of the piston cavity 108 is in fluid communication with the inlet aperture 312 and the outlet aperture 314 and extends between the first end 132 and the second end 134 of the piston 110. In this configuration, the first fluid flowing from the inlet aperture 312, through the third portion 326 of the piston cavity 108, and to the outlet aperture 314 is not in fluid communication with the second fluid flowing into the first portion 320 and the second portion 324 of the piston cavity 108 from the damping conduit 136.

Figure 4:
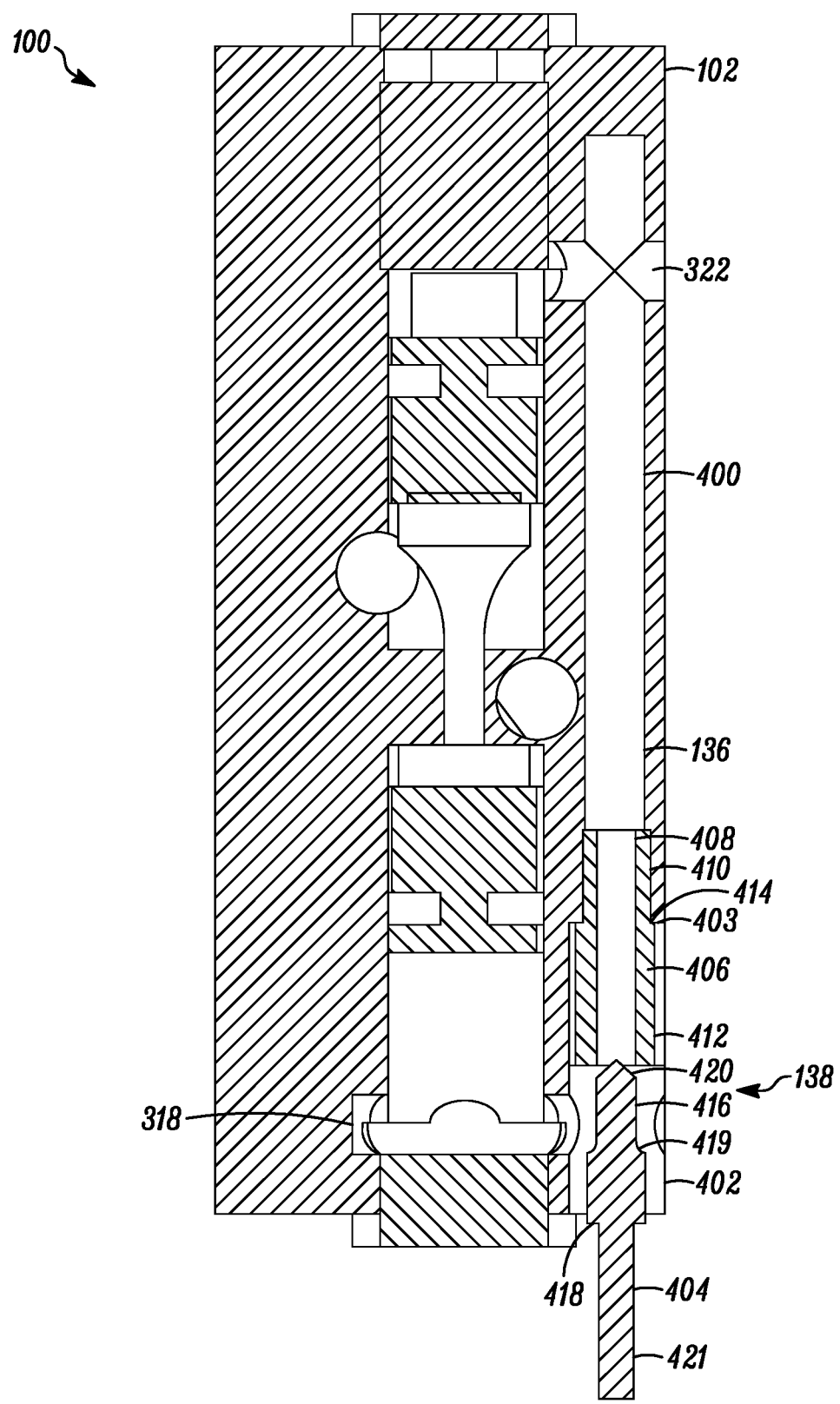
FIG. 4 is a partially transparent side cross-sectional view of the manifold of FIGS. 2A-3.

FIG. 4 is a partially transparent side cross-sectional view of the manifold 100 of FIGS. 2A-3. The adjustable flow regulator 138 is disposed inside the damping conduit 136. The damping conduit 136 includes a first section 400 and a second section 402, where the second section 402 has a greater diameter than the first section 400. The damping conduit 136 also includes a shoulder 403 between the first section 400 and the second section 402. The adjustable flow regulator 138 includes a stem 404 and a body 406.

The body 406 defines an interior channel 408 extending through the body 406. The body 406 includes a first body portion 410 and a second body portion 412, where the second body portion 412 has a diameter greater than a diameter of the first body portion 410. The body 406 also includes a shoulder 414 between the first body portion 410 and the second body portion 412 that extends around a periphery of the body 406. The shoulder 414 is located approximately halfway along the length of the body 406, but in other embodiments may be located at any position along the length of the body 406. An exterior profile of the first body portion 410 is shaped and sized to correspond with an interior profile of the first section 400 of the damping conduit 136 such that the first body portion 410 may be disposed inside the first section 400. An exterior profile of the second body portion 412 is shaped and sized to correspond with an interior profile of the second section 402 of the damping conduit 136 such that the second body portion 412 may be disposed inside the second section 402 of the damping conduit 136. The shoulder 414 of the body 406 is configured to contact the shoulder 403 of the damping conduit 136 such that the second body portion 412 cannot move from the first section 400 to the second section 402 of the damping conduit 136.

Figure 5:
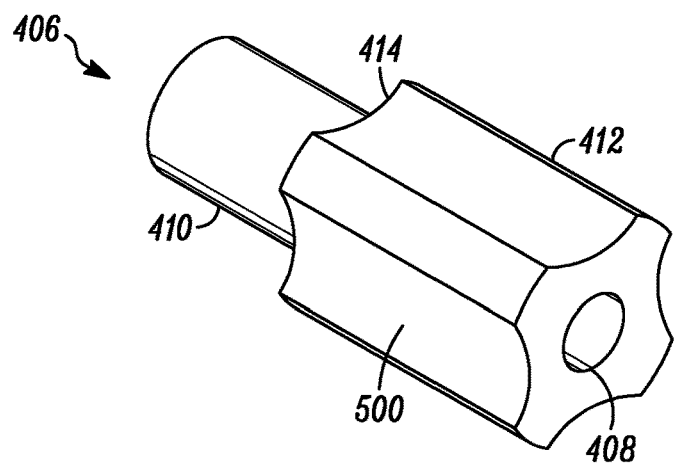
FIG. 5 is a perspective view of a top, right, and front side of a body of an adjustable flow regulator.

FIG. 5 is a perspective view of a top, right, and front side of the body 406. An exterior surface of the second body portion 412 defines grooves 500 extending along a length of the second body portion 412. The grooves 500 include a rounded, concave profile but in other embodiments may include a rectangular, triangular, or any other suitable profile.

Referring back to FIG. 4, the stem 404 includes a first stem section 416 extending from a second stem section 418, where the second stem section 418 has a diameter greater than the first stem section 416. The first stem section 416 includes an end 420 opposite the second stem section 418 having a tapered profile. The first stem section 416 has an exterior profile shaped and sized to correspond to an interior profile of the interior channel 408 of the body 406 such that the first stem section 416 can be inserted into the interior channel 408 of the body 406. The stem 404 includes a shoulder 419 between the first stem section 416 and the second stem section 418 having a concave exterior surface. The stem 404 includes a handle 421 extending from the second stem section 418 in a direction opposite the first stem section 416. The second stem section 418 or the handle 421 may be coupled to the housing 102 via a threaded connection, interference fit, or any other suitable means. A position of the stem 404 within the second section 402 of the damping conduit 136 is configured to be adjustable using the handle 421. In this configuration, a distance between the end 420 of the first stem section 416 and the interior channel 408 of the body 406 is adjustable. For example, if the second stem section 418 is coupled to the housing 102 via a threaded connection, a user may reduce the distance between the end 420 of the first stem section 416 and the interior channel 408 of the body 406 by screwing the stem 404 into the housing 102. The user may also increase the distance between the end 420 of the first stem section 416 and the interior channel 408 of the body 406 by unscrewing the stem 404 from the housing 102. By adjusting the distance between the end 420 of the first stem section 416 and the interior channel 408 of the body 406, the flow rate of the second fluid flowing through the interior channel 408 can be controlled.

When the piston 110 is moved from the closed position to the open position, the second fluid flows from the second portion 324 (FIG. 3) of the piston cavity 108 and through the damping conduit 136 until the second fluid contacts the first body portion 410 of the body 406. When the second fluid contacts the first body portion 410, the second fluid moves the body 406 through the damping conduit 136 such that the second body portion 412 and at least a portion of the first body portion 410 are disposed in the second section 402 of the damping conduit 136. The shoulder 414 of the body 406 also moves out of contact with the shoulder 403 of the damping conduit 136. In response to the shoulder 414 of the body 406 moving out of contact with the shoulder 403 of the damping conduit 136, the second fluid flows through the damping conduit 136 and past the body 406 by flowing through the grooves 500 defined in the second body portion 412. The second fluid then flows through a remainder of the damping conduit 136 and into the first portion 320 of the piston cavity 108. By allowing the second fluid to bypass the body 406 while flowing through the damping conduit 136 from the second portion 324 of the piston cavity 108 to the first portion 320 of the piston cavity 108, the second fluid provides negligible resistance to movement of the piston 110 from the closed position to the open position.

When the piston 110 is moved from the open position to the closed position, the second fluid flows from the first portion 320 of the piston cavity 108 and through the damping conduit 136 until the second fluid contacts the concave surface of the shoulder 419 of the stem 404. The concave surface of the shoulder 419 directs the second fluid through a space between the end 420 of the first stem section 416 and the second body portion 412. The second fluid flowing through this space contacts the second body portion 412 of the body 406 and moves the body 406 through the damping conduit 136 until the shoulder 414 of the body 406 contacts the shoulder 403 of the damping conduit 136. In this position, the shoulder 403 of the damping conduit 136 prevents the second fluid from flowing through the grooves 500 defined by the second body portion 412. The second fluid therefore flows through the interior channel 408 of the body 406, through the remainder of the damping conduit 136, and into the second portion 324 of the piston cavity 108. By adjusting the space between the end 420 of the first stem section 416 and the interior channel 408 (e.g. using the handle 421 of the stem 404) the user can control the flow rate of the second fluid flowing from the first portion 320 of the piston cavity 108 to the second portion 324 of the first piston cavity 108. Control of the flow rate of the second fluid in the damping conduit 136 controls a speed of movement of the piston 110 from the open position to the closed position. By controlling how fast the piston 110 moves from the open position to the closed position, the volume of first fluid allowed to flow from the inlet channel 118, through the third portion 326 of the piston cavity 108, and into the outlet channel 120 may be controlled.

The space between the end 420 of the first stem section 416 and the interior channel 408 in each of the two damping conduits 136 of the manifold 100 may be independently controlled using the handles 421 of the stems 404 disposed in each damping conduit 136. As a result, the volume of water output by the manifold 100 may vary depending on which valve 126 and piston 110 are used to complete a flush cycle.

Figure 6:
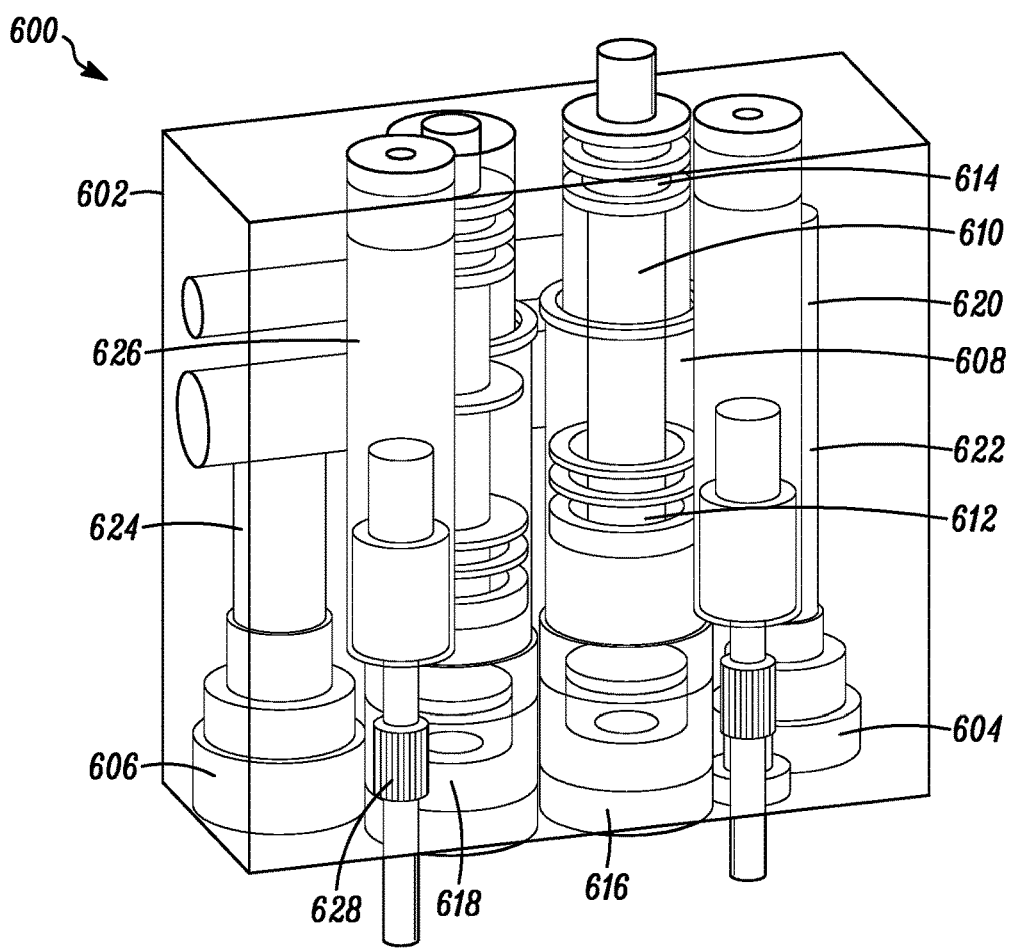
FIG. 6 is a perspective view of a partially transparent top, front, and right side of another manifold.

FIG. 6 is a perspective view of a partially transparent top, front, and right sides of another manifold 600. The manifold 600 includes features similar to those of the manifold 100 except as otherwise described. The manifold 600 includes a housing 602 configured to at least partially enclose components of the manifold 600. The housing 602 defines a manifold inlet 604 configured to receive the first fluid from the supply line, and a manifold outlet 606 configured to output the first fluid from the manifold 600. The manifold inlet 604 and the manifold outlet 606 are defined in a bottom surface of the housing 602. In other embodiments, the manifold inlet 604 and the manifold outlet 606 may each be defined in a top, front, rear, or other surface of the manifold 600. The manifold 600 is shaped as a rectangular prism but may have any other prismatic or amorphous shape and may include any number of exterior surfaces.

The manifold inlet 604 and the manifold outlet 606 each include a series of three round concentric recesses having features similar to those of the concentric recesses described with respect to the manifold inlet 104 and the manifold outlet 106 of the manifold 100 of FIGS. 2A-5.

The housing 602 defines two piston cavities 608. A piston 610 is moveable within each piston cavity 608 between an open position and a closed position. The piston cavities 608 each include the same features and each of the pistons 610 include the same features unless otherwise described. For clarity, only the features and functionality of one piston cavity 608 and one piston 610 are described here. The piston cavity 608 and the piston 610 have a vertical orientation relative to the housing 602 but in other embodiments may have a horizontal, diagonal, or any other orientation relative to the housing 602. The piston cavity 608 and the piston 610 are illustrated as round cylinders but may have a square, rectangular, or any other shape. The piston 610 may have any length, diameter, and height. The diameter of the piston 610 may vary along the length of the piston 610.

The piston 610 includes a first end 612 disposed in the piston cavity 608 and a second end 614. When the piston 610 is in the closed position, the second end 614 of the piston 610 is disposed outside the piston cavity 608 and extends outside the housing 602. When the piston 610 is in the open position, at least a portion of the second end 614 is disposed inside the piston cavity 608.

An end cap 616 is disposed in a bottom end of the piston cavity 608 adjacent to the first end 612 of the piston 610. The end cap 616 is configured to seal the end of the piston cavity 608 from an exterior of the housing 602. The end cap 616 may include one or more O-rings or other gaskets disposed between the end caps 616 and an interior surface of the piston cavity 608. The end cap 616 includes an interior channel 618 in fluid communication with the first end 612 of the piston 610.

A supply conduit 620 is configured to control the first fluid and is defined by the housing 602. The supply conduit 620 is configured to receive the first fluid from the manifold inlet 604 and to output the first fluid to the manifold outlet 606. The supply conduit 620 includes an inlet channel 622 in fluid communication with the manifold inlet 604, the piston cavities 608, and an outlet channel 624 in fluid communication with the manifold outlet 606. The inlet channel 622 and the outlet channel 624 are in fluid communication with the piston cavities 608.

When the piston 610 is in the open position, the piston cavity 608 is in fluid communication with the inlet channel 622 and the outlet channel 624 such that the first fluid can flow from the inlet channel 622 to the outlet channel 624 through the piston cavity 608. When the piston 610 is in the closed position, the piston 610 prevents fluid communication between the piston cavity 608 and at least one of the inlet channel 622 or the outlet channel 624 such that the first fluid cannot flow from the inlet channel 622 to the outlet channel 624 through the piston cavity 608.

The manifold 600 includes two damping conduits 626 configured to control movement of the second fluid that is not in fluid communication with the first fluid. Each of the damping conduits 626 include similar features other except as otherwise described. For clarity, the features and functionality of one damping conduit 626 are described here. In embodiments of the manifold 600 having more than two pistons 610, the manifold 600 may include a damping conduit 626 corresponding to each piston 610. A damping conduit 626 is in fluid communication with the first end 612 of the piston 610. The damping conduit 626 includes an adjustable flow regulator 628 configured to control a speed of movement of the piston 610 from the open position to closed position.

Figure 7:
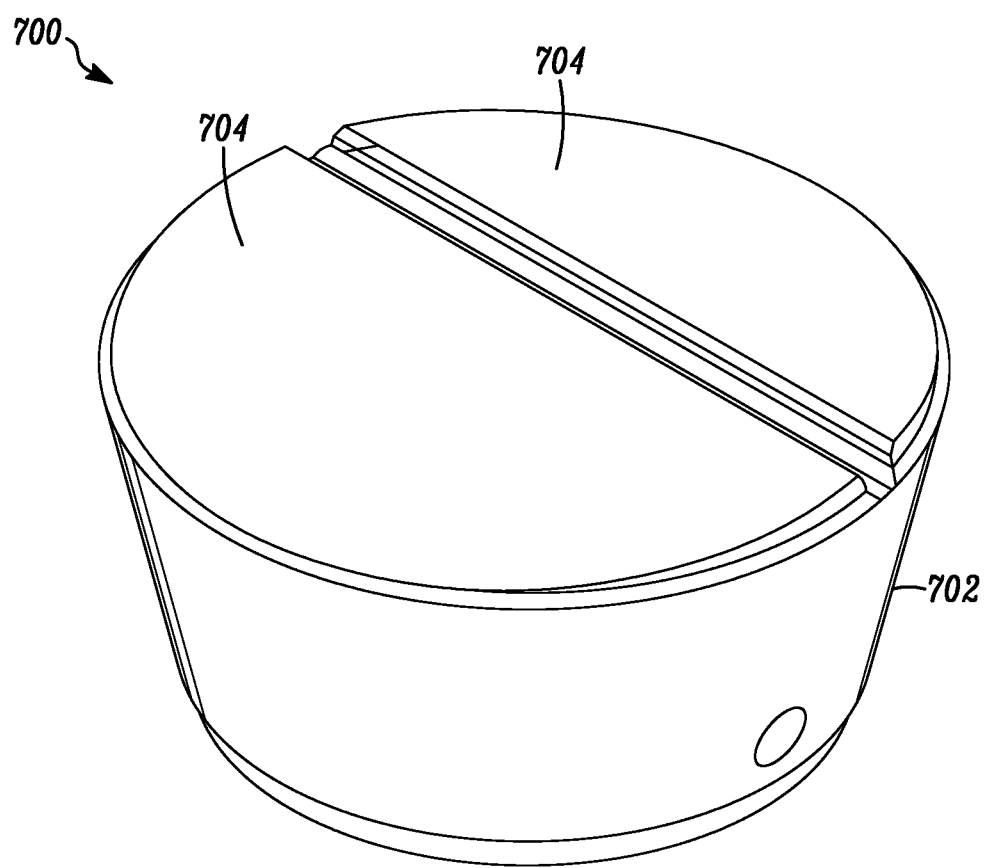
FIG. 7 is a top perspective view of a piston actuator of the manifold of FIG. 6.

FIG. 7 is a top perspective view of a piston actuator 700 of the manifold 600 of FIG. 6. The piston actuator 700 includes a button housing 702 and two buttons 704. Each of the buttons 704 include the same features unless otherwise described. For clarity, only the features and functionality of one button 704 are described here. The button housing 702 is coupled to a top surface of the housing 602 such that the second ends 614 of the pistons 610 are at least partially enclosed by the button housing 702. In other embodiments, the button housing 702 may be coupled to any surface of the housing 602. The button 704 has the shape of a semicircle but in other embodiments may have a circular shape or any other shape. The button housing 702 has a round shape but in other embodiments may have a rectangular or any other shape. The button 704 is disposed within the button housing 702 and is configured to move the piston 610 from the closed position to the open position. In response to being pressed by the user, the button 704 is configured to move relative to the button housing 702 to contact the second end 614 of the piston 610 to move the piston 610 from the closed position to the open position. For example, a bottom surface of the button 704 may directly contact the second end 614 of the piston 610 to move the piston 610 to the open position. In another example, the bottom end of the button 704 may indirectly contact the second end 614 of the piston 610 through an intermediate component (e.g. a spring, washer, shim, or any other component) to move the piston 610 to the open position. In another example, the button 704 may be a button, dial, or other switch configured to activate an electric motor that moves the piston 610 between the open and closed positions.

The two buttons 704 as shown in FIG. 7 are configured to move independently of each other and the button housing 702. In other embodiments, the buttons 704 may include other configurations. For example, the buttons 704 may include a single member rotating about a central point to operate as a toggle switch, where one end of the member moves one of the pistons 610 and another end of the member moves the other of the pistons 610. In embodiments of the manifold 600 including more than two pistons and piston cavities, the manifold 600 may include a button 704 corresponding to each piston 610.

In embodiments where the manifold outlet 606 is in fluid communication with a toilet flush valve, the user may selectively press one of the buttons 704 to initiate a particular toilet flush. The movement speed of each of the pistons 610 can be independently adjusted to facilitate different toilet flush volumes. For example, actuation of one button by the user may initiate a "low-flow" flush suitable to remove liquid waste from a toilet bowl and actuation of another button by the user may initiate a "high-flow" flush suitable to remove solid waste from a toilet bowl.

Figure 8:
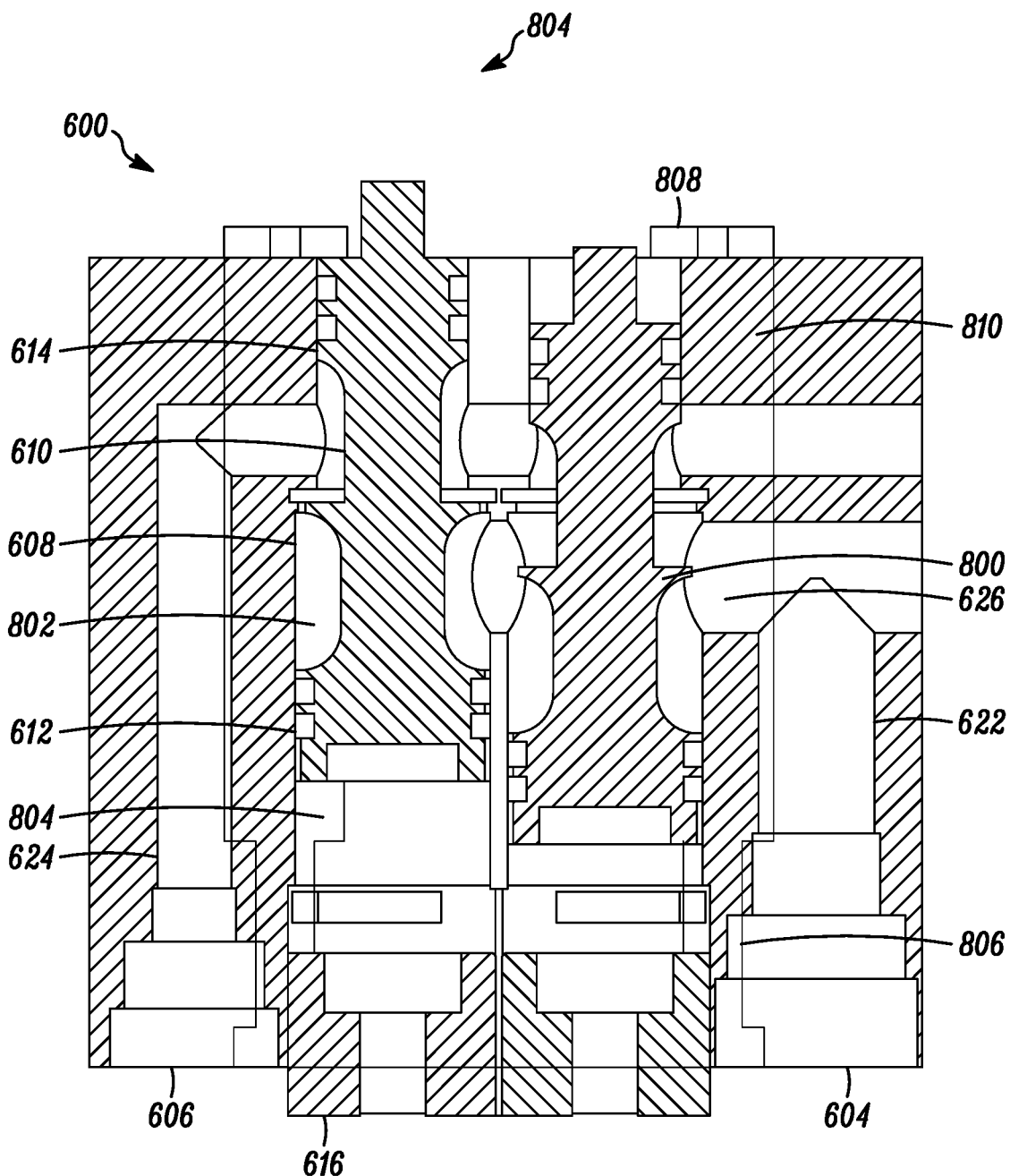
FIG. 8 is a partially transparent front cross-sectional view of the manifold of FIGS. 6-7.

FIG. 8 is a partially transparent front cross-sectional view of the manifold 600 of FIGS. 6-7. The second end 614 of the piston 610 may include one or more annular recesses configured to receive one or more O-rings or other gaskets to create a seal between the second end 614 of the piston 610 and an interior surface of the piston cavity 608. In this configuration, a top end of the piston cavity 608 remains sealed from an exterior of the manifold 600 while the piston 610 moves between the open and closed positions. The first end 612 of the piston 610 may include one or more annular recesses configured to receive one or more O-rings or other gaskets to create a seal between the first end 612 of the piston 610 and an interior surface of the piston cavity 608. In this configuration, a first portion 802 of the piston cavity 608 remains sealed from a second portion 804 of the piston cavity 608 while the piston 610 moves between the open and closed positions. The first portion 802 is defined by the first end 612 of the piston 610, the second end 614 of the piston 610, and an interior surface of the piston cavity 608. The second portion 804 is defined by the first end 612 of the piston 610, the end cap 616, and the interior surface of the piston cavity 608.

The piston 610 includes a flange 800 extending around a periphery of the piston 610. A top surface of the flange 800 is configured to contact an interior surface of the housing 602 adjacent to the outlet channel 624 to create a seal between the piston cavity 608 and the outlet channel 624 when the piston 610 is in the closed position. When the piston 610 is in the closed position, the piston cavity 608 is not in fluid communication with the outlet channel 624. The flange 800 is disposed around the piston 610 halfway along the length of the piston 610, but in other embodiments the flange 800 may be disposed around the piston 610 at any location along the length of the piston 610. In other embodiments, the flange 800 may be disposed on the piston 610 such that the flange 800 contacts the interior surface of the housing 602 to create a seal between the piston cavity 608 and the inlet channel 622 when the piston 610 is in the closed position.

When the piston 610 is in the open position, a bottom surface of the flange 800 is configured to contact an interior surface of the housing adjacent to the inlet channel 622. This contact creates a seal between a top half of the first portion 802 of the piston cavity 608 and a bottom half of the first portion 802 of the piston cavity 608. The top half of the first portion 802 is defined between the second end 614 of the piston 610 and the top surface of the flange 800. The bottom half of the first portion 802 is defined between the first end 612 of the piston 610 and the bottom surface of the flange 800. The flange 800 prevents fluid communication between the top half and the bottom half of the first portion 802 of the piston cavity 608 when the piston 610 is in the open position. When the piston 610 is in the open position, the top half of the first portion 802 of the piston cavity 608 is in fluid communication with the inlet channel 622 and the outlet channel 624 such that the first fluid may flow from the inlet channel 622 to the outlet channel 624 through the top half of the first portion 802 of the piston cavity 608.

In the illustrated, non-limiting example, one of the pistons 610 is in fluid communication with the inlet channel 622 downstream from the other piston 610. Each of the pistons 610 is configured to move between the open and closed positions independently of the other piston. For example, if an upstream piston 610 is in the closed position and the downstream piston 610 is in the open position, the first fluid flows from the manifold inlet 604, through the inlet channel 622, through the piston cavity 608 associated with the upstream piston 610, through the piston cavity 608 associated with the downstream piston 610, and into the outlet channel 624. If the downstream piston 610 is in the closed position and the upstream piston 610 is in the open position, the first fluid flows from the manifold inlet 604, through the inlet channel 622, into the piston cavity 608 associated with the upstream piston 610, and into the outlet channel 624.

A first end 806 of the damping conduit 626 is in fluid communication with the second portion 804 of the piston cavity 608. An end cap 808 is disposed in a second end 810 of the damping conduit 626. The end cap 808 includes an interior channel 812 in fluid communication with the damping conduit 626 and with the exterior of the manifold 600. When the piston 610 is moved from the closed position to the open position, the second fluid located in the second portion 804 of the piston cavity 608 flows from the second portion 804, through the first end 806 of the damping conduit 626, and into the damping conduit 626. When the piston 610 is moved from the open position to the closed position, suction created by the movement of the piston 610 causes the second fluid located in the damping conduit 626 to flow through the first end 806 and into the second portion 804 of the piston cavity 608.

Figure 9:
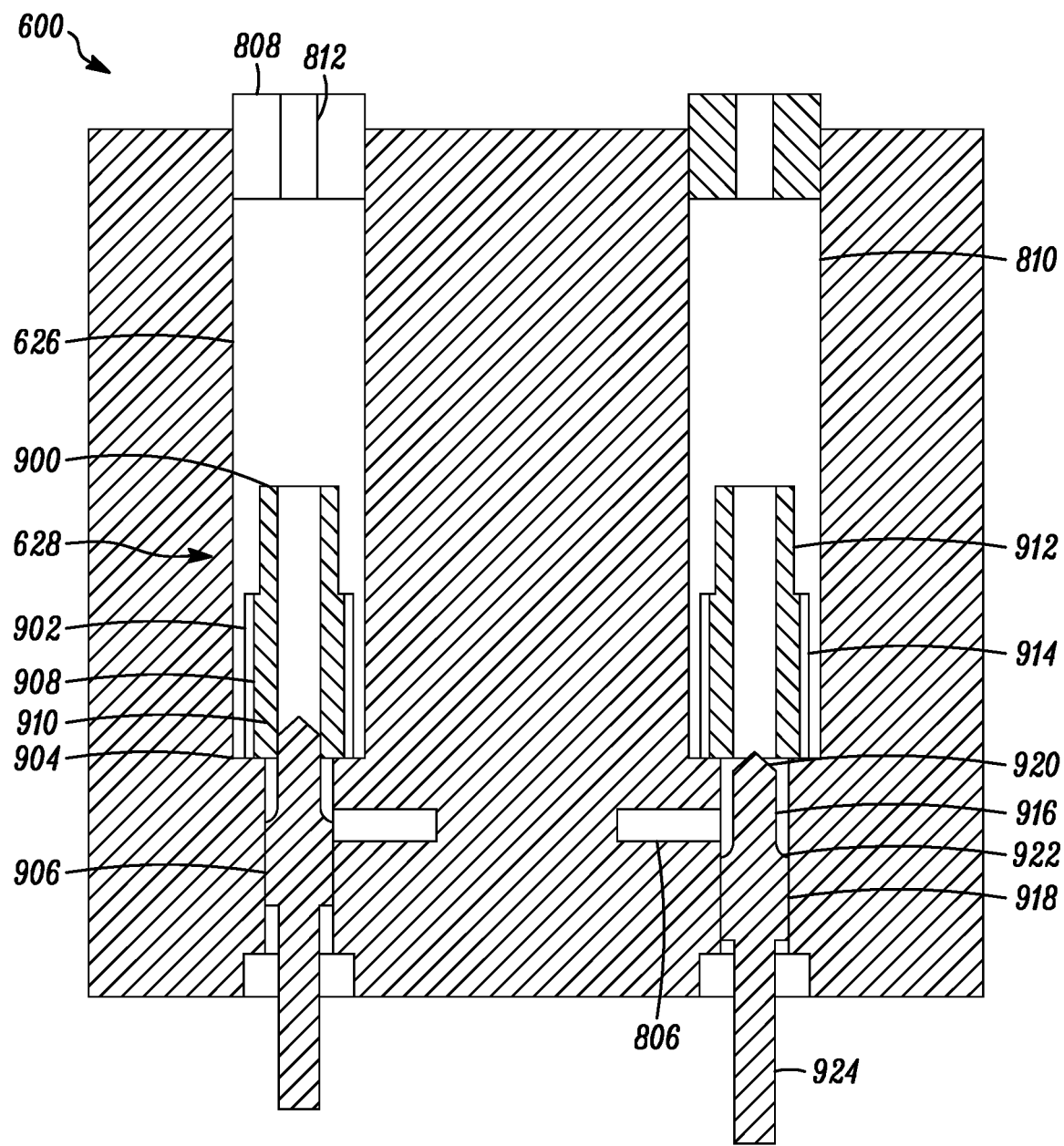
FIG. 9 is a front cross-sectional view of the manifold of FIGS. 6-8 showing damping conduits.

FIG. 9 is a front cross-sectional view of the manifold 600 of FIGS. 6-8 showing the damping conduits 626. The adjustable flow regulator 628 is disposed inside the damping conduit 626. The damping conduit 626 includes a first section 900 and a second section 902, where the second section 902 has a greater diameter than the first section 900. The damping conduit 626 also includes a shoulder 904 between the first section 900 and the second section 902. The adjustable flow regulator 628 includes a stem 906 having features similar to those of the stem 404 and a body 908 having features similar to those of the body 406.

The body 908 includes an interior channel 910 extending through the body 908. The body 908 includes a first body portion 912 and a second body portion 914, where the second body portion 914 has a diameter greater than a diameter of the first body portion 912. An exterior profile of the second body portion 914 is shaped and sized to correspond with an interior profile of the second section 902 of the damping conduit 626 such that the second body portion 914 may be disposed inside the second section 902. And end of the second body portion 914 is configured to contact the shoulder 904 of the damping conduit 626 such that the body 908 cannot move from the second section 902 to the first section 900 of the damping conduit 626.

The stem 906 includes a first stem section 916 extending from a second stem section 918, where the second stem section 918 has a diameter greater than the first stem section 916. The second stem section 918 is disposed in the first section 900 of the damping conduit 626 and has an exterior profile shaped and sized to correspond with an interior profile of the first section 900 of the damping conduit 626. The first stem section 916 includes an end 920 opposite the second stem section 918 having a tapered profile. The first stem section 916 has an exterior profile shaped and sized to correspond to the interior channel 910 of the body 908 such that the first stem section 916 can be inserted into the interior channel 910. The stem 906 includes a shoulder 922 between the first stem section 916 and the second stem section 918 having a concave exterior surface. The stem 906 includes a handle 924 extending from the second stem section 918 in a direction opposite the first stem section 916.

The second stem section 918 or the handle 924 may be coupled to the housing 602 via a threaded connection, interference fit, or any other suitable means of attachment. A position of the stem 906 within the first section 900 of the damping conduit 626 is configured to be adjustable using the handle 924. In this configuration, a distance between the end 920 of the first stem section 916 and the interior channel 910 of the body 908 is adjustable. For example, if the second stem section 918 is coupled to the housing 602 via a threaded connection, a user may reduce the distance between the end 920 of the first stem section 916 and the interior channel 910 of the body 908 by screwing the stem 906 into the housing 602. The user may also increase the distance between the end 920 of the first stem section 916 and the interior channel 910 of the body 908 by unscrewing the stem 906 from the housing 602. By adjusting the distance between the end 920 of the first stem section 916 and the interior channel 910 of the body 908, the flow rate of the second fluid flowing through the interior channel 910 can be controlled.

When the piston 610 is moved from the closed position to the open position, the second fluid flows from the first portion 802 of the piston cavity, through the first end 806 of the damping conduit, and into contact with the shoulder 922 of the stem 906. The concave exterior surface of the shoulder 922 directs the first fluid through the first section 900 of the damping conduit 626 until the second fluid contacts the second body portion 914. When the second fluid contacts the second body portion 914, the second fluid moves the body 908 up the damping conduit 626 such that the second body portion 914 moves out of contact with the shoulder 922 of the damping conduit 626. In response to the second body portion 914 moving out of contact with the shoulder 922 of the damping conduit 626, the second fluid flows through the first section 900 of the damping conduit 626 and past the body 908 by flowing through grooves defined in the second body portion 914 and/or by flowing through the interior channel 910. The grooves include features similar to those of the grooves 500 (FIG. 5). The second fluid then flows into the second section 902 of the damping conduit 626. By allowing the second fluid to bypass the body 908, second fluid provides negligible resistance to movement of the piston 610 from the closed position into the open position.

When the piston 610 is moved from the open position to the closed position, the second fluid flows from the second section 902 of the damping conduit 626 until the second fluid contacts the body 908 (e.g. by contacting the first body portion 912 and/or the second body portion 914). As a result of contacting the body 908, the second fluid moves the end of the second body portion 914 into contact with the shoulder 904 of the damping conduit 626. In this position, the shoulder 904 prevents the second fluid from flowing through the grooves defined in the second body portion 914. The second fluid therefore flows through the interior channel 910 of the body 908 into the first section 900 of the damping conduit 626. The second fluid flows through the first section 900 until the second fluid contacts the concave surface of the shoulder 922 of the stem 906. The concave surface of the shoulder 922 directs the second fluid through the first end 806 of the damping conduit 626 and into the first portion 802 of the piston cavity 608. By adjusting the space between the end 920 of the first stem section 916 and the interior channel 910 (e.g. using the handle 924 of the stem 906) the user can control the flow rate of the second fluid flowing from the second section 902 of the damping conduit 626 into the first portion 802 of the piston cavity 608. Control of the flow rate of the second fluid in the damping conduit 626 controls a speed of movement of the piston 610 from the open position to the closed position. By controlling how fast the piston 610 moves from the open position to the closed position, the volume of water allowed to flow from the inlet channel 622, through the second portion 804 of the piston cavity 608, and into the outlet channel 624 may be controlled.

The space between the end 920 of the first stem section 916 and the interior channel 910 in each of the two damping conduits 626 of the manifold 600 may be independently controlled using the handles 924 of the stem 906 disposed in each damping conduit 626. As a result, the volume of first fluid flowing from the manifold inlet 604 to the manifold outlet 606 through each piston cavity 608 may vary depending on which of the pistons 610 is moved to the open position.

Figure 10:
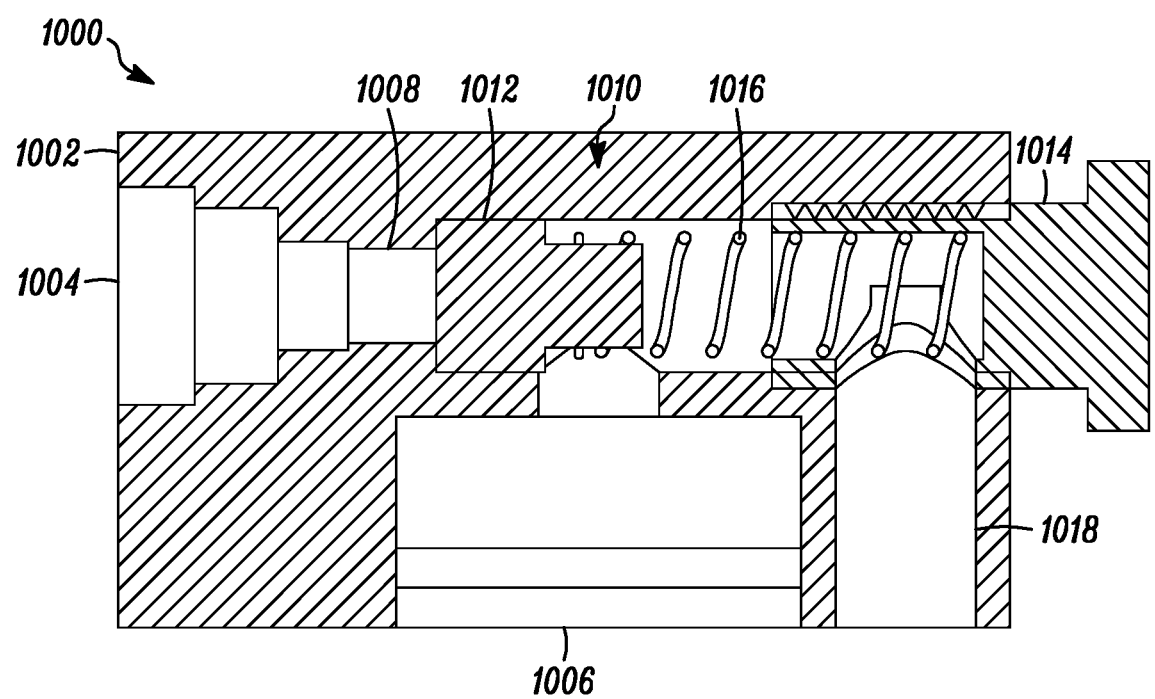
FIG. 10 is a side cross-sectional view of an activation valve.

FIG. 10 is a side cross-section view of an activation valve 1000. In embodiments in which a manifold is in fluid communication with a toilet flush valve, first fluid output by the manifold 100 of FIGS. 2A-5 or the manifold 600 of FIGS. 6-9 may flow through the activation valve 1000 and subsequently to the toilet flush valve. The activation valve 1000 includes a housing 1002 configured to at least partially enclose the components of the activation valve 1000. The housing 1002 defines a valve inlet 1004 configured to receive the first fluid from the manifold outlet 106 of FIGS. 2A-5 or the manifold outlet 606 of FIGS. 6-9. The valve inlet 1004 is defined in a side surface of the housing 1002 but may be defined by another surface of the housing 1002. The housing 1002 defines a valve outlet 1006 configured to output the first fluid from the activation valve 1000 to a toilet flush valve. The valve outlet 1006 is defined in a bottom surface of the housing 1002 but may be defined in another surface of the housing 1002. The valve outlet 1006 may be integral with a toilet flush valve inlet or may be in fluid communication with a toilet flush valve inlet via a fluid line. The housing 1002 may or may not be integral with the toilet flush valve. The valve inlet 1004 includes a series of three round concentric recesses and may include features similar to those of the manifold inlet 104 of FIGS. 2A-5 and the manifold outlet 106 of FIGS. 6-9.

The activation valve 1000 includes a valve inlet channel 1008 in fluid communication with the valve inlet 1004 and the valve outlet 1006. The valve inlet channel 1008 has a horizontal orientation but may include a vertical or any other orientation. A check valve 1010 is disposed in the valve inlet channel 1008 and is configured to supply the first fluid from the valve inlet 1004 to the valve outlet 1006 in response to receiving the first fluid from the manifold outlet 106 of FIGS. 2A-5 or the manifold outlet 606 of FIGS. 6-9. In the illustrated, non-limiting example, the check valve 1010 is a spring-loaded, in line check valve including a clapper 1012, a valve body 1014, and a spring 1016 disposed between the clapper 1012 and the valve body 1014. In other embodiments, the check valve 1010 may include a spring-loaded Y valve, a ball valve, a butterfly valve, or any other suitable check valve. The clapper 1012 is moveable between a closed position and an open position. In the closed position, the clapper 1012 prevents fluid communication between the valve inlet 1004 and the valve outlet 1006. When the clapper 1012 is in the open position, the valve inlet 1004 and the valve outlet 1006 are in fluid communication.

First fluid flowing into the valve inlet 1004 flows through the valve inlet channel 1008 until the first fluid contacts a first surface the clapper 1012. When the pressure of the first fluid against the clapper 1012 is greater than the force applied by the spring 1016 against a second surface of the clapper 1012, the clapper 1012 moves from the closed position to the open position. When the pressure of the first fluid against the clapper 1012 is no longer greater than the force applied to the clapper 1012 by the spring 1016, the spring 1016 moves the clapper 1012 back into the closed position.

The activation valve 1000 includes a valve drain channel 1018 in fluid communication with the valve inlet channel 1008 and with an exterior of the activation valve 1000 (e.g., a toilet tank). The valve drain channel 1018 is configured to allow first fluid remaining in the valve inlet channel 1008 after the clapper 1012 has moved from the open position to the closed position to flow to the exterior of the activation valve 1000.

Figure 11A:
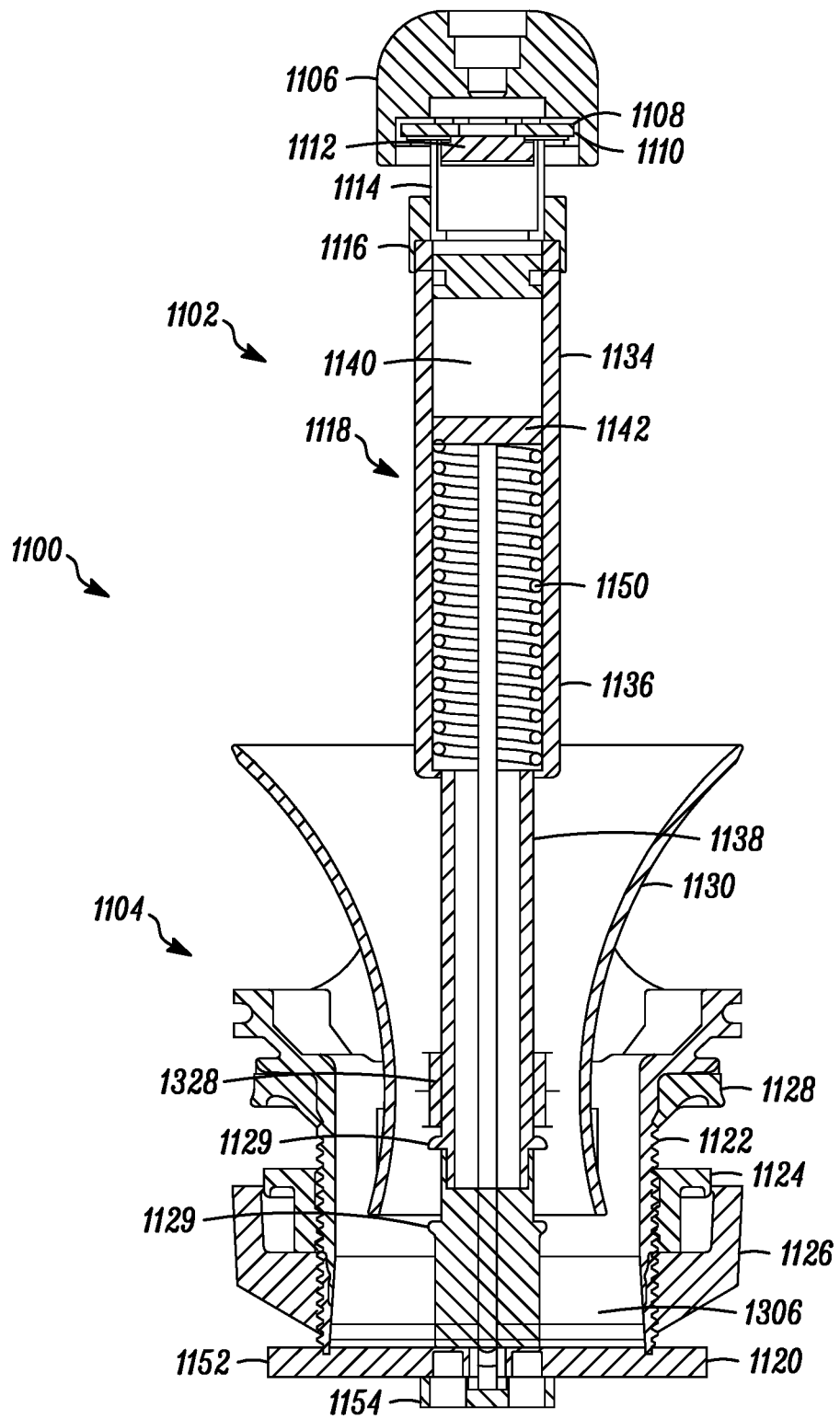
FIG. 11A is a partially transparent cross-sectional view of a flush valve.

FIG. 11A is a partially transparent cross-sectional view of a flush valve 1100 including a first valve portion 1102 and a second valve portion 1104. The first valve portion 1102 includes an upper housing 1106, a first washer 1108, a second washer 1110, a fluid guide 1112, a lower housing 1114, a connector 1116, a valve actuator 1118, and a control stop 1120. The second valve portion 1104 includes a lower body 1122, a lower lock ring 1124, a lower gasket 1126, an upper gasket 1128, and a venturi tube 1130. Pressurized fluid may be injected into the venturi tube 1130, the lower body 1122 (e.g., the second venturi), or both. The venturi tube 1130, the lower body 1122, or both may be free of receiving pressurized fluid (e.g., any fluid having a pressure greater than a head of the tank (e.g., tank of a toilet)). The venturi tube 1130, the lower body 1122, or both may only receive fluid with a head pressure, fluid from a tank, fluid that moved into an inlet of the venturi, or a combination thereof. For example, the venturi tube 1130, lower body 1122, or both may be free of receiving a fluid that has a pressure of 650 KPa, 500 KPa or less, 350 KPa or less, 175 KPa or less, 70 KPa or less, or 15 KPa or less. The venturi tube 1130 may only receive fluid at a pressure that is equal to the height of the fluid within the tank in which the venturi tube 1130 is located. The fluid configured to pass through the venturi tube 113 may be free of any pressurized fluid (e.g., fluid at a pressure of greater than a height of the fluid in the tank housing the flush valve) to assist the fluid in passing through the venturi tube.

Figure 12:
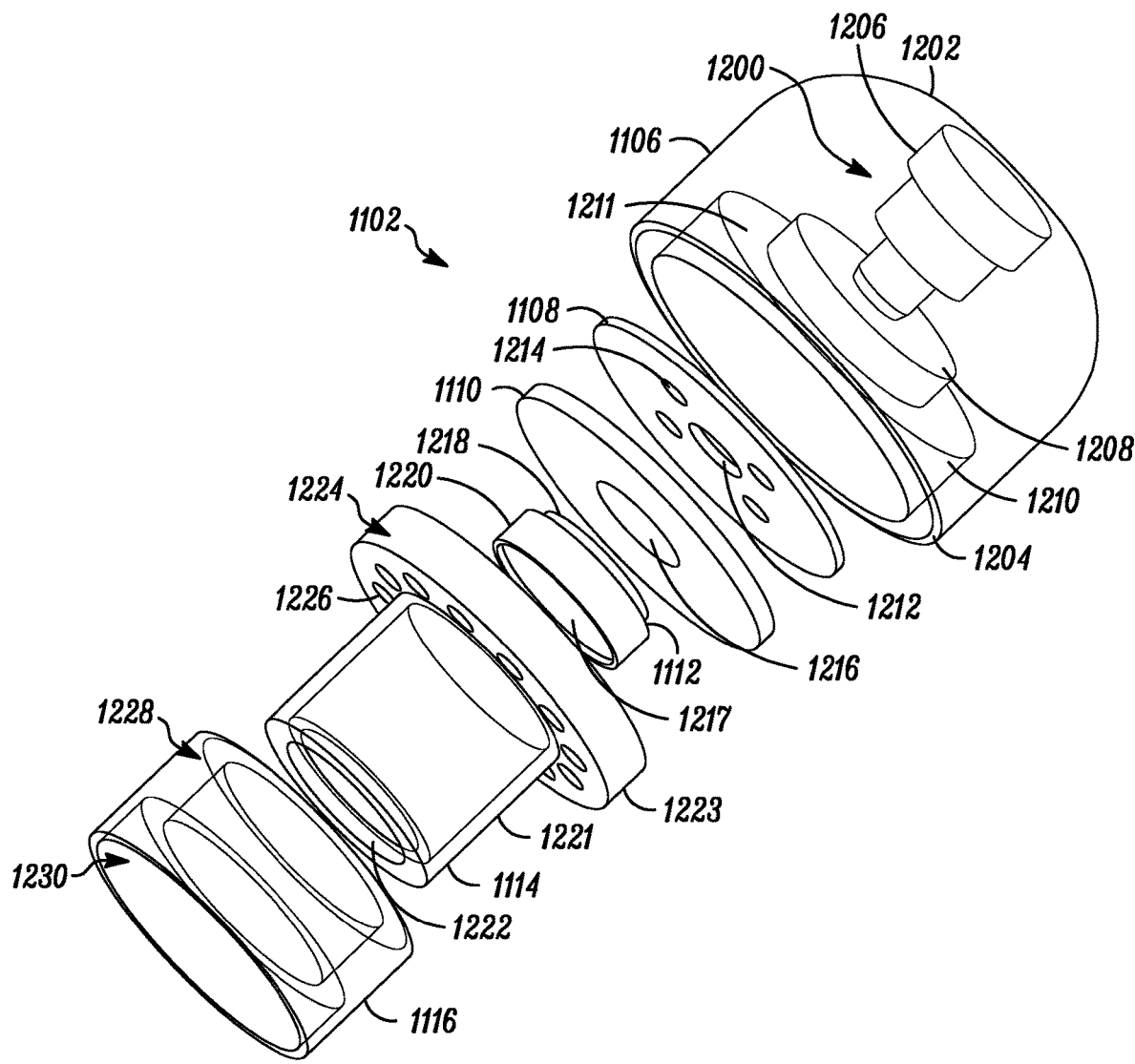
FIG. 12 is partially transparent, exploded view of a section of a first valve portion of the flush valve of FIG. 11A.

FIG. 12 is a partially transparent, exploded view of a section of the first valve portion 1102 of the flush valve 1100 of FIG. 11A. The upper housing 1106 defines a channel 1200 through the upper housing 1106 from a first end 1202 to a second end 1204 of the upper housing 1106. The channel 1200 is configured to receive first fluid at the first end 1202 (e.g., from the manifold outlet 106 of FIGS. 2A-5 or the manifold outlet 606 of FIGS. 6-9) and to output the first fluid at the second end 1204. A first portion 1206 of the channel 1200 includes a series of three round concentric recesses having features similar to those of the concentric recesses of the manifold inlet 104 of FIGS. 2A-5 and the manifold outlet 106 of FIGS. 6-9.

A second portion 1208 of the channel 1200 is in fluid communication with the first portion 1206 and has a diameter greater than the recesses of the first portion 1206. A third portion 1210 of the channel 1200 is in fluid communication with the second portion 1208 and has a diameter greater than the second portion 1208. A shoulder 1211 is defined between the second portion 1208 and the third portion 1210 of the channel 1200. The second portion 1208 and the third portion 1210 have round shapes but in other embodiments may have another shape (e.g., rectangular). In other embodiments, the channel 1200 may have other configurations. For example, the channel 1200 may include only the second portion 1208 and the third portion 1210, or the channel 1200 may include a uniform diameter along its length.

The first washer 1108 is sized and shaped to be disposed within the third portion 1210 of the channel 1200 of the upper housing 1106. For example, the first washer 1108 may have an exterior diameter less than an interior diameter of the third portion 1210 of the channel 1200. A top surface of the first washer 1108 contacts the shoulder 1211 of the channel 1200. The first washer 1108 includes a central aperture 1212 through the first washer 1108. The central aperture 1212 has a smaller diameter than the second portion 1208 of the channel 1200. First fluid flowing through the channel 1200 of the upper housing 1106 flows through the central aperture 1212. The first washer 1108 includes attachment apertures 1214 (e.g. four or another number) through the first washer 1108 peripherally located around the central aperture 1212. In other embodiments, the first washer 1108 may not include attachment apertures 1214. One or more means of attachment (e.g. rivets, screws, adhesive, rods) may extend through the attachment apertures 1214 to couple the first washer 1108 to the upper housing 1106, the second washer 1110, or to another component of the first valve portion 1102.

The second washer 1110 is sized and shaped to be disposed within the third portion 1210 of the channel 1200 of the upper housing 1106 and has an external diameter substantially equal to the first washer 1108. A top surface of the second washer 1110 contacts a bottom surface of the first washer 1108. The second washer 1110 includes a central aperture 1216 in fluid communication with the central aperture 1212 of the first washer 1108. The central aperture 1216 has a diameter greater than the central aperture 1212 of the first washer 1108, but in other embodiments may have a diameter of another size relative to the central aperture 1212. First fluid flowing through the central aperture 1212 of the first washer 1108 flows through the central aperture 1216.

The fluid guide 1112 defines a channel 1217 having an inlet 1218 configured to receive first fluid from the second washer 1110 and an outlet 1220 configured to output the first fluid to the lower housing 1114. The inlet 1218 has a diameter greater than the central aperture 1216 of the second washer 1110, but in other embodiments the inlet 1218 may have another diameter relative to the diameter of the central aperture 1216. The outlet 1220 has a diameter greater than the inlet 1218. In other embodiments, the outlet 1220 may have another diameter relative to the inlet 1218. A top surface of the fluid guide 1112 contacts a bottom surface the second washer 1110 around the central aperture 1212.

The lower housing 1114 includes a cylinder 1221 defining a channel 1222 configured to receive first fluid from the channel 1217 of the fluid guide 1112 and to output the first fluid to the connector 1116. A portion of the fluid guide 1112 extends into the channel 1222 of the cylinder 1221. The lower housing 1114 includes an annular flange 1223 extending around a periphery of a top end of the cylinder 1221. The flange 1223 defines a recess 1224. The recess 1224 is sized and shaped to receive the first washer 1108 and the second washer 1110. For example, the flange 1223 may include an interior diameter substantially equal to an exterior diameter of the first washer 1108 and the second washer 1110 such that the first washer 1108 and the second washer 1110 may be disposed in the recess 1224. A top surface of the flange 1223 contacts an interior surface of the upper housing 1106 such that the lower housing 1114 and the upper housing 1106 enclose the first washer 1108, the second washer 1110, and the fluid guide 1112. The flange 1223 includes attachment apertures 1226 (e.g. four or another number) through the flange 1223 peripherally located around the cylinder 1221. In other embodiments, the flange 1223 may not include attachment apertures 1226. One or more means of attachment (e.g. rivets, screws, adhesive, rods) may extend through the attachment apertures 1226 to couple the lower housing 1114 to the upper housing 1106.

The connector 1116 is configured to fluidly couple the lower housing 1114 to the valve actuator 1118. The connector 1116 defines a first recess 1228 and a second recess 1230. The first recess 1228 includes an interior profile sized and shaped to correspond with an exterior profile of an end portion of the cylinder 1221 of the lower housing 1114 such that the end portion of the cylinder 1221 is disposed inside the first recess 1228. The second recess 1230 includes an interior profile sized and shaped to correspond with an exterior profile of an end portion of an actuator housing later described with respect to FIG. 11A. The end portion of the actuator housing is disposed inside the second recess 1230. The lower housing 1114 and the actuator housing are disposed inside the connector 1116 such that the first fluid flowing through the channel 1222 of the lower housing 1114 flows into the actuator housing.

In the illustrated, non-limiting embodiment, the first washer 1108 and the second washer 1110 have round shapes. In other embodiments, the washers 1108 and 1110 may be rectangular or include another shape. The fluid guide 1112, the lower housing 1114, and the connector 1116 have round cylindrical shapes. In other embodiments, the fluid guide 1112, the lower housing 1114, and the connector 1116 may be rectangular or include another shape. The upper housing 1106 has a rounded, dome-like shape, but in other embodiments could be cubic or include another shape.

Referring back to FIG. 11A, the valve actuator 1118 includes an actuator housing 1134. One end of the actuator housing 1134 is coupled to the lower housing 1114 within the second recess 1230. The control stop 1120, also referred to as a flapper valve, is disposed adjacent to an opposite end of the actuator housing 1134. The actuator housing 1134 includes a first section 1136 and a second section 1138, where the second section 1138 has a diameter smaller than the first section 1136. In other embodiments, the first section 1136 and the second section 1138 may have alternate other diameter ratios. The first section 1136 and the second section 1138 have round cylindrical shapes in this example but may have square or other shaped sections in other examples.

Figure 11B:
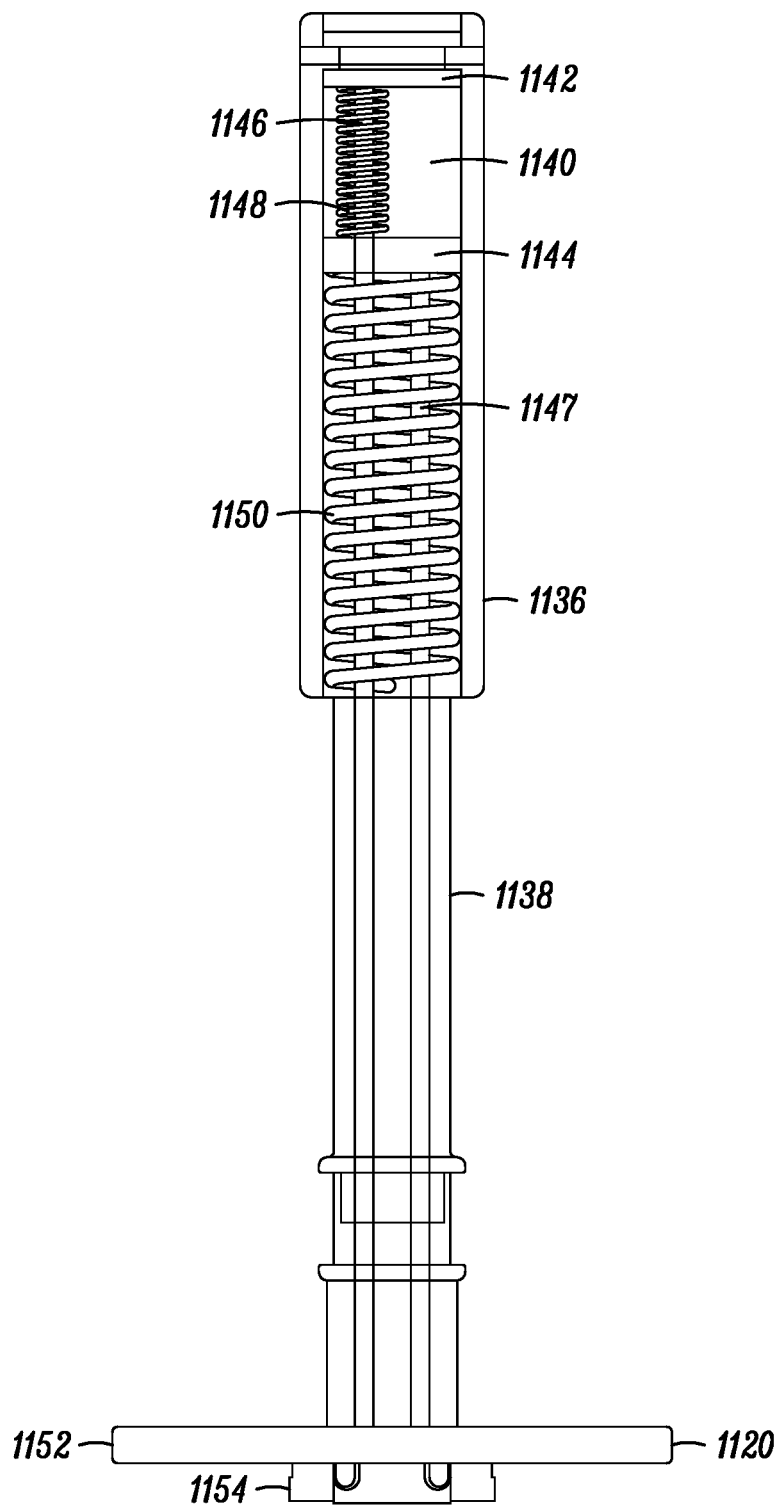
FIG. 11B is a partially transparent side view of a valve actuator and a control stop of the flush valve of FIG. 11A.

FIG. 11B is a partially transparent side view of the valve actuator 1118 and the control stop 1120 of the flush valve 1100 shown in FIG. 11A. The first section 1136 of the actuator housing 1134 defines a cavity 1140 configured to receive the first fluid flowing from the lower housing 1114. A first plate 1142 is disposed inside the cavity 1140 and is configured to move within the cavity 1140 between a closed position and an open position. The first plate 1142 has an exterior diameter substantially equal to an interior diameter of the first section 1136. A second plate 1144 is disposed inside the cavity 1140 downstream from the first plate 1142 and is configured to move within the cavity 1140 between a closed position and an open position. The second plate 1144 has an exterior diameter substantially equal to an interior diameter of the first section 1136. A first rod 1146 is coupled at one end to the first plate 1142. The first rod 1146 extends through the second plate 1144 and through the second section 1138 of the actuator housing 1134. The first rod 1146 is coupled at an opposite end to the control stop 1120. A second rod 1147 is coupled at one end to the second plate 1144. The second rod 1147 extends through the second section 1138 of the actuator housing 1134 and is coupled at an opposing end to the control stop 1120. A first spring 1148 is disposed around the first rod 1146 between the first plate 1142 and the second plate 1144. A second spring 1150 is disposed in the first section 1136 around the first rod 1146 and the second rod 1147 between the second plate 1144 second section 1138.

When the first fluid is output from the manifold outlet 106 of FIGS. 2A-5 or the manifold outlet 606 of FIGS. 6-9, the first fluid flows through the upper housing 1106, the first washer 1108, the second washer 1110, the fluid guide 1112, the lower housing 1114, the connector 1116, and into the cavity 1140 of the first section 1136. In response to the first fluid contacting the first plate 1142, the first plate 1142 moves from the closed position to the open position. The first plate 1142 in turn moves the first rod 1146 to rotate the control stop 1120 to an open position. When the first plate 1142 is moved by the first fluid to the open position, the first spring 1148 is compressed and applies a force on the second plate 1144 to move the second plate 1144 to the open position. In response to the second plate 1144 moving to the open position, the second rod 1147 moves the control stop 1120 away from the actuator housing 1134 in a longitudinal direction. When the control stop 1120 is moved away from the actuator housing 1134, the first fluid from the manifold 100 or 600 and/or a toilet tank may be flushed into a toilet bowl. By rotating the control stop 1120 in a downward direction, the control stop 1120 may direct the first fluid flowing through the flush valve 1100 in a desired direction, optimizing flow of the first fluid into the toilet bowl.

In response to no first fluid being received in the cavity 1140 (e.g. from the manifold 100 or 600), the second spring 1150 moves the second plate 1144 from the open position to the closed position. The second rod 1147 in turn moves the control stop 1120 towards the actuator housing 1134 in a longitudinal direction. In response to the second plate 1144 moving to the closed position, the first spring 1148 moves the first plate 1142 to the closed position. In response to the first plate 1142 moving to the closed position, the first rod 1146 rotates the control stop 1120 into a closed position. In the closed position, the control stop 1120 prevents the first fluid from flowing from the flush valve 1100 and/or the toilet tank into the toilet bowl.

The control stop 1120 (FIGS. 11A and 11B) includes a flapper 1152 and a rod connector 1154. The flapper 1152 is configured to prevent fluid communication between the flush valve 1100 and the toilet bowl when the flapper 1152 is in the closed position. The rod connector 1154 is coupled to a bottom surface of the flapper 1152. The first rod 1146 and the second rod 1147 extend through apertures in the flapper 1152. An end of the first rod 1146 and an end of the second rod 1147 are hingedly coupled to the rod connector 1154.

Figure 13:
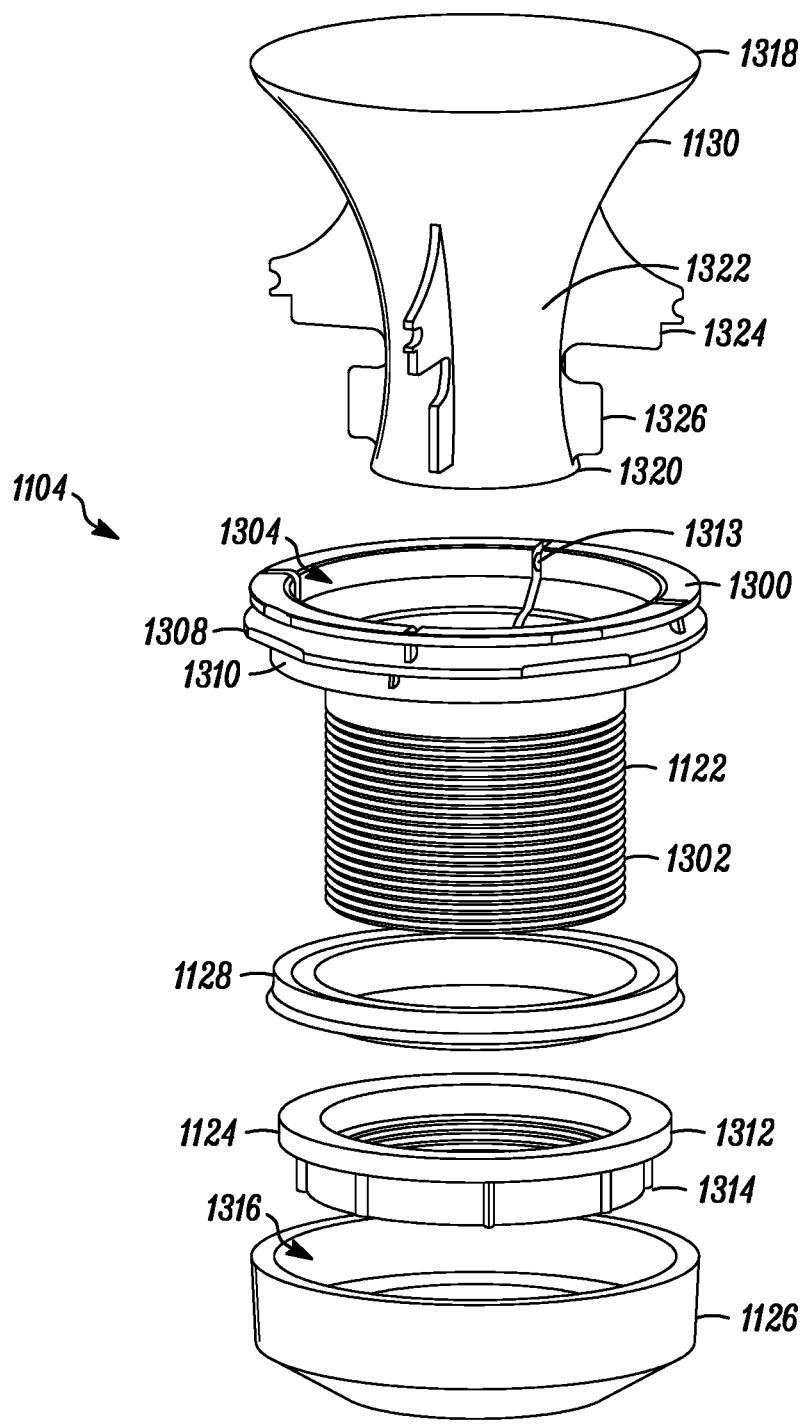
FIG. 13 is an exploded view of a second valve portion of the flush valve of FIG. 11A.

FIG. 13 is an exploded view of the second valve portion 1104 of the flush valve 1100 of FIG. 11A. The lower body 1122 includes a first section 1300 and a second section 1302 that define a channel 1304 through the lower body 1122. A portion of the channel 1304 defined by the first section 1300 has a diameter greater than a diameter of a portion of the channel 1304 defined by the second section 1302. The diameter of the portion of the channel 1304 defined by the first section 1300 gradually decreases in a direction towards the second section 1302. In this configuration, the portion of the channel 1304 defined by the first section 1300 has a conical shape. In other embodiments, the portion of the channel 1304 defined by the first section 1300 may have a constant diameter and may have a diameter equal to the portion of the channel 1304 defined by the second section 1302. A flange 1308 extends around a periphery of the first section 1300 and is configured to secure the lower body 1122 to an interior surface of the toilet tank. The upper gasket 1128 is disposed around the first section 1300 of the lower body 1122 between the flange 1308 and the interior surface of the toilet tank (not shown) and is configured to create a seal between the lower body 1122 and the interior surface of the toilet tank. An exterior surface of the first section 1300 includes an annular recess 1310 configured to receive a circular clip (not shown) configured to retain the venturi tube 1130 inside the lower body 1122. In other embodiments, the lower body 1122 may not include the annular recesses or may include more or less annular recesses 1310. The first section 1300 of the lower body 1122 defines slots 1313 around the channel 1304 configured to receive tabs 1324 and 1326 of the venturi tube.

The second section 1302 is configured to extend through an aperture in the toilet tank such that the channel 1304 is in fluid communication with the toilet tank and a toilet bowl (not shown). The exterior surface of the second section 1302 is threaded. At an end portion 1306 of the second section 1302 (FIG. 11A), a diameter of the channel 1304 gradually increases in a direction away from the first section 1300. In this configuration, an interior surface of the end portion 1306 has a conical shape. In other embodiments, the diameter of the channel 1304 defined by the second section 1302 may be constant.

The conical shapes of the channel 1304 defined by the end portions of the lower body 1122 operate to create a venturi effect within the channel 1304 such that the velocity of first fluid flowing through the channel 1304 is increased.

A lower lock ring 1124 includes a threaded interior surface configured to couple to the threaded exterior surface of the second section 1302 of the lower body 1122. A flange 1312 extends around one end of the lower lock ring 1124. A top surface of the flange 1312 is configured to contact an exterior surface of a toilet tank to secure the lower body 1122 to the toilet tank. The lower body 1122 is secured to the toilet tank by the flange 1308 of the lower body 1122 and the flange 1312 of the lower lock ring 1124. The lower lock ring 1124 includes ridges 1314 longitudinally extending between a bottom surface of the lower lock ring 1124 to the flange 1312. The flanges allow a user to easily grip the lower lock ring 1124 to screw or unscrew the lower lock ring 1124 from the lower body 1122. In other embodiments, the lower lock ring 1124 may not include the ridges 1314.

The lower gasket 1126 includes a threaded interior surface configured to couple to the threaded exterior surface of the second section 1302 of the lower body 1122 below the lower lock ring 1124. An end of the lower gasket 1126 defines a recess 1316 configured to receive the lower lock ring 1124. The flange 1312 of the lower lock ring 1124 contacts an interior surface of the recess 1316 to seal a connection between the lower lock ring 1124 and the lower body 1122 from first fluid flowing into the toilet bowl. An end of the lower gasket 1126 opposite from the recess 1316 has a conical shape. In other embodiments, the end of the lower gasket 1126 opposite from the recess 1316 may not have a conical shape and the lower gasket 1126 may be a round cylinder or include another shape.

The venturi tube 1130 is disposed around the actuator housing 1134 and includes a first end 1318 and a second end 1320. The second end 1320 is located downstream of the first end 1318 and is disposed inside of the channel 1304 of the lower housing 1114. The venturi tube 1130 is configured to receive first fluid from the toilet tank at the first end 1318 and to output the first fluid at the second end 1320. The venturi tube 1130 includes a profile shape (such as shown as concave shape), where the first end 1318 has a diameter larger than a diameter of the second end 1320. Although not shown, the internal profile may only be where the first end 1318 (entrance) transitions continuously to a smaller diameter, so that the second end 1320 (exit) is at a smaller diameter than at the first end 1318. The profile shape may not have a smaller diameter between the first end 1318 and second end (1320); (e.g. a profile shape composed as conical surface that transitions to a straight tube); where the opening to the cone is at first end 1318 and the straight tube ends at second end 1320. As shown the venturi tube 1130 includes a middle portion 1322 located between the first end 1318 and the second end 1320 having a diameter less than the second end 1320. The shape of an interior surface of the venturi tube 1130 operates to create a venturi effect within the venturi tube 1130 such that the velocity of first fluid flowing through the venturi tube 1130 is increased. The shape of an exterior surface of the venturi tube 1130 also operates to create a venturi effect in the channel 1304 of the lower body 1122 between the exterior surface of the venturi tube 1130 and an interior surface of the lower body 1122 such that the velocity of first fluid flowing between the exterior surface of the venturi tube 1130 and the interior surface of the lower body 1122 is increased.

Depending on the construction method of manufacturing the venturi tube 1130 may include a first set of tabs 1324 extending from the exterior surface of the venturi tube 1130. Each of the first set of tabs 1324 is configured to be received by one slot 1313 in the lower body 1122 to couple the venturi tube 1130 to the lower body 1122. The venturi tube 1130 includes a second set of tabs 1326 extending from the exterior surface of the venturi tube 1130 downstream from the first set of tabs 1324. Each of the second set of tabs 1326 is configured to contact an interior surface of the lower body 1122 to maintain a position of the venturi tube 1130 within the lower body 1122. Depending on the profile shape used for the venturis, the venturi tube 1130 and lower body 1122 may be constructed as a single piece and need not be two separate pieces. The venturi tube 1130 includes a connector ring 1328 (shown in FIG. 11A) coupled to an interior surface of the venturi tube 1130. The connector ring 1328 contacts and extends around the actuator housing 1134 and is configured to couple the venturi tube 1130 to the actuator housing 1134. The actuator housing 1134 may include a pair of connector flanges 1129 extending around the actuator housing 1134. The connector flanges 1129 are configured to receive the connector ring 1328 to couple the actuator housing 1134 to the venturi tube 1130. In other embodiments, the connector ring 1328 may be coupled to the actuator housing 1134 another location along the length of the actuator housing 1134.

When the control stop 1120 is moved from the closed position to the open position by the valve actuator 1118, first fluid flows from the toilet tank through the second valve portion 1104 and into the toilet bowl. In response to the control stop 1120 being moved from the open position to the closed position, the first fluid flows from the toilet tank, into the first end 1318 of the venturi tube 1130, through the interior of the venturi tube 1130, out the second end 1320 of the venturi tube 1130, into the channel 1304 of the lower body 1122, and into the control stop 1120. First fluid from the toilet tank simultaneously flows into an end of the channel 1304 of the lower body 1122, between the interior surface of the lower body 1122 and the exterior surface of the venturi tube 1130, and into the control stop 1120. The control stop 1120 directs the first fluid flowing through the venturi tube 1130 and through the channel 1304 of the lower body 1122 into the toilet bowl. By accelerating the first fluid flowing through the venturi tube 1130 and through the channel 1304 of the lower body 1122 as described, a lesser volume of first fluid is directed into the toilet bowl at an increased velocity relative to traditional toilets. The lesser volume of the first fluid is sufficient to complete a toilet flush cycle and to remove liquid and/or solid waste from the toilet bowl.

Figure 14A:
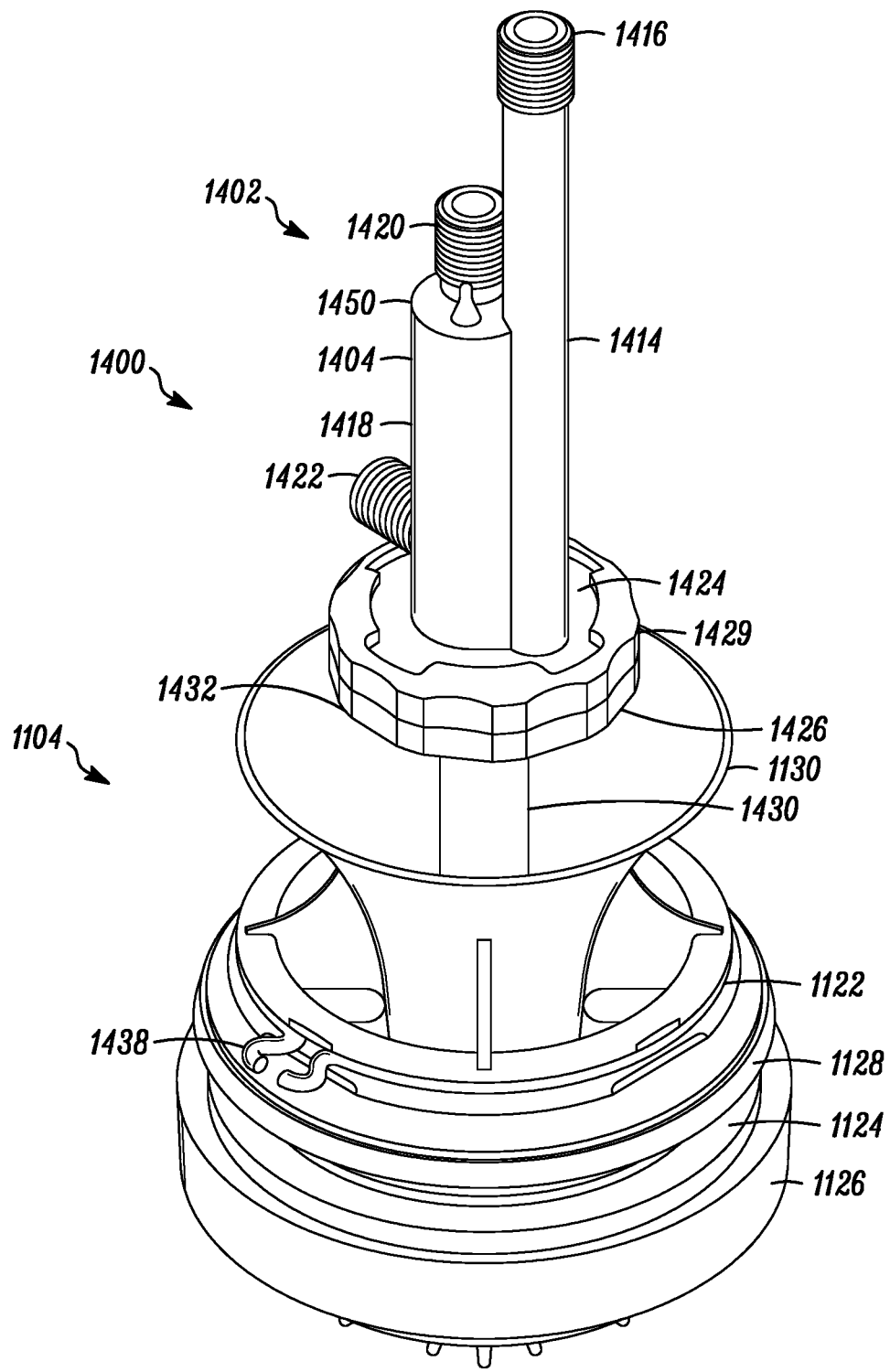
FIG. 14A is a perspective view of a top and a side of another flush valve.
Figure 14B:
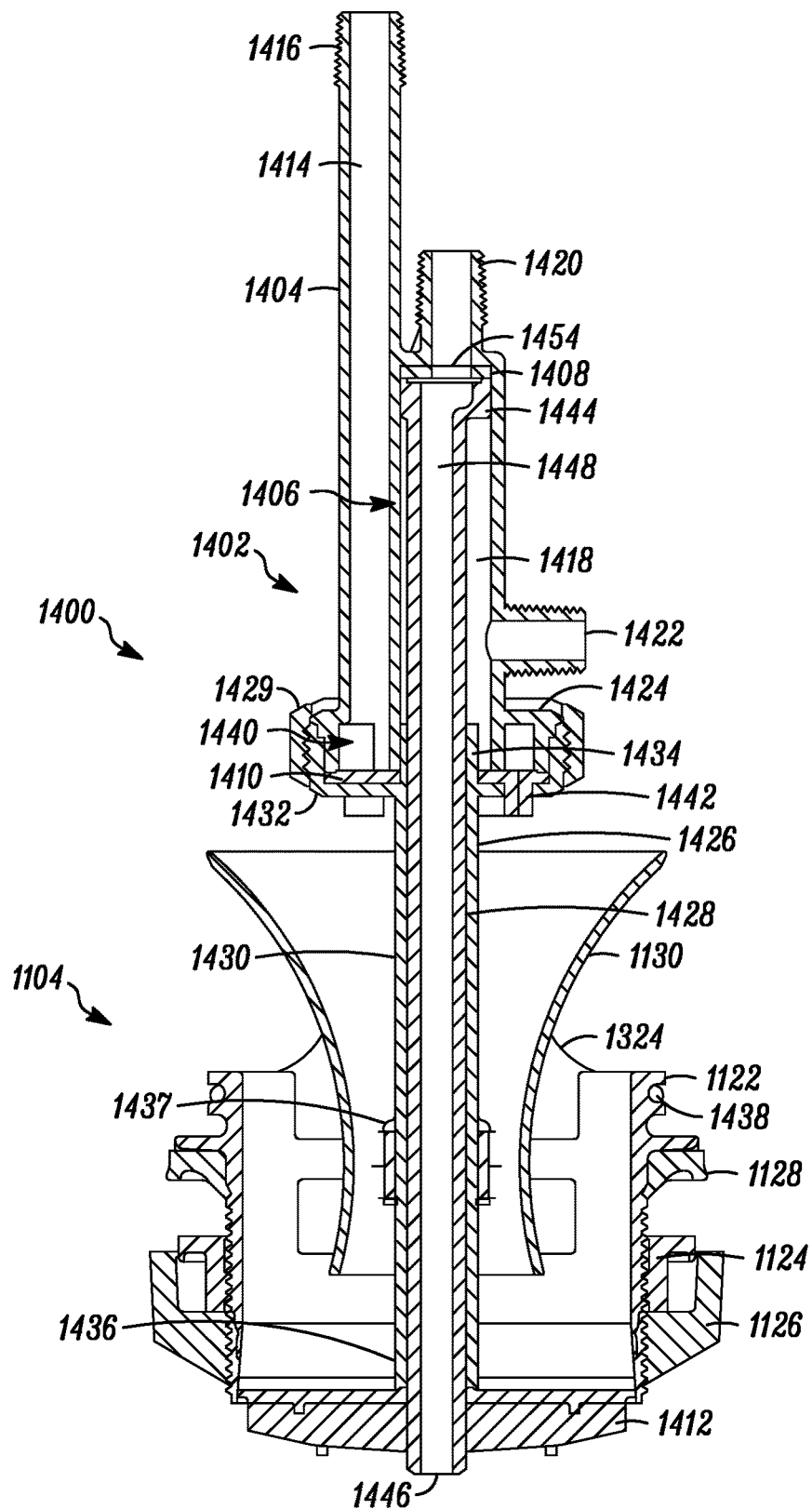
FIG. 14B is a side cross-sectional view of the flush valve of FIG. 14A.

FIG. 14A is a perspective view of a top and side of a flush valve 1400. FIG. 14B is a side cross-sectional view of the flush valve 1400 of FIG. 14A. The flush valve 1400 may be used with the manifold 100 or 600 in place of the flush valve 1100. The flush valve 1400 includes a first valve portion 1402 and the second valve portion 1104 described with respect to FIGS. 11 and 13. The first valve portion 1402 includes an upper body 1404, a valve actuator 1406, an upper flange 1408, a lower flange 1410, and a control stop 1412.

The upper body 1404 defines a first chamber 1414 having a first inlet 1416 and a second chamber 1418 having a second inlet 1420 and a third inlet 1422. Exterior surfaces of the first, second, and third inlets 1416, 1420, 1422 are threaded such that the first, second, and third inlets 1416, 1420, 1422 are each configured to couple to a fluid line or another fluid source (e.g. the manifold 100 or 600). In other embodiments, the first, second, and third inlets 1416, 1420, 1422 may be coupled to a fluid line or fluid source using adhesive, interference fit, or other suitable means.

The first chamber 1414 has a length greater than a length of the second chamber 1418 and is not in fluid communication with the second chamber 1418. The first inlet 1416 and the second inlet 1420 are defined in a top surface of the upper body 1404. The first inlet 1416 is located at a greater height than the second inlet 1420. The first chamber 1414 may have any height relative to the second chamber 1418 and the first inlet 1416 may be located at any height relative to the second inlet 1420. The third inlet 1422 is defined in a side surface of the upper body 1404 and is located at a lower height relative to the first inlet 1416 and the second inlet 1420. In other embodiments, the third inlet 1422 may be located at any height relative to the first inlet 1416 and the second inlet 1420. In other embodiments, the first inlet 1416, the second inlet 1420, and the third inlet 1422 may be defined in another surface of the upper body 1404. The upper body 1404 includes a flange 1424 extending around an end of the upper body opposite the first inlet 1416 and the second inlet 1420. The flange 1424 extends around the first chamber 1414 and the second chamber 1418.

The valve actuator 1406 includes a rod housing 1426, a rod 1428, and an upper lock ring 1429. The rod housing 1426 includes a sleeve 1430 and a flange 1432. A first end 1434 of the sleeve 1430 is disposed inside the second chamber 1418. A second end 1436 of the sleeve 1430 is disposed inside the lower body 1122 of the second valve portion 1104. The sleeve 1430 is a cylindrical tube and includes openings located at the first end 1434 and the second end 1436. The sleeve 1430 is configured to receive the rod 1428 through the sleeve 1430. A portion of the sleeve 1430 disposed inside the lower body 1122 of the second valve portion 1104 includes a connector flange 1437 extending around the sleeve 1430. The connector flange 1437 is configured to receive the connector ring 1328 of the venturi tube 1130 of the second valve portion 1104 to couple the sleeve 1430 to the venturi tube 1130. A clip 1438 secures the arms 1324 of the venturi tube 1130 to the lower body 1122.

The flange 1432 of the valve actuator 1406 extends around a portion the sleeve 1430 closer to the first end 1434 than the second end 1436. The flange 1432 defines a recess 1440 configured to receive the flange 1424 of the upper body 1404. The recess 1440 includes an interior profile shaped and sized to correspond to an exterior profile of the flange 1424 of the upper body 1404. The flange 1432 includes apertures 1442 through the flange 1432 located around a periphery of the sleeve 1430. An exterior surface of the flange 1432 includes threads.

The upper lock ring 1429 is configured to couple the upper body 1404 to the rod housing 1426. The upper lock ring 1429 extends around the exterior surface of the flange 1432 of the rod housing 1426 and an exterior surface of the flange 1424 of the upper body 1404 while the flange 1424 of the upper body 1404 is disposed in the recess 1440 of the rod housing 1426. An interior surface of the upper lock ring 1429 includes threads configured to couple to the threads of the exterior surface of the flange 1432. In other embodiments, the upper lock ring 1429 may couple to the exterior surface of the flange 1432 using interference fit or other suitable means.

The rod 1428 extends through the sleeve 1430 of the rod housing 1426. A first end portion 1444 of the rod 1428 is disposed inside the second chamber 1418 and includes an exterior diameter substantially equal to an interior diameter of the second chamber 1418. Contact between an exterior surface of the first end portion 1444 and an interior surface of the second chamber 1418 prevents fluid communication between a portion of the second chamber 1418 upstream from the first end portion 1444 and a portion of the second chamber 1418 downstream from the first end portion 1444. A second end portion 1446 of the rod 1428 is coupled to the control stop 1412. The rod 1428 is configured to move within the second chamber 1418 of the upper body 1404 and the sleeve 1430 of the rod housing 1426 between a closed position and an open position. When the rod 1428 is moved from the open position to the closed position, the rod 1428 moves the control stop 1412 into a closed position. In the closed position, the control stop 1412 prevents fluid communication between the lower body 1122 of the second valve portion 1104 and a toilet bowl (not shown). When the rod 1428 is moved from the closed position to the open position, the rod 1428 moves the control stop 1412 into an open position. In the open position, the control stop 1412 directs first fluid flowing form the lower body 1122 into the toilet bowl.

The rod 1428 defines a rod channel 1448 through the rod 1428 from the first end portion 1444 to the second end portion 1446. The rod channel 1448 is in fluid communication with the second inlet 1420 of the upper body 1404. While the rod 1428 and the control stop 1412 are in the closed position, first fluid may be supplied to the second inlet 1420. The first fluid may flow through the rod channel 1448, bypass the control stop 1412, and flow into the toilet bowl. For example, a relatively low volume of first fluid sufficient to remove liquid waste from the toilet bowl may be supplied to the second inlet 1420 and through the rod channel 1448 in response to a user selecting a "low-flow" toilet flush. In some embodiments, the rod 1428 does not define the rod channel 1448.

The upper flange 1408 is disposed inside the second chamber 1418 between the second inlet 1420 and the first end portion 1444 of the rod 1428. The upper flange 1408 is configured to create a watertight coupling between the second inlet 1420 and the rod channel 1448 when the rod 1428 is in the closed position and the first end portion 1444 of the rod 1428 is in contact with the upper flange 1408. The upper flange 1408 includes an aperture 1454 in fluid communication with the second inlet 1420 and the rod channel 1448. The upper flange includes two protrusions 1450 that extend through apertures defined in the top surface of the upper body 1404. The protrusions are cone shaped and are configured to retain a top surface of the upper flange 1408 in contact with an interior surface of the second chamber 1418.

The valve actuator 1406 can include a spring (not shown), or other actuation and return mechanism, that is disposed around the rod 1428 and inside the second chamber 1418. One end of the spring can contact a bottom surface of the first end portion 1444 of the rod 1428 and an opposing end of the spring can contact the rod housing 1426. When first fluid is supplied to the second inlet 1420 (e.g. from the manifold 100, the manifold 600, from a valve between the manifold 100, 600 and the flush valve 1400, or another fluid source), the first fluid contacts the first end portion 1444 of the rod 1428 to move the rod 1428 and the control stop 1412 to the open position. The spring (or other mechanism) is compressed while the rod 1428 is in the open position. When the first fluid is no longer supplied to the second inlet 1420, the spring (or other mechanism) moves the rod 1428 and the control stop 1412 back into the closed position.

In other embodiments, the first valve portion 1402 does not include the spring. In such embodiments, first fluid supplied to the third inlet 1422 (e.g. from the manifold 100, the manifold 600, from a valve between the manifold 100, 600 and the flush valve 1400, or another fluid source) enters the second chamber 1418 and contacts the bottom surface of the first end portion 1444 of the rod 1428 to retain the rod 1428 in the closed position. When a user initiates a toilet flush (e.g. using the manifold 100 or 600), first fluid flowing from the manifold outlet 106 of FIGS. 2A-5 or the manifold outlet 606 of FIGS. 6-9 can activate a shut-off valve (not shown). In response to receiving first fluid from the manifold outlet 106 or 606, the shut-off valve is configured to stop the supply of first fluid to the third inlet 1422 and the second chamber 1418. In response to stopping the supply of first fluid to the third inlet 1422 and the second chamber 1418, gravity causes the rod 1428 and the control stop 1412 to move to the open position. When the first fluid from the manifold outlet 106 or 606 stops flowing to the shut-off valve, first fluid is again supplied to the third inlet 1422 and the second chamber 1418 to move the rod 1428 and the control stop 1412 from the open position to the closed position.

Figure 15:
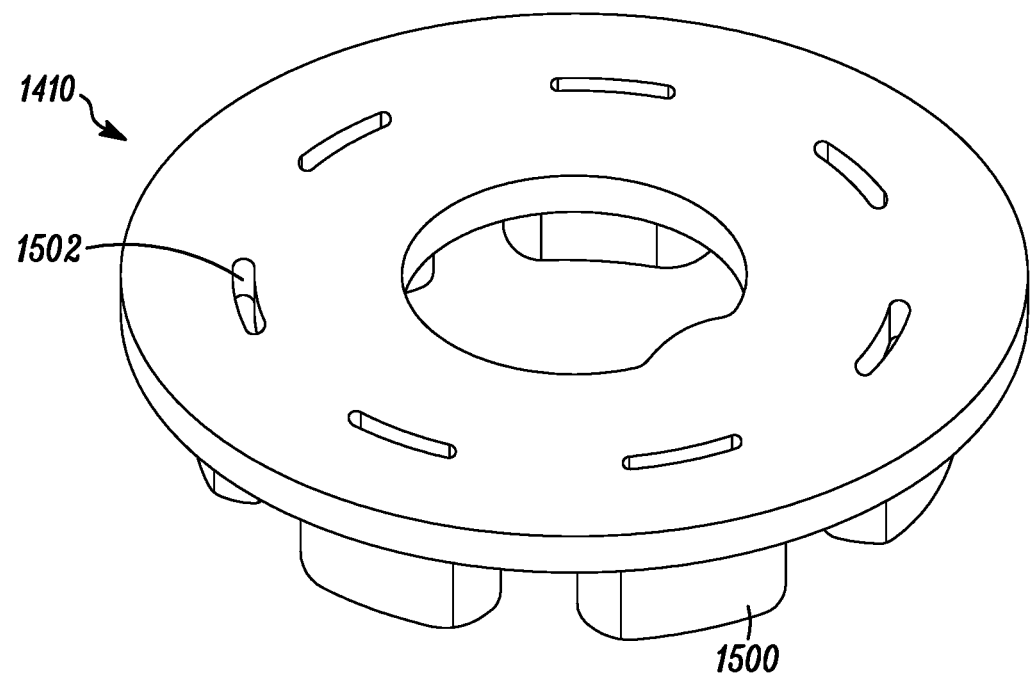
FIG. 15 is a top perspective view of a lower flange of the flush valve of FIGS. 14A and 14B.

FIG. 15 is a top perspective view of the lower flange 1410 of the flush valve 1400 of FIGS. 14A-14B. The lower flange 1410 is a ring-shaped flange having oval-shaped protrusions 1500 extending from a bottom surface of the lower flange 1410. In other embodiments, the protrusions 1500 may have a round or another shape. The lower flange 1410 defines apertures 1502 through the lower flange 1410 and each of the protrusions 1500. The apertures 1502 have a thin oval shape but in other embodiments may be round or may include another shape. Referring back to FIG. 14, the lower flange 1410 is disposed around the sleeve 1430 and within the recess 1440 defined in the flange 1432 of the rod housing 1426. The apertures 1502 are in fluid communication with the first chamber 1414 of the upper body 1404. Each of the protrusions 1500 of the lower flange 1410 extends through one of the apertures 1442 defined in the flange 1432 of the rod housing 1426 such that the apertures 1502 of the lower flange 1410 are in fluid communication with the first end 1318 of the venturi tube 1130 of the second valve portion 1104.

In response to the user initiating a toilet flush (e.g. using the manifold 100 or 600), first fluid is supplied to the first inlet 1416 (e.g. from the manifold 100, the manifold 600, from a valve between the manifold 100, 600 and the flush valve 1400, or another fluid source) and into the first chamber 1414. The first fluid may be supplied to the first inlet 1416 at the same time first fluid is supplied to the second inlet 1420 or the third inlet 1422 of the upper body 1404. In other embodiments, the first fluid may be supplied to the first inlet 1416 before or after first fluid is supplied to the second inlet 1420 or the third inlet 1422. The first fluid flowing through the first chamber 1414 flows through the apertures 1502 of the lower flange 1410 and into the first end 1318 of the venturi tube 1130 of the second valve portion 1104. The apertures 1502 are configured to jet the first fluid at an increased velocity into the venturi tube 1130. The velocity of first fluid flowing through the venturi tube 1130 from the apertures 1502 is further increased due to the venturi effect created by the shape of the venturi tube 1130.

After flowing through the venturi tube 1130, the first fluid flows through the channel 1304 of the lower body 1122 and into the open control stop 1412. In addition to the first fluid flowing into venturi tube 1130 from the apertures 1502 of the lower flange 1410, first fluid flows from the toilet tank, into the first end 1318 of the venturi tube 1130, through an interior of the venturi tube 1130, out the second end 1320 of the venturi tube 1130, into the channel 1304 of the lower body 1122, and into the control stop 1412. First fluid from the toilet tank simultaneously flows into an end of the channel 1304 of the lower body 1122, between the interior surface of the lower body 1122 and an exterior surface of the venturi tube 1130, and into the control stop 1412. The control stop 1412 directs the first fluid flowing through the venturi tube 1130 and through the channel 1304 of the lower body 1122 into the toilet bowl. By accelerating the first fluid from the apertures 1502 of the lower flange 1410 and from the toilet tank through the venturi tube 1130 and through the channel 1304 of the lower body 1122 as described, a lesser volume of first fluid is directed into the toilet bowl at an increased velocity relative to traditional toilets. The lesser volume is sufficient to complete a toilet flush cycle and to remove solid and/or liquid waste from the toilet bowl.

Figure 16:
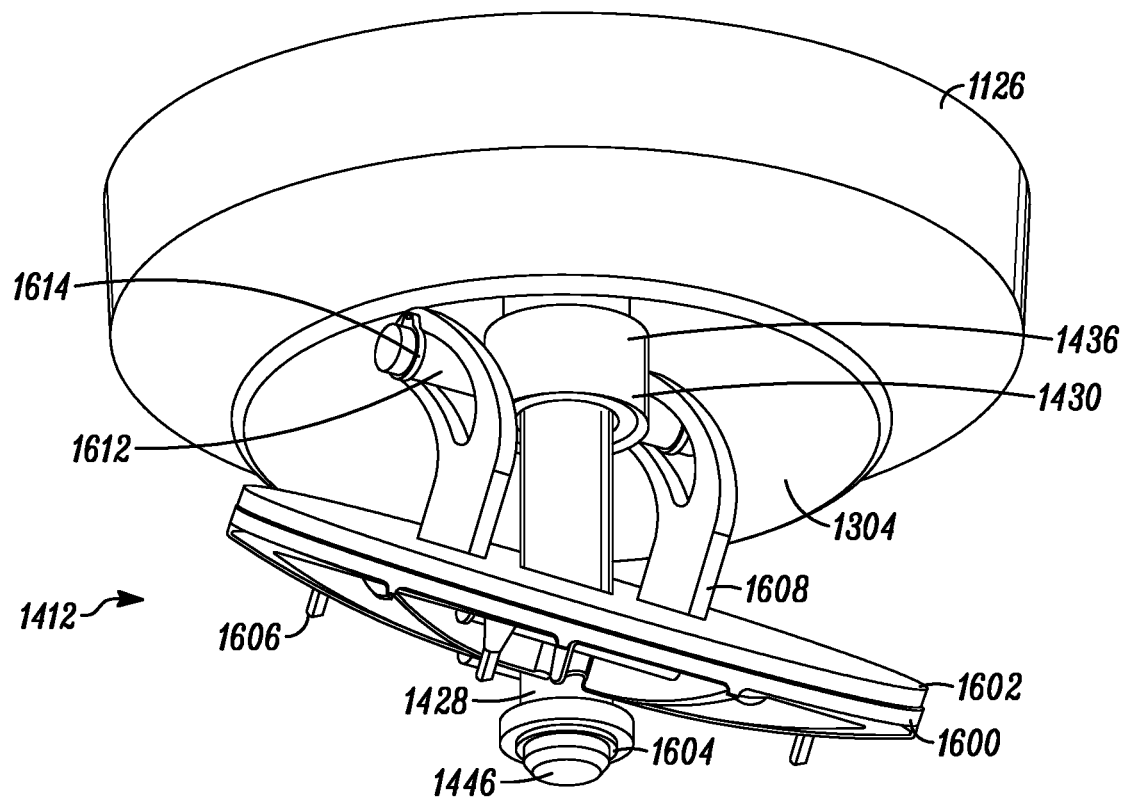
FIG. 16 is a bottom perspective view of a control stop of the flush valve of FIGS. 14A and 14B.

FIG. 16 is a bottom perspective view of the control stop 1412 of the flush valve 1400 of FIGS. 14A-14B. The control stop 1412 includes a flapper 1600 and a flapper gasket 1602. The flapper 1600 and the flapper gasket 1602 are round, but in other embodiments may be rectangular or another shape. The rod 1428 extends through an aperture in the flapper 1600 and an aperture in the flapper gasket 1602. The second end portion 1446 of the rod 1428 includes a connector flange 1604 configured to retain the control stop 1412 on the rod 1428. The connector flange 1604 has a diameter greater than the diameter of the aperture in the flapper 1600 through which the rod 1428 extends. The flapper gasket 1602 is configured to create a seal between the flapper gasket 1602 and the lower body 1122 of the second valve portion 1104 when the control stop 1412 is in the closed position. The flapper gasket 1602 includes protrusions 1606 that extend through apertures in the flapper 1600 to couple the flapper gasket 1602 to the flapper 1600. The protrusions 1606 are cone shaped, but in other embodiments may include a spherical or another shape.

The flapper 1600 includes two curved cams 1608 extending from a top surface of the flapper 1600 and through apertures in the flapper gasket 1602. The cams 1608 slidably engage a pin 1612 extending laterally through the second end 1436 of the sleeve 1430 as the rod 1428 moves the flapper 1600 between the closed position and the open position. A fastener 1614 coupled to each end of the pin 1612 retains the pin 1612 in each of the cams 1608. When the rod 1428 is moved from the closed position to the open position, movement of the curved cams 1608 relative to the pin 1612 moves the control stop 1412 away from the lower body 1122 in a longitudinal direction and rotates the control stop 1412 in a downward direction relative to the lower body 1122. First fluid flowing from the channel 1304 defined by the lower body 1122 is directed by the open control stop 1412 into the toilet bowl.

Figure 17:
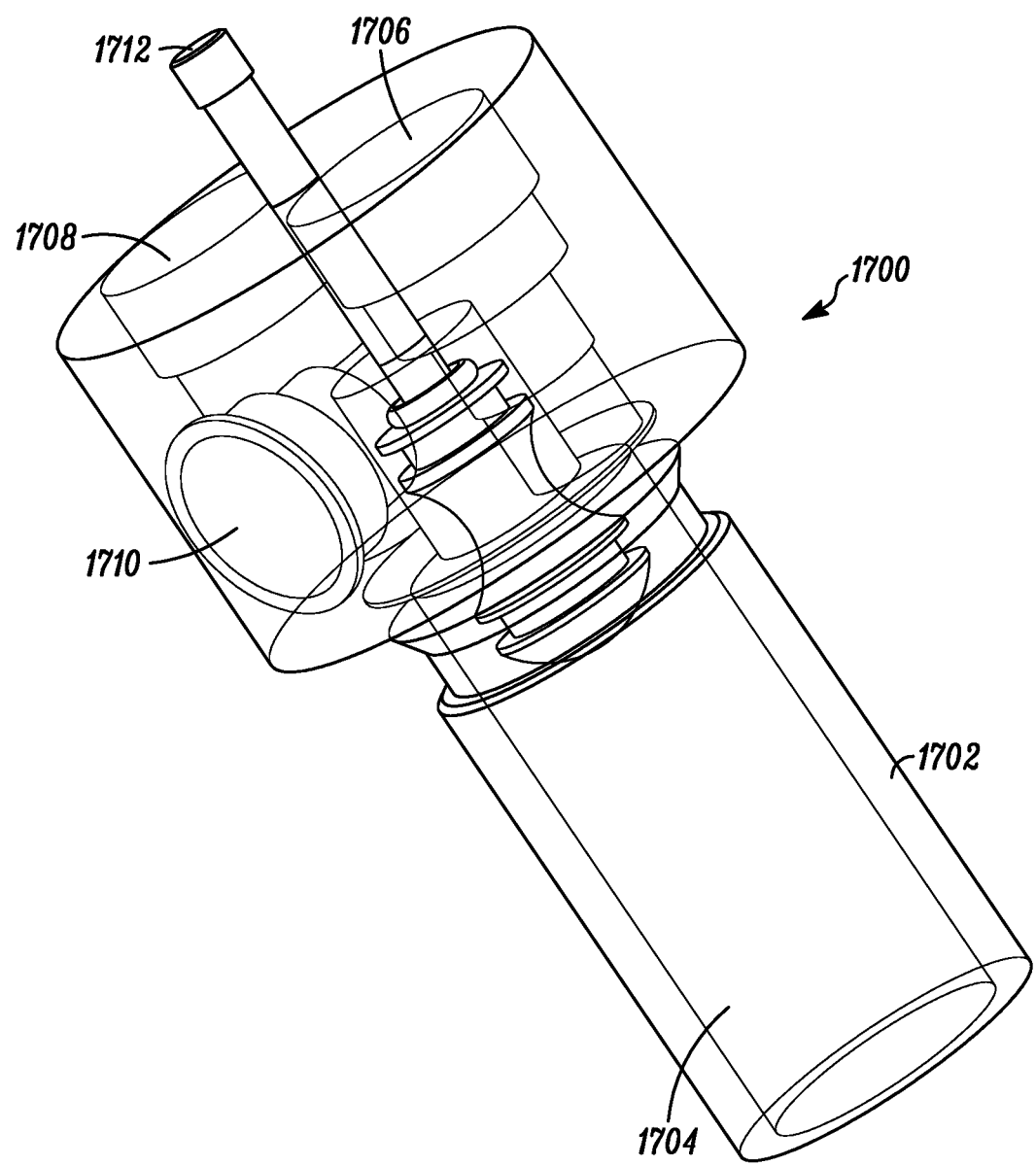
FIG. 17 is a perspective view of a shut off.

FIG. 17 is a perspective view of a shut off 1700. The shut off 1700 has a housing 1702 that forms a flow path. The housing 1702 has an inlet 1704 that receives fluid from a fluid source and then directs the fluid through the housing 1702 to an outlet 1706, an outlet 1708, or both the outlet 1706 and the outlet 1708. The outlet 1706 directs fluid to a manifold (not shown) and the outlet 1708 directs fluid to a valve (not shown). The outlet 1706 and the outlet 1708 direct fluid to the bowl or manifold so that contents are removed from a hydraulic moving device (not shown) or to refill the hydraulic moving device. The fluid is directed through the housing 1702 and to the outlets 1706 and 1708 when a pressure created by the inlet 1704 fluid is greater than the fluid flowing into a reset inlet 1710. The fluid from the inlet 1704 has a greater pressure than the fluid of the reset inlet 1710 so that a shut off reset 1712 is moved and the fluid flows unrestricted through the housing 1702. In the event that fluid stops flowing through the inlet 1704, the fluid from the reset inlet 1710 will block the housing 1702 and prevent fluid from exiting through the shut off 1700 and potentially causing a leak.

The shut off reset 1712 may be monostable, default closed, act as a safety valve, or a combination thereof. The shut off reset 1712 be hydraulically moved. The shut off reset 1712 may be moved by a bias device (e.g., spring, elastomeric member) that closes the housing when there is no fluid pressure in the inlet. The shut off reset 1712 may only be moved by hydraulic pressure located above or below a portion of the shut off reset 1712 so that the shut off reset 1712 is moved in a direction by a higher pressure (e.g., opposite the higher pressure). A pressure on the shut off reset 1712 through the reset inlet 1710 may be less than a pressure from the inlet 1704 so that the shut off reset 1712 is moved to an open position by the pressure of the fluid in the inlet 1704.

Figure 18:
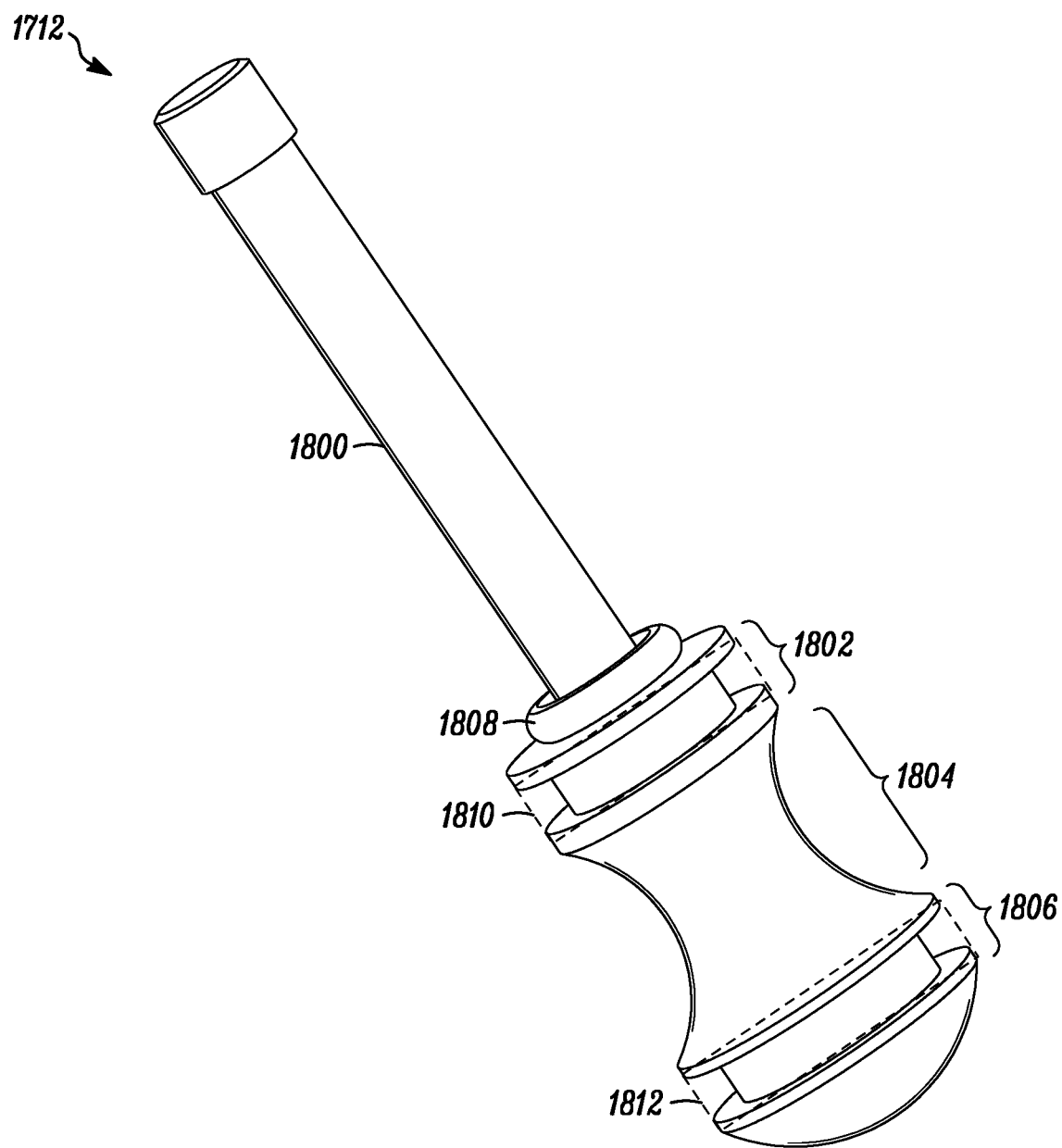
FIG. 18 is a perspective view of a shut off reset.

FIG. 18 is a perspective view of the shut off reset 1712. The shut off reset 1712 includes a handle 1800 that extends out of a housing 1702 (of FIG. 17) so that if the shut off 1700 activates to prevent a fluid from extending through the shut off 1700, the shut off 1700 may be reset by moving the handle 1800. The shut off reset 1712 includes an upper seal recess 1802, a neck region 1804 below the upper seal recess 1802, and a lower seal recess 1806 below the neck region 1804. When the shut off reset 1712 is in the on position, water passes between and/or around the upper seal recess 1802 and/or the lower seal recess 1806 across the neck region 1804 so that fluid extends out of the outlet 1706 or outlet 1708 (FIG. 17). The shut off reset 1712 includes three seals. The three seals include a top seal 1808 that is located above an upper seal recess 1802, a middle seal 1810 in the upper seal recess 1802, and a lower seal 1812 within the lower seal recess 1806. During operation, fluid extends into the housing 1702 through the reset inlet 1710 and contacts the top seal 1808 and creates pressure on a top of the shut off reset 1712. This pressure on a top of the shut off reset 1712 is overcome by fluid extending into the inlet 1704 so that the shut off reset 1712 is moved upwards and extends around the lower seal 1812, through the neck region 1804, and around the top seal 1808. If fluid ceases to enter the shut off 1700 via the inlet 1704 then pressure from the fluid entering through the reset inlet 1710 will be sufficiently large to move the shut off reset 1712 downward so that the inlet 1704 is blocked by the top seal 1808, the lower seal 1812, or both and fluid is prevented from exiting the shut off 1700 and a tank (not shown).

Figure 19:
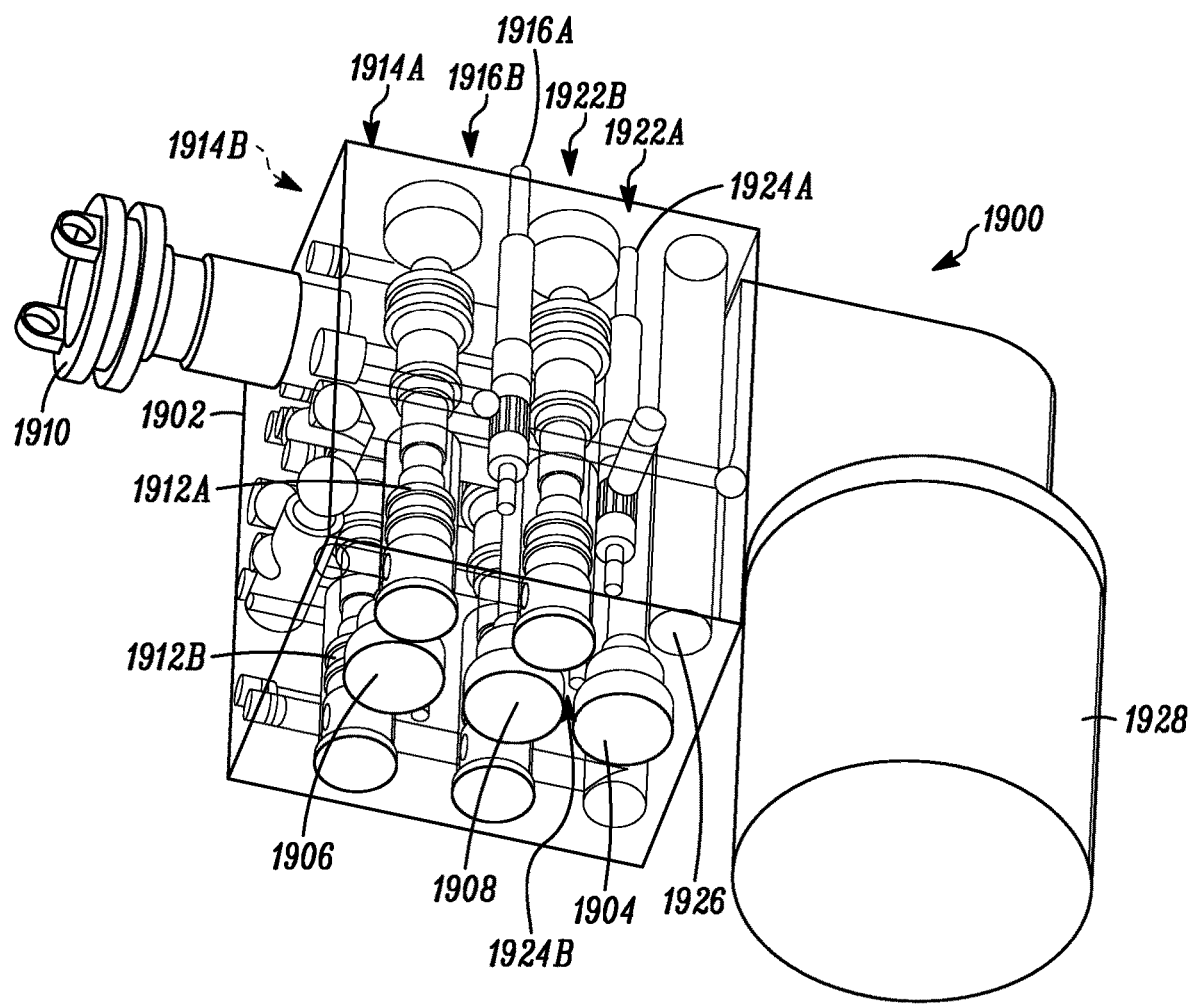
FIG. 19 is a bottom perspective view of a manifold.
Figure 20:
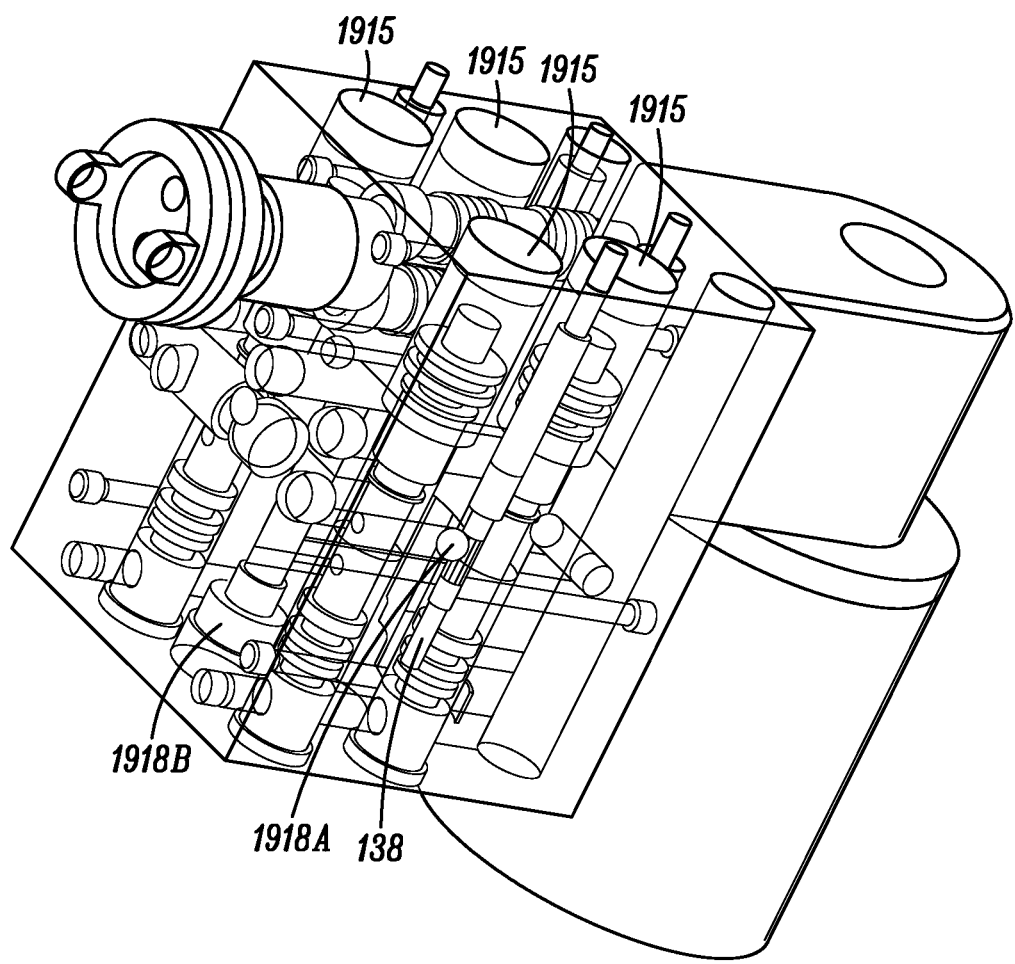
FIG. 20 is a front perspective view of the manifold of FIG. 19.

FIGS. 19 and 20 illustrate two different perspective views of a manifold 1900. FIG. 19 is a bottom perspective view and FIG. 20 is a front and top perspective view of the manifold 1900. The manifold 1900 operates in substantially the same way as the manifolds taught in FIGS. 2A-10; however, manifold 1900 has double the pistons and dampening conduits, as will be discussed herein.

The manifold 1900 includes a housing 1902 having an inlet 1904 that receives fluid from the inlet 24 (FIG. 1B), an outlet 1906 that provides fluid 30 to the flush valve 14 (FIG. 1B), and an outlet 1908 that provides fluid 38 as a refill (FIG. 1B). The fluid introduced into the manifold 1900 will be provided to a location depending upon which of the buttons of an actuator 1910 are activated. When one of the buttons of the actuator 1910 are depressed then one of the flush pistons 1912A or 1912B are activated within flush piston cavities 1914A or 1914B to move a fluid out of the manifold 1900 and through the outlet 1906. The flush piston 1912A is in communication with a flush dampening conduit 1916A and the flush piston 1912B is in communication with a flush dampening conduit 1916B that regulate the speed that the flush pistons 1912A and 1912B move in the actuation direction, the return direction, or both. For example, if the flush piston 1912A is actuated then only the flush dampening conduit 1916A and corresponding valve 138 (which is shown as including a needle valve 1918A) will actuate. In another example, if the flush piston 1912B is actuated then only the flush dampening conduit 1916B and corresponding valve 138 (which is shown as including a needle valve 1918B) will actuate.

The duration of movement of the flush pistons 1912A and 1912B may determine an amount (e.g., volume) of fluid moved. The flush piston 1912A may move a first volume of fluid and the flush piston 1912B may move a second volume of fluid. The first volume of fluid may be less than the second volume of fluid (e.g., the flush piston 1912A may move faster than then second flush piston 1912B so that less fluid is moved). During a flush, after a predetermined amount of time of flushing, or once a flush is complete then the manifold 1900 switches to refill. During a refill, a refill piston 1920A or a refill piston 1920B are actuated within a refill piston cavity 1922A and a refill piston cavity 1922B, respectively. All of the piston cavities, (e.g., the flush piston cavities 1914A and 1914B and the refill piston cavities 1922A and 1922B) are covered by an end cap 1915 so that the piston cavities 1914A, 1914B, 1922A, and 1922B are closed. The refill piston 1920A will be actuated when the flush piston 1912A is actuated, and the refill piston 1920B will be actuated when the flush piston 1920B is actuated. Similar to the flush pistons 1912A and 1912B, the refill pistons 1920A and 1920B are dampened by refill dampening conduits 1924A and 1924B, respectively.

The refill piston 1920A may move at a similar rate to the flush piston 1912A so that a volume of fluid in a tank may be returned to a starting position. Similarly, the refill piston 1920B may move at a similar rate to the flush piston 1912B so that the volume of fluid in the tank is returned to a starting position. The refill pistons 1920A and 1920B may move a different rate than the flush pistons 1912A and 1912B. The refill pistons 1920A and 1920B may be adjusted to move a volume of fluid regardless of the rate of movement. The flush dampening conduits 1916A and 1916B and the refill dampening conduits 1924A and 1924B are all part of a closed loop system that is connected to a supply tank 1926 that stores excess fluid while the dampening conduits 1916A, 1916B, 1924A, 1924B are active, stopped, or both. The fluid in the dampening conduits 1916A, 1916B, 1924A, 1924B may be any fluid; however, a non-compressible fluid acts to dampen the fluid within the flush system. The non-compressible fluid may be water, oil, a vegetable based oil, an animal safe oil, a natural oil, a synthetic oil, a bio-compatible oil, or a combination thereof. The refill pistons 1920A and 1920B will continue to actuate until a float 1928 reaches a filled position and then fluid stops entering the inlet 1904.

Figure 21:
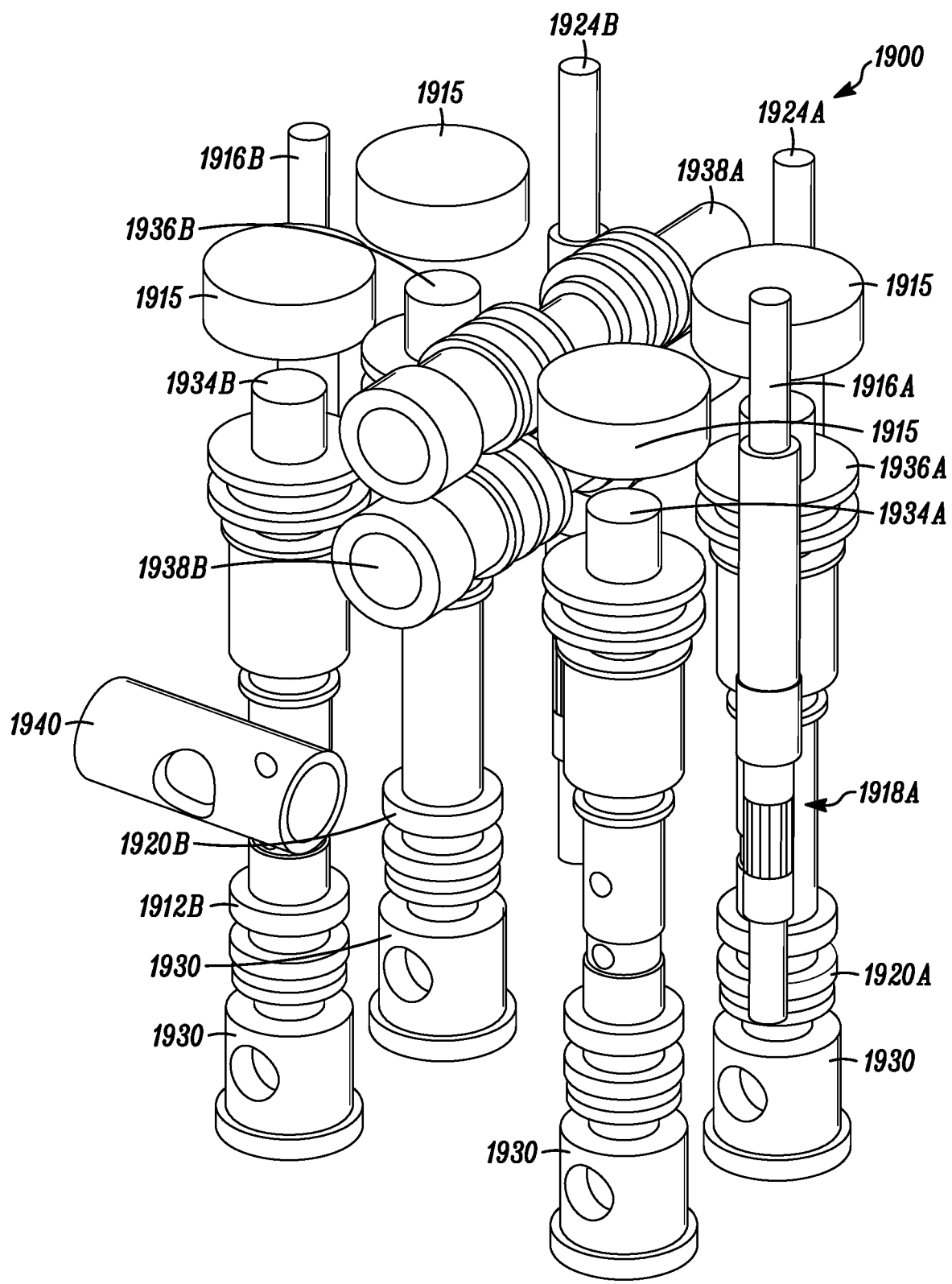
FIG. 21 is a front perspective view of the manifold of FIGS. 19 and 20 with the housing removed.

FIG. 21 illustrates the manifold 1900 of FIGS. 19 and 20 with the housing 1902 removed and the internal components exposed. As shown, the flush pistons 1912A and 1912B move axially along flush piston slides 1934A and 1934B, respectively. At each end of the flush piston slides 1934A and 1934B are an end cap 1915 and a second end cap 1930. The end cap 1915 is located on a first end and the second end cap 1930 is located on an opposing end. A flush dampening conduit 1916A extends parallel to a flush piston slide 1934A, and a flush dampening conduit 1916B extends parallel to a flush piston slide 1934B. The flush dampening conduits 1916A and 1916B include needle valves 1918A and 1918B, respectively, that control an amount of fluid that passes from the flush dampening conduits 1916A and 1916B to a side of the flush pistons 1912A and 1912B opposite a fluid (for flushing) so that movement of the pistons 1912A and 1912B are dampened.

The fluid for dampening may also act to return the pistons 1912A and 1912B to a start position so that a subsequent flush may occur. As shown, the flush dampening conduits 1916A and 1916B are located between the flush piston slides 1934A and 1934B and refill piston slides 1936A and 1936B.

The refill piston slides 1936A and 1936B include refill pistons 1920A and 1920B, respectively, that slide axially along the refill piston slides 1936A and 1936B. Similar to the flush piston slides 1934A and 1934B, the refill piston slides 1936A and 1936B include another end cap 1915 at a first end and another second end cap 1930 on an opposite end. As the refill pistons 1920A and 1920B move along the refill piston slides 1936A and 1936B, the speed of the refill pistons 1920A and 1920B is controlled and/or returned by the refill dampening conduits 1924A and 1924B, respectively. The flush piston slides 1934A, 1934B may work simultaneously with or in sequence with the refill piston slides 1936A, 1936B respectively to refill the bowl. In one example, the flush piston slide 1934A or 1934B will complete movement and flush a toilet bowl before the refill piston slides 1936A or 1936B are activated to refill the bowl so that fluid is not being added to the bowl while fluid is being removed from the bowl (i.e., water is not wasted by water being removed and added at the same time). In another example, the refill piston slides 1936A or 1936B may complete filling the bowl before the tank is refilled so that additional water does not flow into the bowl while the tank is being refilled. Refilling in sequence may reduce the amount of fluid that is moved through the system so that water is not wasted during refilling steps.

The refill dampening conduits 1924A and 1924B are parallel to and in communication with the refill pistons 1920A and 1920B. The refill dampening conduits 1924A and 1924B include needle valves (not shown) and operate in the same or similar manner as the flush dampening conduits 1916A and 1916B. The manifold 1900 includes activation valves 1938A and 1938B. The activation valve 1938A functions to operate the flush piston 1912A and the refill piston 1920A upon being actuated by a user. The activation valve 1938B functions to operate the flush piston 1912B and the refill piston 1920B upon being actuated by a user. The activation valve 1938A may be actuated to remove liquid waste and the activation valve 1938B may be actuated to remove solid waste. The activation valves 1938A and 1938B may function mechanically, hydraulically, pneumatically, or a combination thereof to start the hydraulic system. The activation valves 1938A and 1938B may release fluid into a selector valve 1940.

The selector valve 1940 may allow the fluid to flow into one of the flush piston cavities 1914A and 1914B (FIG. 19) to begin movement of the flush pistons 1912A and 1912B based upon the activation valve 1938A or 1938B being actuated or selected by a user. The selector valve 1940 may act as a switch. The selector valve 1940 may me a shutter valve that directs fluid to one of the flush piston cavities 1914A or 1914B depending on a selection by a user. Once the flush pistons 1912A and 1912B finish moving water or return to a start position, a respective one of the refill dampening conduits 1924A and 1924B is activated. Flush dampening conduits 1916A and 1916B may activated before the refill piston cavities 1922A and 1922B are activated or may be activated at the same time. Once the refill pistons 1920A and 1920B have finished moving from a start position, the refill pistons 1920A and 1920B are actuated back to a start position by the refill dampening conduit 1924A or 1924B. The flush dampening conduits 1916A and 1916B, the refill dampening conduits 1924A and 1924B, or both may only function to return a respective piston (e.g., 1912A, 1912B, 1920A, 1920B) to a start position, slow movement from a start position towards an end position, or both.

Figure 22:
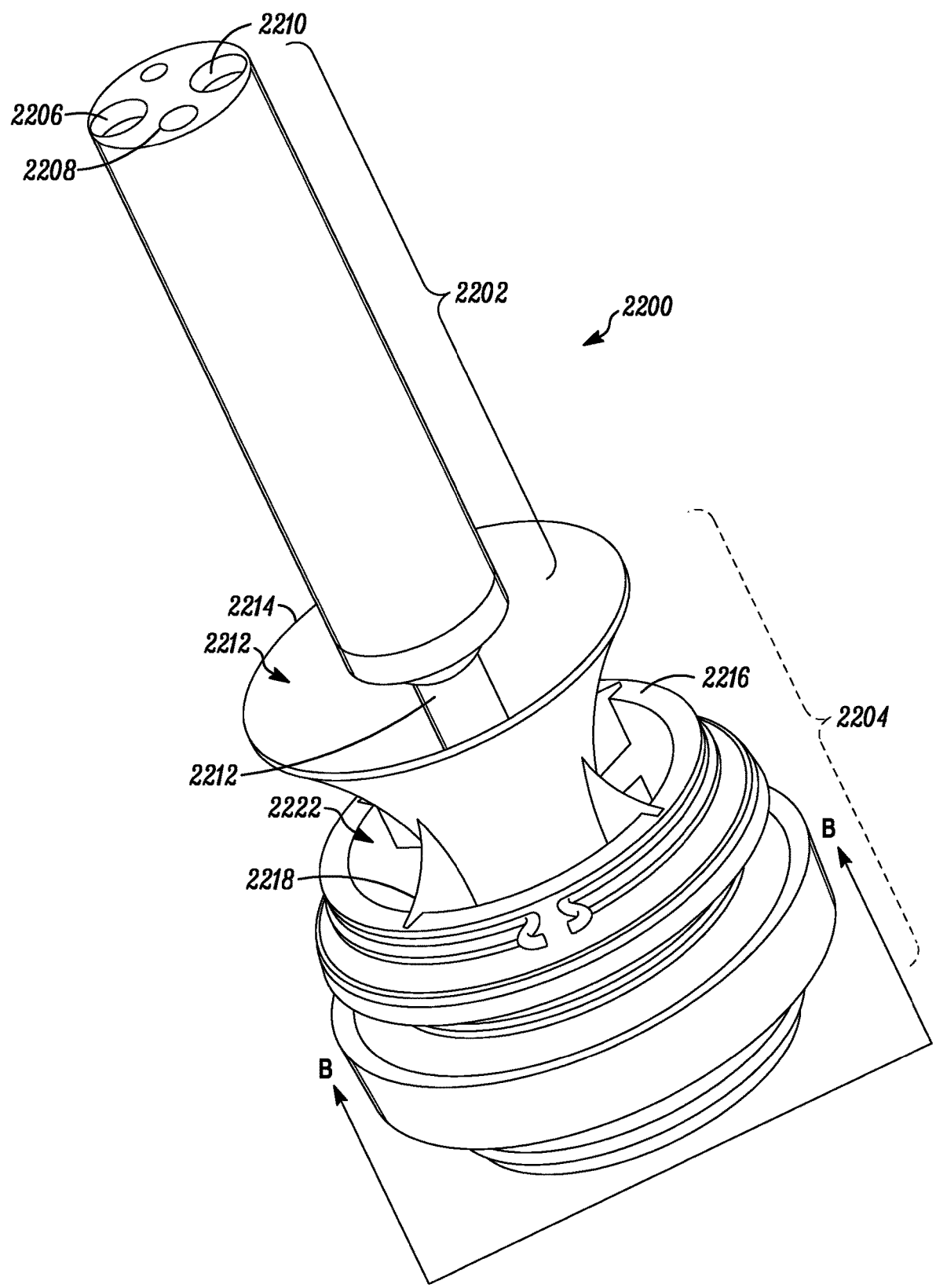
FIG. 22 is a perspective view of a flush valve.
Figure 23:
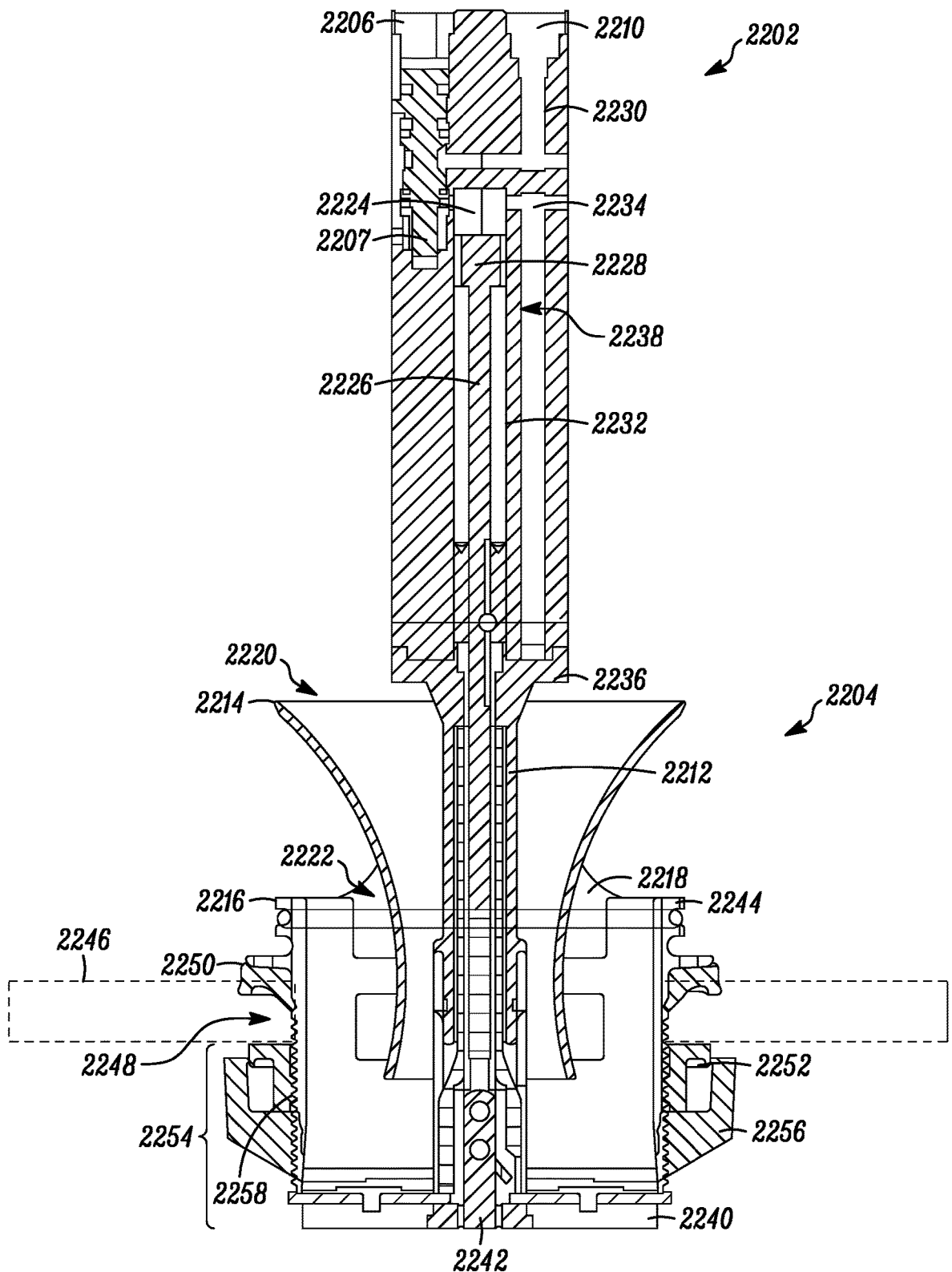
FIG. 23 is a cross-sectional view of the flush valve of FIG. 22 along lines B-B.

FIG. 22 is a perspective view of a flush valve 2200. The flush valve 2200 operates in a substantially similar manner to the flush valves of FIGS. 11A-14B. FIG. 23 is a front cross-sectional view of the flush valve 2200 along lines B-B of FIG. 22. The flush valve 2200 includes a first valve portion 2202 and a second valve portion 2204. The first valve portion 2204 has a first inlet 2206, a second inlet 2208, and a third inlet 2210. Referring back to FIG. 1B using the example of FIG. 22, the first inlet 2206 may be connected to the shut off 18, the second inlet 2208 may be connected to the manifold and the flush water 30, and the third inlet 2210 may be connected to the refill water 40. Returning to FIG. 22, the first valve portion 2202 includes a sleeve 2212 that extends into the first venturi tube 2214 of the second valve portion 2204 so that fluid introduced into the first inlet 2206, the second inlet 2208, and the third inlet 2210 passes towards the second valve portion 2204. The first venturi tube 2214 is located above and connected to a second venturi tube 2216 by tabs 2218 that extend therebetween. The first venturi tube 2214 has a first space 2220 (e.g., inlet) where fluid is pulled into and then the fluid extending through the first venturi tube 2214 is accelerated as the fluid moves through the flush valve 2200. The second venturi tube 2216 has a second space 2222 (e.g., inlet) where fluid is pulled into and then the second venturi tube 2216 accelerates the fluid as the fluid moves through the flush valve 2200. The first venturi tube 2214 and the second venturi tube 2216 are concentric. The fluid from the first space 2220 and the second space 2222 are combined as the fluid passes out of the flush valve 2220. The fluid that passed through the first space 2220 (e.g., inner wall of the first venturi tube) may be referred to herein as the venturi water. The fluid that passes through the second space 2222 (e.g., outer wall of the first venturi tube or inner wall of the second venturi tube) may be referred to herein as piloted water. The piloted water and the venturi water may separate at the inlet of the first venturi tube. The piloted water and the venturi water may combine at the outlet of the first venturi tube, the outlet of the flush valve, or both. The piloted water may reduce viscous drag of venturi water. The venturi water may be turbulent water or may have turbulent flow. The piloted water may be laminar water or have laminar flow. The piloted water may form a boundary layer on the second venturi tube 2216, the lower body 2244, or both so that when the piloted water and the venturi water recombine the venturi water is prevented from contacting the second venturi tube 2216, the lower body 2244, or both. The piloted water may create a viscus surface that the venturi water contacts and moves along so that drag on the venturi water is reduced relative to a static surface or a part of the flush valve 2200. The venturi water may be faster moving than the piloted water and the piloted water may create a low friction surface above a portion of the flush valve 2200 so that friction is reduced relative to contact with the flush valve 2200.

FIG. 23 shows movement of a fluid through the flush valve 2200 in a cross-sectional view. Fluid that enters the first inlet 2206 moves a piston 2207 downward. Fluid that enters the second inlet 2208 is prevented from moving through the second cavity 2224 by a rod 2226 connected to a piston 2228. When the piston 2207 is in a downward position, fluid from the third inlet 2210 enters the third cavity 2230 and then extends into the second cavity 2224 and a jet cavity 2232 via a cross-over 2234. The fluid from the third inlet 2210 assists in pushing the piston 2228 downward and the fluid also fills the jet cavity 2232 so that fluid extends out of jets 2236. The fluid expelled at a higher pressure from the jets 2236 sprays into the first venturi tube 2214 to assist in moving fluid through the first venturi tube 2214. As fluid creates a force on the first end 2238 of the rod 2226 and the piston 2228, the rod 2226 is pushed downward so that the rod 2226 opens the control stop 2240 via a second end portion 2242 of the rod 2230 (as is shown in FIG. 16). The rod 2226, first venturi tube 2214, second venturi tube 2216, or a combination thereof may be concentric. When the control stop 2240 opens, the jets 2236 are activated to move water into the inlet of the first venturi tube 2214 and then through the outlet of the first venturi tube 2214. When the control stop 2240 is open, water rushes into the inlet of the lower body 2244 including the second venturi tube 2216 and then out the outlet of the second venturi tube 2216 so that water movement through the flush valve 2200 is created. The outlet of the first venturi tube 2214 is located between the inlet and the outlet of the second venturi tube 2216. The control stop 2240 and the jets 2236 may be activated or moved substantially simultaneously. The control stop 2240 and the jets 2236 may be moved or activated when the piston 2207 is moved by incoming fluid. The control stop 2240, rod 2226, or both may be moved between an open position and a closed position by fluid pressure. The control stop 2240 may be moved between an open position and a closed position so that water may be prevented from exiting through the flush valve or may be accelerated through the flush valve. The jets 2236 may be selectively turned on or off (e.g., the jets may not apply pressurized water into the first venturi tube 2214 or the second venturi tube 2216). The control stop 2240 covers an outlet of the flush valve 2200. The first valve portion 2202 may include the jets 2236 around a periphery of a bottom of the first valve portion 2202. The jets 2236 may be spaced equally apart. There may be a sufficient number of jets 2236 to create flow of fluid through the first venturi 2214, the second venturi 2216, or both. There may be 0, 1, 2, 3, 4, or even 5 jets or more.

The second valve portion 2204 connects the flush valve 2200 to a wall 2246 shown in dotted line. The wall 2246 is located in a gap 2248 and is sandwiched between an upper gasket 2250 and a lower gasket 2252. The second valve portion 2204 includes a connecting member 2252 that is removable. The connecting member 2252 includes the lower gasket 2252 and a lower locking ring 2256 that locks the connecting member 2254 to a receiving member 2258 partially or entirely located above the wall 2246. The lower locking ring 2256 may have a threaded connection with the connecting member 2252 so that as the lower locking ring 2256 is rotated, the wall 2246 is closed within the gap 2248. The lower locking ring 2256 and the connecting member 2254 may support the first valve portion 2202 and second valve portion 2204 within a tank.

Figure 24:
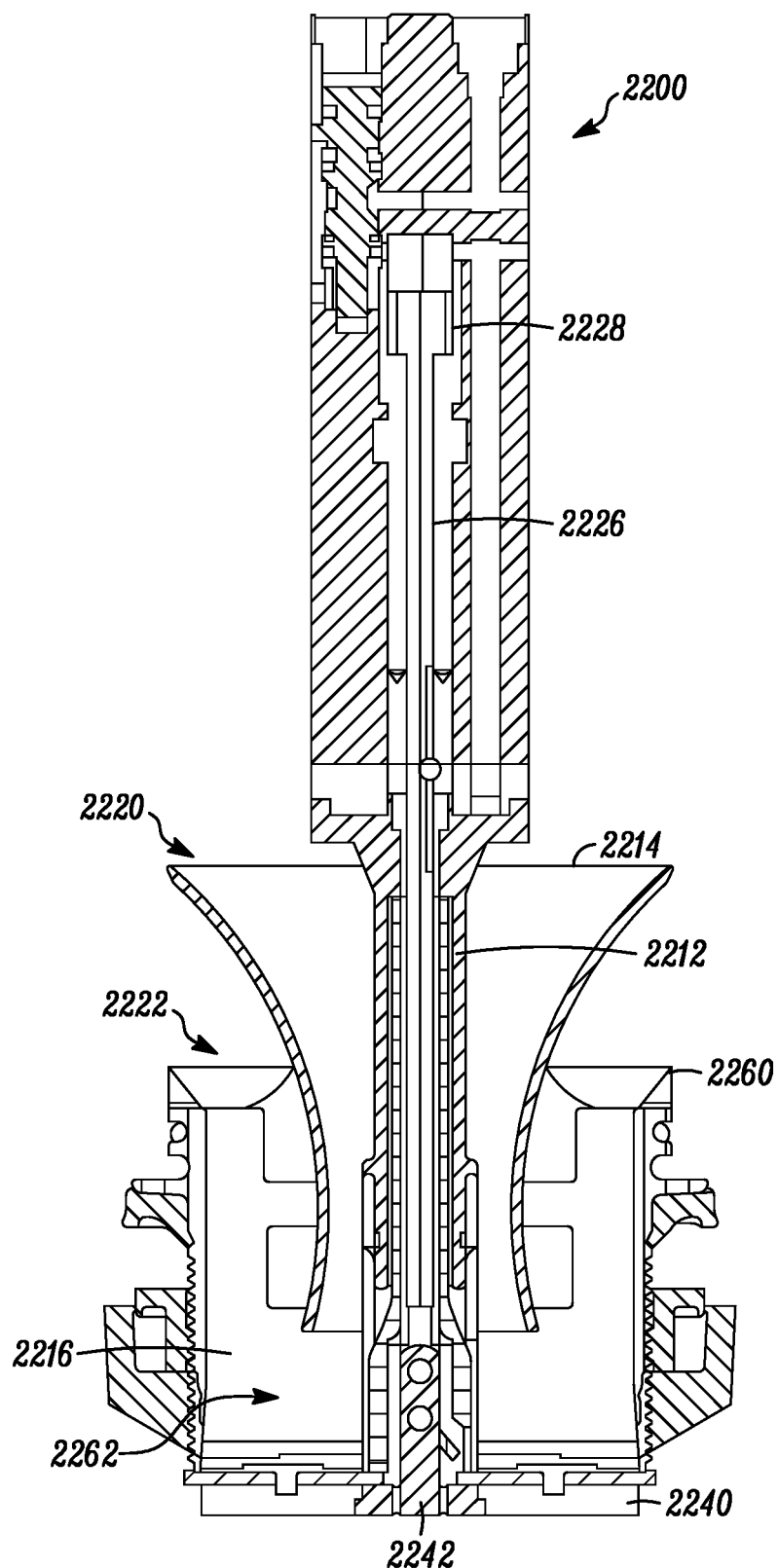
FIG. 24 is a cross-sectional view of a flush valve.

FIG. 24 shows a cross-sectional view of a flush valve 2200. The flush valve 2200 operates in a substantially similar manner to the flush valves of FIGS. 11A-14B and 23. The flush valve 2200 includes a includes a sleeve 2212 that extends through a center of a first venturi tube 2214 and a second venturi tube 2216. When the flush valve 2200 is activated fluid would enter the first space 2220 and then into the first venturi tube 2214 and the second space 2222 and then into the second venturi tube 2216. The flush valve 2200 is activated by the rod 2226 being moved downward by fluid contacting and creating a force on a piston 2228. As the rod 2226 is moved towards an open position (e.g., downward) the rod 2226 rotates a control stop 2240 open via a second portion of the rod 2242. The fluid moving into the second venturi tube 2216 moves across a venturi lip 2260 that assists in promoting laminar flow (e.g., preventing turbulent flow). The venturi lip 2260 gradually reduces volume within the second venturi tube 2216 so that the fluid is compressed without activity being imparted into the fluid. Once the fluid passes from the first space 2220 and through the first venturi tube 2214 the fluid is moved into contact with fluid from the second venturi tube 2216 in a mixing zone 2262. The fluid from the second venturi tube 2216 creates a laminar barrier layer for the fluid from the first venturi tube 2214 as all of the fluid passes out of the outlet of the flush valve.

What is claimed is:

1. A manifold, comprising:
   a housing defining a manifold inlet, a manifold outlet, a first piston cavity, and a second piston cavity, wherein the manifold inlet is configured to receive a first fluid from a supply line, and wherein the manifold inlet and the manifold outlet are in fluid communication with the first piston cavity;
   an actuator configured to selectively activate movement of a first piston within the first piston cavity between a first piston open position and a first piston closed position and to activate movement of a second piston within the second piston cavity between a second piston open position and a second piston closed position; and
   refill pistons located within refill piston cavities such that after a predetermined amount of time during a flush the refill pistons are moved within the refill piston cavities to return a volume of fluid within a tank to a starting position;
   wherein the first fluid flows from the manifold inlet to the manifold outlet through the first piston cavity when the first piston is in the first piston open position,
   wherein the first piston prevents fluid communication between the first piston cavity and at least one of the manifold inlet and the manifold outlet, when the first piston is in the first piston closed position, such that the first fluid cannot flow from the manifold inlet to the manifold outlet through the first piston cavity,
   wherein the second piston cavity is in fluid communication with the manifold inlet such that the first fluid can flow from the manifold inlet into the second piston cavity when the second piston is in the second piston open position, and
   wherein the second piston prevents fluid communication between the second piston cavity and at least one of the manifold inlet and the manifold outlet when the second piston is in the second piston closed position such that the first fluid cannot flow from the manifold inlet to the manifold outlet through the second piston cavity.

2. The manifold of claim 1, wherein the manifold includes a second outlet.

3. The manifold of claim 1, wherein the housing includes a third piston cavity and a fourth piston cavity.

4. The manifold of claim 1, comprising:
   a first damping conduit including a first adjustable flow regulator configured to control a speed of movement of the first piston from the first piston open position to the first piston closed position; and
   a second damping conduit including a second adjustable flow regulator configured to control a speed of movement of the second piston from the second piston open position to the second piston closed position,
   wherein the first damping conduit and the second damping conduit control movement of a second fluid that differs from and is not in fluid communication with the first fluid.

5. The manifold of claim 4, wherein the first damping conduit is in fluid communication with at least one of a first end or a second end of the first piston cavity and wherein the second damping conduit is in fluid communication with at least one of a first end or a second end of the second piston cavity.

6. The manifold of claim 1, wherein the actuator includes a valve in fluid communication with the manifold inlet, the valve being moveable between a valve position and a second valve position,
   wherein in the valve position, the valve is configured to direct the first fluid from the manifold inlet to a first end of the first piston to move the first piston from the first piston closed position to the first piston open position or to a first end of the second piston to move the second piston from the second piston closed position to the second piston open position, and
   wherein in the second valve position, the valve is configured to direct the first fluid from a supply conduit to a second end of the first piston to move the first piston from the first piston open position to the first piston closed position or to a second end of the second piston or to move the second piston from the second piston open position to the second piston closed position.

7. The manifold of claim 6, wherein in the valve position, the valve is configured to direct the first fluid from the supply conduit to an interior surface of the first end of the first piston or to an interior surface of the first end of the second piston, and wherein in the second valve position, the valve is configured to direct the first fluid from the supply conduit to an interior surface of the second end of the first piston or to an interior surface of the second end of the second piston.

8. The manifold of claim 6, wherein actuation of the valve controls movement between the valve position and the second valve position in response to a user toilet flush input, and wherein the manifold outlet is in fluid communication with a toilet flush valve.

9. A manifold, comprising:
   a housing defining a piston cavity;
   a piston having a first end and a second end, wherein the piston is moveable within the piston cavity between a first piston position and a second piston position;
   a manifold inlet defined by the housing configured to receive a first fluid from a supply line, wherein the manifold inlet is in fluid communication with the piston cavity;
   a manifold outlet defined by the housing, wherein the manifold outlet is in fluid communication with the piston cavity;
   a supply conduit defined by the housing that controls the first fluid, wherein the supply conduit is configured to receive the first fluid from the manifold inlet and to output the first fluid to the manifold outlet, and wherein the supply conduit includes the piston cavity;
   a valve in fluid communication with the supply conduit, the valve being moveable between a valve position and a second valve position; and
   a damping conduit including an adjustable flow regulator configured to control a speed of movement of the piston from the second piston position to the first piston position,
   wherein in the valve position, the valve directs the first fluid from the supply conduit to the first end of the piston in the piston cavity to move the piston to the first piston position,
   wherein in the second valve position, the valve directs the first fluid from the supply conduit to the second end of the piston in the piston cavity to move the piston to the second piston position, wherein in the first piston position, the piston prevents fluid communication between the manifold inlet and the manifold outlet through the supply conduit, wherein in the second piston position, the manifold inlet is in fluid communication with the manifold outlet such that the first fluid can flow from the supply line to the manifold outlet through the supply conduit;

wherein the damping conduit is in fluid communication with at least one of the first end or the second end of the piston, and wherein the damping conduit controls movement of a second fluid that differs from and is not in fluid communication with the first fluid.

10. The manifold of claim 9, wherein the adjustable flow regulator includes a needle valve.

11. The manifold of claim 9, wherein actuation of the valve controls movement between the valve position and the second valve position in response to a user toilet flush input, and wherein the manifold outlet is in fluid communication with a toilet flush valve.

12. The manifold of claim 9, further comprising a selector valve that allows the first fluid to flow into a first piston cavity or the first fluid to flow into a second piston cavity so that the selector valve acts as a switch between the first piston cavity or the second piston cavity.

13. The manifold of claim 1, wherein in the valve position, the valve directs the first fluid from the supply conduit to an interior surface of the first end of the piston to move the piston to the first piston position, and wherein in the second valve position, the valve directs the first fluid from the supply conduit to an interior surface of the second end of the piston to move the piston to the second piston position.

14. The manifold of claim 13, wherein the damping conduit is in fluid communication with at least one of an exterior surface of the first end of the piston or an exterior surface of the second end of the piston, and wherein the exterior surface of the first end of the piston is sealed from the interior surface of the first end of the piston and the exterior surface of the second end of the piston is sealed from the interior surface of the second end of the piston.

15. The manifold of claim 9, wherein the piston includes a first flush piston and a second flush piston with the first flush piston being axially movable along a first flush piston slide and the second flush piston being axially movable along a second flush piston slide.

16. The manifold of claim 15, wherein the first flush piston and the second flush piston are movable simultaneously with a first refill piston and a second refill piston.

17. A manifold comprising:

a housing defining a manifold inlet, a manifold outlet, a first piston cavity, and a second piston cavity, wherein the manifold inlet is configured to receive a first fluid from a supply line, and wherein the manifold inlet and the manifold outlet are in fluid communication with the first piston cavity;

an actuator configured to selectively activate movement of a first piston within the first piston cavity between a first piston open position and a first piston closed position and to activate movement of a second piston within the second piston cavity between a second piston open position and a second piston closed position; and a selector valve that allows the first fluid to flow into the first piston cavity or the first fluid to flow into the second piston cavity so that the selector valve acts as a switch between the first piston cavity or the second piston cavity;

wherein the first fluid flows from the manifold inlet to the manifold outlet through the first piston cavity when the first piston is in the first piston open position, wherein the first piston prevents fluid communication between the first piston cavity and at least one of the manifold inlet and the manifold outlet, when the first piston is in the first piston closed position, such that the first fluid cannot flow from the manifold inlet to the manifold outlet through the first piston cavity, wherein the second piston cavity is in fluid communication with the manifold inlet such that the first fluid can flow from the manifold inlet into the second piston cavity when the second piston is in the second piston open position, and wherein the second piston prevents fluid communication between the second piston cavity and at least one of the manifold inlet and the manifold outlet when the second piston is in the second piston closed position such that the first fluid cannot flow from the manifold inlet to the manifold outlet through the second piston cavity.

18. The manifold of claim 17, comprising:

a first damping conduit including a first adjustable flow regulator configured to control a speed of movement of the first piston from the first piston open position to the first piston closed position; and a second damping conduit including a second adjustable flow regulator configured to control a speed of movement of the second piston from the second piston open position to the second piston closed position, wherein the first damping conduit and the second damping conduit control movement of a second fluid that differs from and is not in fluid communication with the first fluid.

19. The manifold of claim 17, further comprising refill pistons located within refill piston cavities such that after a predetermined amount of time during a flush the refill pistons are moved within the refill piston cavities to return a volume of fluid within a tank to a starting position.

20. The manifold of claim 19, wherein the refill piston cavities comprise an end cap cover that covers ends of the refill piston cavities so that the refill piston cavities are closed.

* * * * *